United States Patent
Uchiyama et al.

(10) Patent No.: US 8,298,724 B2
(45) Date of Patent: Oct. 30, 2012

(54) TRANSITION METAL NITRIDE, SEPARATOR FOR FUEL CELLS, FUEL CELL STACK, FUEL CELL VEHICLE, METHOD OF MANUFACTURING TRANSITION METAL NITRIDE, AND METHOD OF MANUFACTURING SEPARATOR FOR FUEL CELLS

(75) Inventors: Noriko Uchiyama, Miura (JP); Nobutaka Chiba, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 532 days.

(21) Appl. No.: 12/529,469

(22) PCT Filed: Mar. 6, 2008

(86) PCT No.: PCT/JP2008/054561
§ 371 (c)(1),
(2), (4) Date: Sep. 1, 2009

(87) PCT Pub. No.: WO2008/108504
PCT Pub. Date: Sep. 12, 2008

(65) Prior Publication Data
US 2010/0021796 A1 Jan. 28, 2010

(30) Foreign Application Priority Data
Mar. 7, 2007 (JP) ............... P2007-057231

(51) Int. Cl.
*H01M 4/64* (2006.01)
*C23C 8/36* (2006.01)
*C23C 8/26* (2006.01)
*B60K 1/00* (2006.01)

(52) U.S. Cl. ........ 429/518; 148/318; 148/222; 180/65.1
(58) Field of Classification Search ................. 429/518; 148/318, 222
See application file for complete search history.

(56) References Cited

U.S. PATENT DOCUMENTS
2006/0040165 A1 * 2/2006 Uchiyama et al. ............. 429/34

FOREIGN PATENT DOCUMENTS
| EP | 1 890 353 A1 | 2/2008 |
| EP | 1 892 782 A1 | 2/2008 |
| EP | 1890353 A1 * | 2/2008 |
| JP | 10-228914 | 8/1998 |
| JP | 2001-6713 A | 1/2001 |

OTHER PUBLICATIONS

Naoki Yasumaru et al., "Nitrogen-induced Phase Transformation in Type 304 Austenitic Stainless Steel", J. Japan Inst. Metals, vol. 50, No. 4 (1986), pp. 362-368.

* cited by examiner

*Primary Examiner* — Karie O'Neill Apicella
(74) *Attorney, Agent, or Firm* — Foley & Lardner LLP

(57) ABSTRACT

A transition metal nitride obtained by nitriding a base material including an austenitic stainless steel having a Cr concentration of 25% or more includes a first layer (first nitrided layer) formed continuously on a base layer formed by the base material, having a stacked crystal structure of a nano-level including a nitride having a cubic crystal structure of $M_4N$ type, and a nitride having a hexagonal crystal structure of $M_{2-3}N$ type, and a second layer (second nitrided layer) formed continuously on the first layer, including a nitride having at least one kind of crystal structure out of hexagonal crystal structures of $Cr_2N$, CrN, and $M_{2-3}N$ type, and a cubic crystal structure of $M_4N$ type, and being formed as a surface-nitriding-processed portion of the base material continuously in a depth direction from a surface of the base material.

13 Claims, 22 Drawing Sheets (a)

(b)

(c)

(a)

(b)

(c)

(a)

--- METALLIC BOND
— COVALENT BOND (b)

| DATA INTERVALS (nm) | EMBODIMENT EXAMPLE 16 | EMBODIMENT EXAMPLE 2 | EMBODIMENT EXAMPLE 7 |
|---|---|---|---|
| | 25Cr-0Mo | 25Cr-1.5Mo | 25Cr-2.5Mo |
| 10.0 | 0.0 | 0.0 | 0.0 |
| 15.8 | 0.0 | 0.0 | 0.0 |
| 25.1 | 0.0 | 0.0 | 0.0 |
| 39.8 | 0.00550 | 0.00480 | 0.00651 |
| 63.1 | 0.01257 | 0.02735 | 0.03103 |
| 100.0 | 0.02373 | 0.05439 | 0.10362 |
| 158.5 | 0.03060 | 0.00366 | 0.05694 |
| 251.2 | 0.00608 | 0.00000 | 0.00114 |
| 398.1 | 0.0 | 0.0 | 0.0 |
| 631.0 | 0.0 | 0.0 | 0.0 |
| 1000.0 | 0.0 | 0.0 | 0.0 |
| >1000 | | | |
| AREA RATIO (%) | 7.8 | 9.0 | 19.9 |

(b)

| DATA INTERVALS (nm) | EMBODIMENT EXAMPLE 16 | EMBODIMENT EXAMPLE 2 | EMBODIMENT EXAMPLE 7 |
|---|---|---|---|
| | 25Cr-0Mo | 25Cr-1.5Mo | 25Cr-2.5Mo |
| 10.0 | 0 | 0 | 0 |
| 15.8 | 0 | 0 | 0 |
| 25.1 | 0 | 0 | 0 |
| 39.8 | 231 | 196 | 268 |
| 63.1 | 271 | 528 | 608 |
| 100.0 | 185 | 502 | 818 |
| 158.5 | 111 | 14 | 232 |
| 251.2 | 9 | 0 | 1 |
| 398.1 | 0 | 0 | 0 |
| 631.0 | 0 | 0 | 0 |
| 1000.0 | 0 | 0 | 0 |
| >1000 | | | |
| TOTAL PARTICLES (number) | 807 | 1240 | 1927 |

(a)

(b)

(a)

(b)

TRANSITION METAL NITRIDE, SEPARATOR FOR FUEL CELLS, FUEL CELL STACK, FUEL CELL VEHICLE, METHOD OF MANUFACTURING TRANSITION METAL NITRIDE, AND METHOD OF MANUFACTURING SEPARATOR FOR FUEL CELLS

TECHNICAL FIELD

This invention relates to a transition metal nitride, a separator for fuel cells, a fuel cell stack, a fuel cell vehicle, a method of manufacturing a transition metal nitride, and a method of manufacturing a separator for fuel cells.

BACKGROUND ART

It has been considered from the viewpoint of global environment protection to use a fuel cell as a power supply for a motor operable in place of an internal engine for automobiles, to drive an automobile by the motor. The fuel cell does not need the use of a fossil fuel accompanied by the problem of resource depletion, and can be free from emissions such as exhaust gases. The fuel cell further has eminent advantages, such that it is fairly noise-free, and affords the efficiency of energy collection to be higher than other energy machinery.

Fuel cells are categorized in accordance with the kind of electrolyte in use, into a polymer electrolyte type, a phosphate type, a molten carbonate type, a solid oxide type, etc. As one of them, the polymer electrolyte type (PEFC: Polymer Electrolyte Fuel Cell) is a fuel cell that employs as its electrolyte a membrane of electrolyte of a polymer having proton exchange groups in the molecule, making use of a function the polymer electrolyte membrane exhibits as a proton-conductive electrolyte with a saturated content of water. This polymer electrolyte fuel cell works at relatively low temperatures, and with a high efficiency of power generation. Moreover, the polymer electrolyte fuel cell is allowed to be small in size and light in weight, together with other associated equipment, and is expected to have a variety of applications including mounting to electric vehicles.

The polymer electrolyte fuel cell includes a fuel cell stack. The fuel cell stack is integrally configured as a lamination of a plurality of unit cells each working as a fundamental unit for power generation by electrochemical reactions, while the lamination is sandwiched between end flanges put on both ends thereof, and held tightened by tie bolts. The unit cells are each configured with a solid polymer electrolyte membrane, and a combination of an anode (hydrogen electrode) and a cathode (oxygen electrode) joined to both sides thereof.

FIG. 22 is a schematic sectional view of the configuration of a unit cell constituting a fuel cell stack. As shown in FIG. 22, the unit cell 200 includes a membrane electrode assembly, which is made up by a solid polymer electrolyte membrane 201, and a combination of an oxygen electrode 202 and a hydrogen electrode 203 integrally joined to both sides thereof. The oxygen electrode 202 and the hydrogen electrode 203 each respectively have a two-layered structure composed of a reaction film 204 and a gas diffusion layer (GDL) 205, and the reaction film 204 contacts on the solid polymer electrolyte membrane 201. On both sides of the combination of oxygen electrode 202 and hydrogen electrode 203, an oxygen electrode side separator 206 and a hydrogen electrode side separator 207 are arranged for lamination, respectively. By the oxygen electrode side separator 206 and the hydrogen electrode side separator 207, there are defined oxygen gas channels, hydrogen gas channels, and cooling water channels.

For manufacture of the unit cell 200 configured as described, the oxygen electrode 202 and the hydrogen electrode 203 are disposed on both sides of the solid polymer electrolyte membrane 201, and integrally joined thereto, typically by a hot pressing method, to form the membrane electrode assembly, and then, the separators 206 and 207 are disposed on both sides of the membrane electrode assembly. The unit cell 200 constitutes a fuel cell, where a gaseous mixture of hydrogen, carbon dioxide, nitrogen, and water vapor is supplied at the side of hydrogen electrode 203, and air with water vapor, at the side of oxygen electrode 202, whereby electrochemical reactions are caused principally at contact surfaces between solid polymer electrolyte membrane 201 and reaction films 204. More specific reactions will be described below.

In the above-noted configuration of unit cell 200, with oxygen gases and hydrogen gases distributed to oxygen gas channels and hydrogen gas channels, respectively, oxygen gases and hydrogen gases are supplied through gas diffusion layers 205 toward the reaction films 204, causing the following reactions in the reaction films 204.

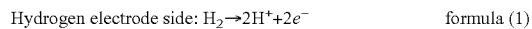

Hydrogen electrode side: $H_2 \rightarrow 2H^+ + 2e^-$      formula (1)

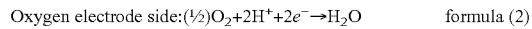

Oxygen electrode side: $(½)O_2 + 2H^+ + 2e^- \rightarrow H_2O$      formula (2)

At the side of hydrogen electrode 203, with hydrogen gas supplied, the reaction of formula (1) proceeds, producing $H^+$ and $e^-$. $H^+$ is hydrated, which moves in the solid polymer electrolyte membrane 201, flowing toward the oxygen electrode 202, while $e^-$ is conducted through a load 208, flowing from the hydrogen electrode 203 to the oxygen electrode 202. At the side of oxygen electrode 202, with $H^+$ and $e^-$ and oxygen gas supplied, the reaction of formula (2) proceeds, generating electric power.

For fuel cells, separators bear a function of electrical connection between unit cells, as described, and need a good conductivity of electricity, and low contact resistances to component materials of gas diffusion layers and the like.

Moreover, the electrolyte membrane of solid polymer type, made of a polymer with multiple sulfonate groups, is humidified to employ sulfonate groups as proton exchange groups, so as to be proton-conductive. For the electrolyte membrane of solid polymer type, which is strongly acidic, the fuel cell separators are required to be corrosive-resistant against sulfate acidities around pH2 to pH3.

Still more, for fuel cells, gases to be supplied have as hot temperatures as within 80 to 90° C., in addition to that there is provided not simply the hydrogen electrode in which $H^+$ is produced, but also the oxygen electrode, where oxygen as well as air or the like passes, constituting an oxidizing environment in which the electric potential to be born ranges from a natural potential to a maximum of about 1 V vs. SHE relative to a standard hydrogen electrode potential. Hence, as well as the oxygen electrode and the hydrogen electrode, the fuel cell separators are required to have a corrosion resistance endurable under a strongly acidic atmosphere.

It is noted that the corrosion resistance now required means a durability that permits the fuel cell separator to have a maintained performance of electric conduction even under a strongly acidic environment. In other words, the corrosion resistance should be measured in an environment in which cations are transferred into humidifying water or production water due to the reaction of formula (2), and are bonded with sulfonate groups that inherently should have made ways for protons, occupying those sulfonate groups, causing power generating characteristics of electrolyte membrane to deteriorate.

Further, although fuel cells have a theoretical voltage, which is 1.23 V per unit cell, the voltage that can be actually taken out is dropped due to reaction polarization, gas diffusion polarization, and resistance polarization. As the current to be taken out gets greater, the voltage drop also increases. Furthermore, in applications to automobiles, where increasing power density per unit volume or unit weight is wanted, the service may well be provided at a greater current density than for stationary use, e.g., at a current density of 1 A/cm$^2$. In this respect, it is considered that for the current density of 1 A/cm$^2$, if the contact resistance between separator and electrode is kept within a range of 40 mΩ·cm$^2$ or less, the efficiency reduction due to contact resistance is controllable.

To this point, for separators for fuel cells, attempts have been made to employ an electrically well conductive and excellently corrosion-resistive stainless steel or titanium material such as a pure titanium material for industrial use. The stainless steel has a dense passive film formed on the surface, with oxides or hydroxides, or hydrates of them or the like, containing chromium as a principal metallic element. Likewise, the titanium material has a dense passive film formed on the surface, with titanium oxides or titanium hydroxides, or hydrates of them or the like. The stainless steel as well as the titanium material is thus well anti-corrosive.

However, the above-noted passive films have contact resistances to a carbon paper employed typically as a gas diffusion layer. Fuel cells have an excessive voltage due to a resistance polarization therein, while for stationary applications affording a waste heat collection such as by co-generation, the heat efficiency can be enhanced as a total. But, for applications to automobiles, where the heat loss due to contact resistance has to be simply wasted outside, through cooling water, from a radiator, the efficiency of power generation decreases, as the contact resistance increases. Further, the decrease in efficiency of power generation is equivalent to an increase in heat dissipation, which leads to the need for a greater cooling system to be installed. Therefore, the increase of contact resistance has come up as an important issue to be solved.

In this respect, there is proposed a separator for fuel cells in Japanese Patent Application Laying-Open Publication No. 10-228914 (refer to page 2, and FIG. 2), in which a stainless steel is press-formed, and thereafter, a gold film is plated directly on surface regions to be brought into contact with an electrode. Further, there is proposed a separator for fuel cells in Japanese Patent Application Laying-Open Publication No. 2001-6713 (refer to page 2) in which a stainless steel is molded and machined in the form of a separator for fuel cells, and thereafter, passive films of surface regions that will have contact resistances when brought into contact with an electrode are removed, and a precious metal or a precious metal alloy is attached.

DISCLOSURE OF THE INVENTION

However, for stainless steels used as a base material for separators, the electric conductivity and the contact resistance are conflicting properties, and it is difficult for conductivity and corrosion resistance to go together. Further, for stainless steel surfaces coated with a precious metal or the like, there may be not simply a troublesome manufacture, but also an increased cost.

The present invention has been devised to solve the above-noted issues.

According to an aspect of the present invention, a transition metal nitride obtained by nitriding a base material including an austenitic stainless steel having a Cr concentration of 25% or more comprises a first layer formed continuously on a base layer formed by the base material, having a stacked crystal structure of a nano-level including a nitride having a cubic crystal structure of $M_4N$ type, and a nitride having a hexagonal crystal structure of $M_{2\text{-}3}N$ type, and a second layer formed continuously on the first layer, including a nitride having at least one kind of crystal structure out of hexagonal crystal structures of $Cr_2N$, CrN, and $M_{2\text{-}3}N$ type, and a cubic crystal structure of $M_4N$ type, and being formed as a surface-nitriding-processed portion of the base material continuously in a depth direction from a surface of the base material.

According to an aspect of the present invention, a separator for fuel cells comprises a base layer formed by a base material including an austenitic stainless steel having a Cr concentration of 25% or more, and a nitrided layer of a transition metal nitride according to the present invention being formed directly on the base layer.

According to an aspect of the present invention, a method of manufacturing a transition metal nitride to be formed by nitriding a base material including an austenitic stainless steel having a Cr concentration of 25% or more comprises forming, on a base layer formed by the base material, a first layer having a stacked crystal structure of a nano-level including a nitride having a cubic crystal structure of $M_4N$ type, and a nitride having a hexagonal crystal structure of $M_{2\text{-}3}N$ type, and having a second layer formed continuously on the first layer, including a nitride having at least one kind of crystal structure out of hexagonal crystal structures of $Cr_2N$, CrN, and $M_{2\text{-}3}N$ type, and a cubic crystal structure of $M_4N$ type, and being formed as a surface-nitriding-processed portion of the base material continuously in a depth direction from a surface of the base material.

According to an aspect of the present invention, a method of manufacturing a separator for fuel cells comprises press-forming a passage for a fuel or an oxidizer to a work comprising a base material including an austenitic stainless steel having a Cr concentration of 25% or more, and applying a nitriding process to the work, thereby forming, on a base layer formed by the base material, a first layer having a stacked crystal structure of a nano-level including a nitride having a cubic crystal structure of $M_4N$ type, and a nitride having a hexagonal crystal structure of $M_{2\text{-}3}N$ type, and having a second layer formed continuously on the first layer, including a nitride having at least one kind of crystal structure out of hexagonal crystal structures of $Cr_2N$, CrN, and $M_{2\text{-}3}N$ type, and a cubic crystal structure of $M_4N$ type, and being formed as a surface-nitriding-processed portion of the base material continuously in a depth direction from a surface of the base material.

According to an aspect of the present invention, a fuel cell stack comprises a separator for fuel cells according to the present invention.

According to an aspect of the present invention, a fuel cell vehicle comprises a fuel cell stack according to the present invention as a power supply.

BRIEF DESCRIPTION OF THE DRAWINGS

FIG. 14(a) is a table showing, for each of the samples from embodiment examples 16, 2, and 7, a relationship between a set of data intervals of equivalent circle diameters of projecting nitrides and a set of area ratios % of associated nitrides, and FIG. 14(b), a table showing, for each of the samples from embodiment examples 16, 2, and 7, a relationship between the set of data intervals of equivalent circle diameters of projecting nitrides and a set of numbers of particles of associated nitrides number.

BEST MODES FOR CARRYING OUT THE INVENTION

There will be described below a transition metal nitride, a separator for fuel cells, a fuel cell stack, a fuel cell vehicle, a method of manufacturing a transition metal nitride, and a method of manufacturing a separator for fuel cells according to embodiments of the present invention, as they are applied to a polymer electrolyte fuel cell.

(Transition Metal Nitride, Separator for Fuel Cells, and Fuel Cell Stack)

Figure 1:
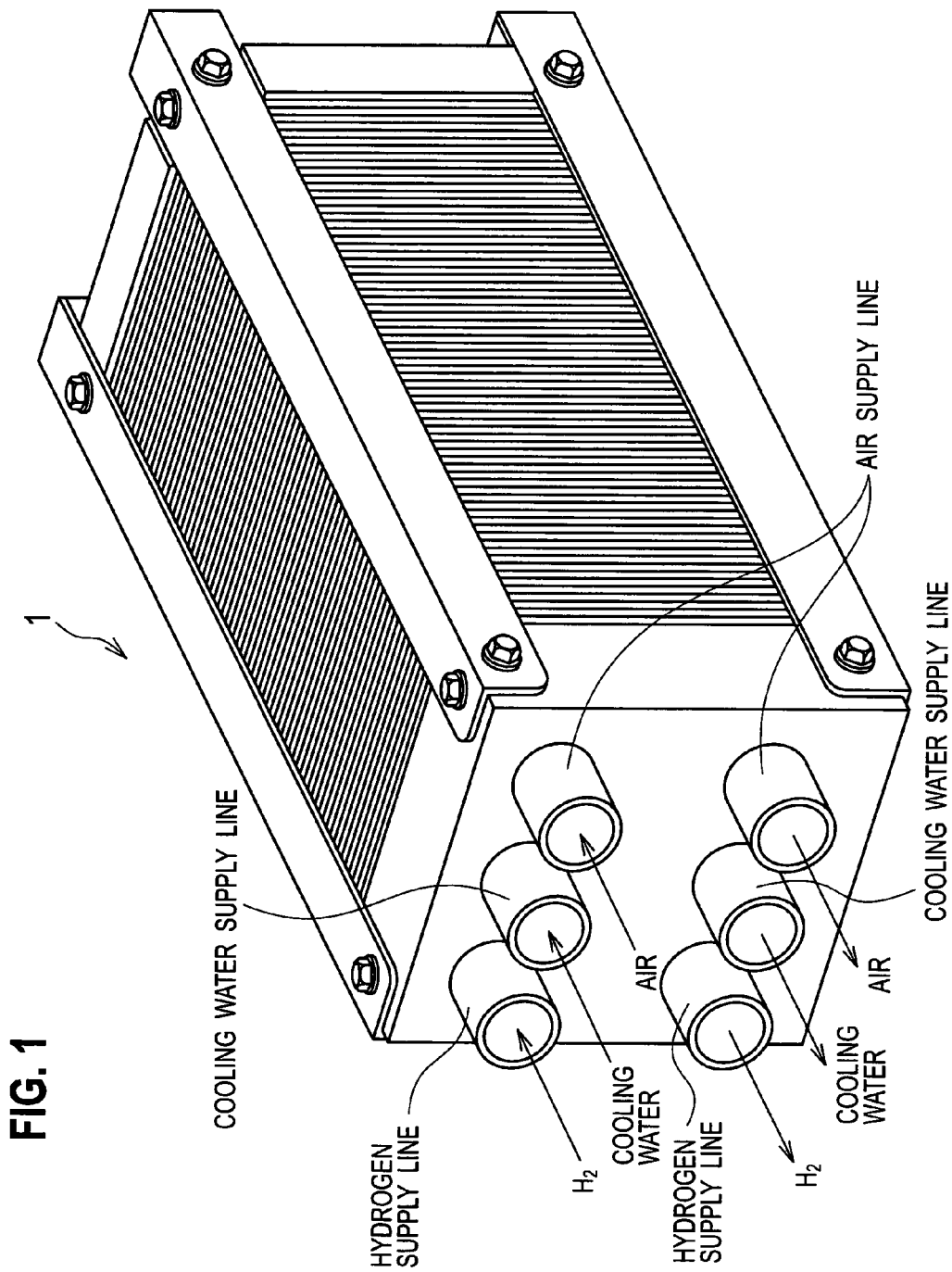
FIG. 1 is a perspective view of a fuel cell stack configured with separators for fuel cells according to an embodiment of the present invention.
Figure 2:
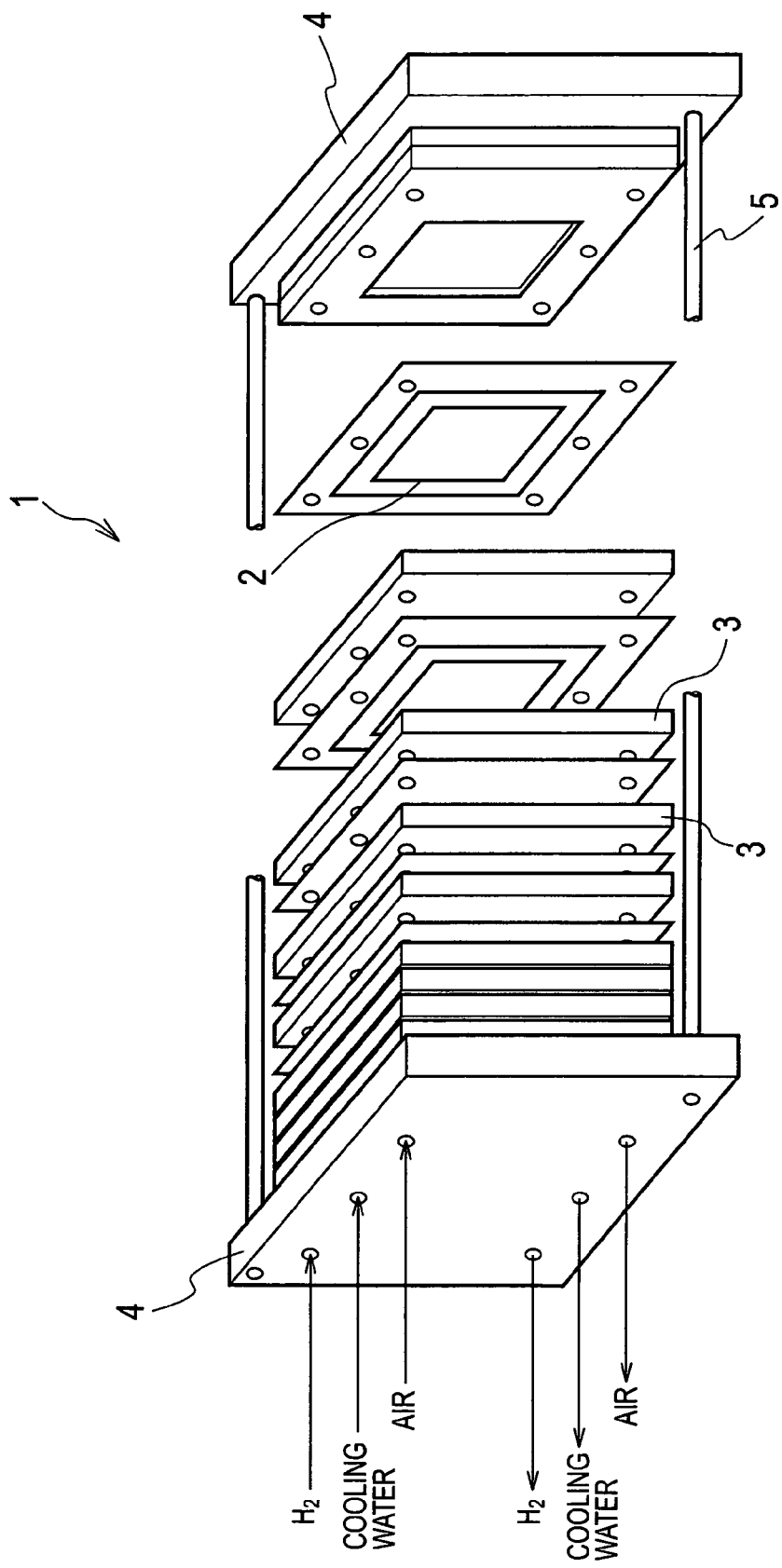
FIG. 2 is an exploded view of the fuel cell stack configured with separators for fuel cells according to the embodiment of the present invention.

FIG. 1 is a perspective view of an appearance of a fuel cell stack configured with separators for fuel cells according to an embodiment of the present invention. FIG. 2 is an exploded view of the fuel cell stack 1 schematically showing a detailed configuration of the fuel cell stack 1.

As shown in FIG. 2, the fuel cell stack 1 is configured as an alternating lamination of pluralities of unit cells 2 each serving as a fundamental unit for power generation by electrochemical reactions, and separators 3 for fuel cells. Each unit cell 2 is configured as a membrane electrode assembly, in which an electrolyte membrane of a solid polymer type has at one side thereof a gas diffusion layer including an oxidizer electrode, formed thereon, and at the other side thereof a gas diffusion layer including a fuel electrode, formed thereon. Separators 3 for fuel cells are arranged on both sides of the membrane electrode assembly, and each separator 3 for fuel cells has channels formed therein, as necessary, for distribution and collection of oxidizer gas, fuel gas, and cooling water.

As the solid polymer type electrolyte membrane, there may be employed a film of perfluorocarbon polymer having sulfonate groups (Nafion 1128 (registered trade name) by Du Pont Co.), or the like. After unit cells 2 and separators 3 for fuel cells are laminated, end flanges 4 are disposed at both ends, and the outer peripheral parts are fastened together by tie bolts 5, whereby the fuel cell stack 1 is assembled. Further, the fuel cell stack 1 is provided with a hydrogen supply line for supplying each unit cell 2 with a fuel gas such as a hydrogen gas containing hydrogen, an air supply line for supplying air as an oxidizer gas, and a cooling water supply line for supplying cooling water.

Figure 3:
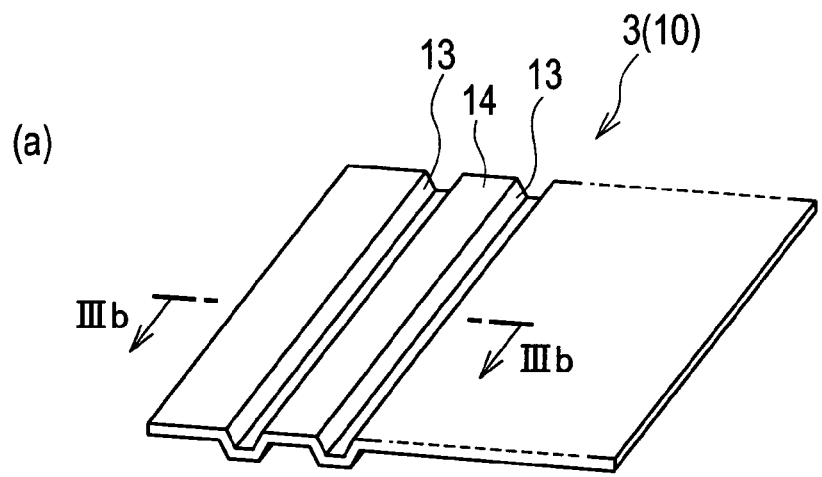
FIG. 3(a) is a schematic perspective view of a separator for fuel cells, FIG. 3(b), a sectional view of the separator for fuel cells along line IIIb-IIIb, and FIG. 3(c), a sectional view of the separator for fuel cells along line IIIc-IIIc.
Figure 3:
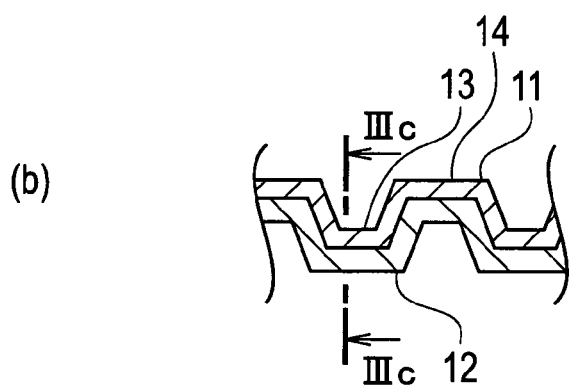
Figure 3:
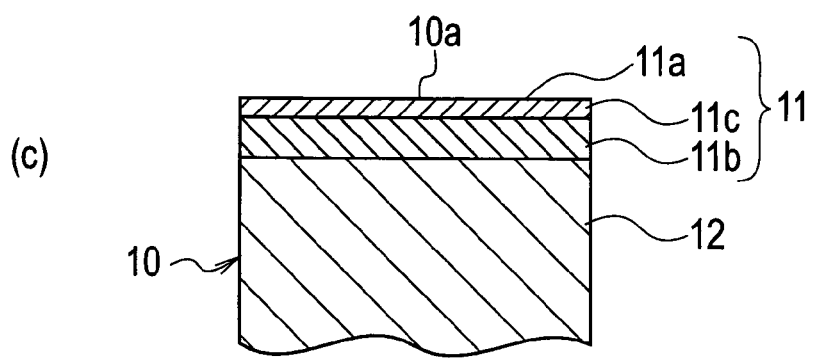
Figure 4:
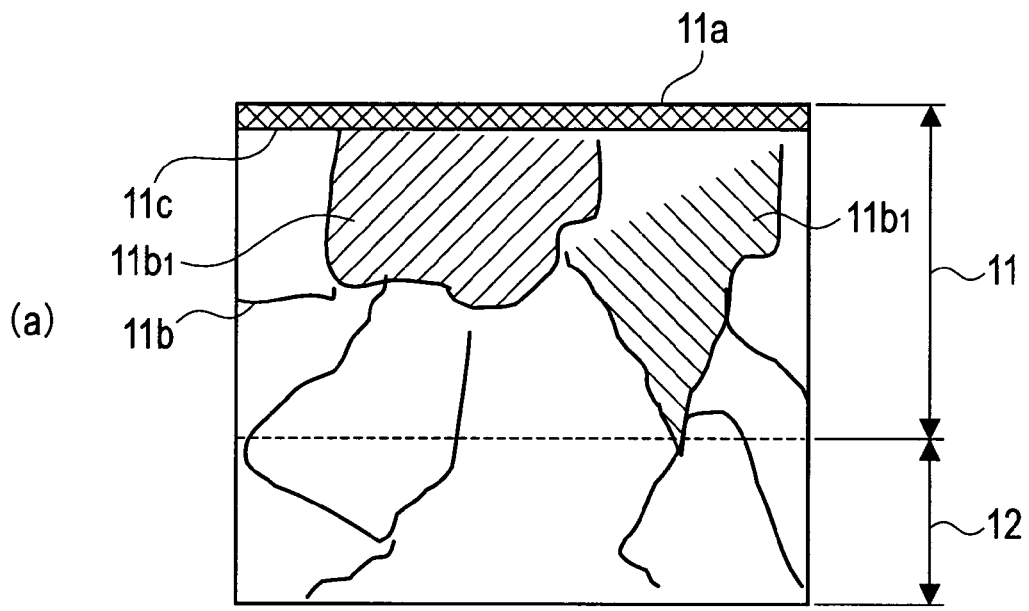
FIG. 4(a) is a schematic enlarged view of an essential portion of FIG. 3(c), FIG. 4(b), a sectional view corresponding to FIG. 3(c) of another separator for fuel cells, and FIG. 4(c), a schematic sectional view of a second nitrided layer of the separator for fuel cells shown in FIG. 4(b).
Figure 4:
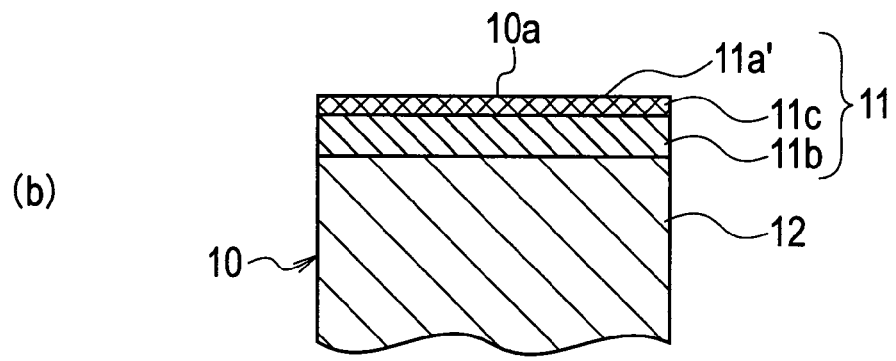
Figure 4:
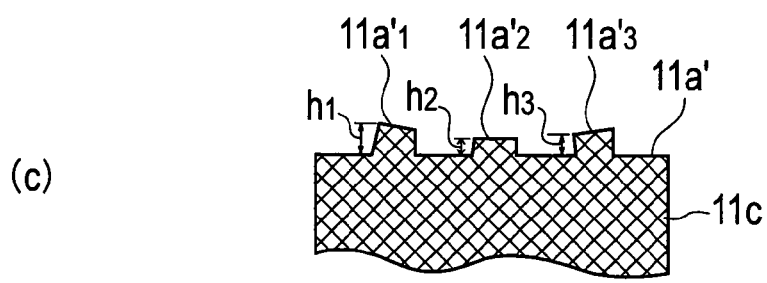

Description is now made into details of separators 3 for fuel cells shown in FIG. 2. FIG. 3(*a*) is a schematic perspective view of a separator 3 for fuel cells, FIG. 3(*b*), a sectional view of the separator 3 for fuel cells along line IIIb-IIIb, with an essential portion highlighted for easy understanding, and FIG. 3(*c*), a sectional view of the separator 3 for fuel cells along line IIIc-IIIc, with an essential portion highlighted for easy understanding. FIG. 4(*a*) is a schematic enlarged view of an essential portion of FIG. 3(*c*), FIG. 4(*b*), a sectional view corresponding to FIG. 3(*c*) of another separator 3 for fuel cells, with an essential portion highlighted for easy understanding, and FIG. 4(*c*), a schematic sectional view of a second nitrided layer 11*c* of the separator 3 for fuel cells shown in FIG. 4(*b*).

As illustrated in FIG. 3, the separator 3 for fuel cells is made by a base material 10 including an austenitic stainless steel having a Cr concentration of 25% or more. It is obtained by nitriding a surface portion 10*a* as a surface-nitriding-processed portion of the base material 10, and has a nitrided layer 1 formed in a depth direction of the surface portion 10*a*, and a base layer 12 as a non-nitrided layer that is not nitrided.

The separator 3 for fuel cells has groove-shaped channels 13 formed therein for fuel and oxidizer, by a press forming, into rectangular shapes in section. Between neighboring channels 13 and 13, there is provided a flat planer part 14 defined by those channels 13 and 13, and the nitrided layer 1 extends along outer surfaces of the flat planer part 14 and the channels 13 and 13. The flat planer part 14 is brought into contact with a gas diffusion layer on a solid polymer membrane, when unit cells 2 and separators 3 for fuel cells are alternately laminated.

The base layer 12 is made of an austenitic stainless steel containing at least one or more elements selective from a group of Fe, Cr, Ni, and Mo. The austenitic stainless steel has a crystal structure of a face-centered cubic lattice.

The nitrided layer 11 contains transition metal nitrides obtained by nitriding the base material including an austenitic stainless steel having a Cr concentration of 25% or more, and includes crystal structures of MN type, $M_{2-3}N$ type, and $M_4N$ type. As shown in FIG. 3(*c*) and FIG. 4, the nitrided layer 11 has a first nitrided layer (first layer) 11*b* formed on the base layer 12, and a second nitrided layer (second layer) 11*c* formed continuously on the first nitrided layer 11*b*, as a most superficial surface of the nitrided layer 11 including a surface portion 11*a* of the nitirided layer 11. The surface portion 11*a* of nitirided layer 11 is the surface portion 10*a* of base material 10 in which nitrogen is solved as a solid solute by nitridation.

The first nitrided layer 11*b* is formed continuously on the base layer 12 formed by the base material 10, and has a stacked crystal structure $11b_1$ of a nano-level including a nitride having a cubic crystal structure of $M_4N$ type, and a nitride having a hexagonal crystal structure of $M_{2-3}N$ type. The stacked crystal structure $11b_1$ of nano-level includes a structure in which crystal structures of $M_4N$ type and $M_{2-3}N$ type are stacked.

The second nitrided layer 11*c* is formed continuously on the first nitrided layer 11*b*, including a nitride having at least one kind of crystal structure out of "hexagonal crystal structures of $Cr_2N$, CrN, and $M_{2-3}N$ type, and a cubic crystal structure of $M_4N$ type", and being formed as a surface-nitriding-processed portion of the base material 10 continuously in a depth direction from the surface portion 10*a* of base material 10. The surface portion 11*a* of nitrided layer 1 has a texture in which Cr and nitrogen are incrassated, and includes crystal structures of MN type, $M_{2-3}N$ type, and $M_4N$ type.

If the second nitrided layer 11*c* mainly includes hexagonal crystal structures of CrN, the surface portion 11*a* is less irregular, and has a smooth form. The second nitrided layer 11*c* may preferably include nitrides of layered forms within a range of 3 nm to 30 nm in thickness. In this case, the surface portion 10*a* of base material 10 has layers formed therein with incrassated Cr and N, and is excellent, in particular in corrosion resistance. To the contrary, if the thickness is smaller than 3 nm, the surface portion 10*a* may have layers incrassate of Cr and N but interrupted at some places, with a reduced corrosion resistance. If the thickness exceeds 30 nm, the surface portion 10*a* may tend to have Cr-deficient layers developed in regions contacting layers incrassate of Cr and N, with a reduced corrosion resistance.

If the second nitrided layer 11*c* mainly includes hexagonal crystal structures of $Cr_2N$, CrN, and $M_{2-3}N$ type, as shown in FIG. 4(*c*), the nitrided layer 11 has a surface portion of such a structure that includes irregularly projecting precipitates $11a'_1$, $11a'_2$, and $11a'_3$. For example, a precipitate $11a'_1$ projects from the surface portion 11*a'* of nitrided layer 11 by a height $h_1$ as a local maximum, another precipitate $11a'_2$ projects from the surface portion of nitrided layer 11*c* by a different height $h_2$ as a local maximum, and still another precipitate $11a'_3$ projects from the surface portion 11*a'* of nitrided layer 11*c* by a yet different height $h_3$ as a local maximum.

The height of such precipitates (including those $11a'_1$, $11a'_2$, $11a'_3$ of local maximum heights $h_1$, $h_2$, $h_3$) may preferably be within a range of 10 nm to 90 nm, relative to the surface portion 11*a'* of nitrided layer 11. In this case, such precipitates are brought into contact with sheets of carbon paper made of carbon fibers of a sub-micron order, so that they intrude into gaps between carbon fibers, with an increased area (or number) of actual contact region (or points), which keeps the contact resistance of surface portion 11*a'* low, rendering the conductivity excellent. However, for a range of heights smaller than 10 nm, precipitates may have a decreased area (or number) of actual contact region (or points) with sheets of carbon paper made of carbon fibers of a sub-micron order, thus rendering the conductivity of surface portion 11*a'* little improved. For a range of heights exceeding 90 nm, it may be difficult for precipitates to intrude into gaps between carbon fibers of sheets of carbon paper made of carbon fibers of a sub-micron order, with a resultant decrease in area (or number) of actual contact region (or points), constituting a difficulty in expecting an improved conductivity.

It is noted that M is a transition metal atom selective from a group of Fe, Cr, Ni, and Mo. Such a nitrided layer 11*c* high of nitrogen concentration and Cr concentration as described can be obtained with ease by plasma nitridation of a base material being high, in particular, of Cr concentration.

Even by simple provision of a nitrided layer, separator surfaces may have, among others, for example, a tendency, for those low of contact resistance and excellent in electric conductivity, to have a large amount of iron ions solved out with a worsened corrosion resistance, or to the contrary, a tendency, for those small in amount of iron ion elution and excellent in corrosion resistance, to have a high contact resistance with an inferior electric conductivity. To this point, to cope with fuel cell stacks to be widely small-sized and light-weighted, it however is necessary for separators for fuel cells to have enhanced corrosion resistance and electric conductivity, and in order for the electric conductivity and contact resistance as conflicting properties to go together to provide an excellent performance, such the improvement of nitrided layer has come up as an important object to be solved.

According to the present embodiment, in the separator 3 for fuel cells, the nitrided layer 11 has a structure described, whereby even under an environment strong in acidity like the hydrogen electrode of fuel cell, it is allowed for transition metal nitrides constituting the nitrided layer 11 to keep low the elution of metallic ions from the separator 3 for fuel cells, providing an excellent corrosion resistance.

In this case, the separator 3 for fuel cells is excellent in durability to maintain the performance of electric conductivity, allowing the conductivity and corrosion resistance to go together, with a production cost suppressed low. In addition thereto, with the above-noted transition metal nitride, the separator 3 for fuel cells is allowed to be excellent in durability to maintain the performance of electric conductivity even in a strongly acidic atmosphere like the oxygen electrode of fuel cell in which air is introduced, whereby the separator 3 for fuel cells is rendered the more excellent in electric conductivity. Still more, the separator 3 for fuel cells is enabled to have the elution of metallic ions suppressed low even under a strongly acidic oxidizing environment, allowing the conductivity and corrosion resistance to go together, with a low-controllable cost for manufacture.

Like this, there can be implemented a separator for fuel cells affording concurrent provision of an electric conductivity, as necessary in the application as a separator for fuel cells, and a chemical stability, as well as a corrosion resistance, for the electrically conductive property to be maintained under an environment using a separator, while allowing for a favorable productivity with a low cost, a low contact resistance to constituent materials such as of an electrode of a neighboring gas diffusion layer, and a favorable contribution to the power generation performance of fuel cells.

Figure 5:
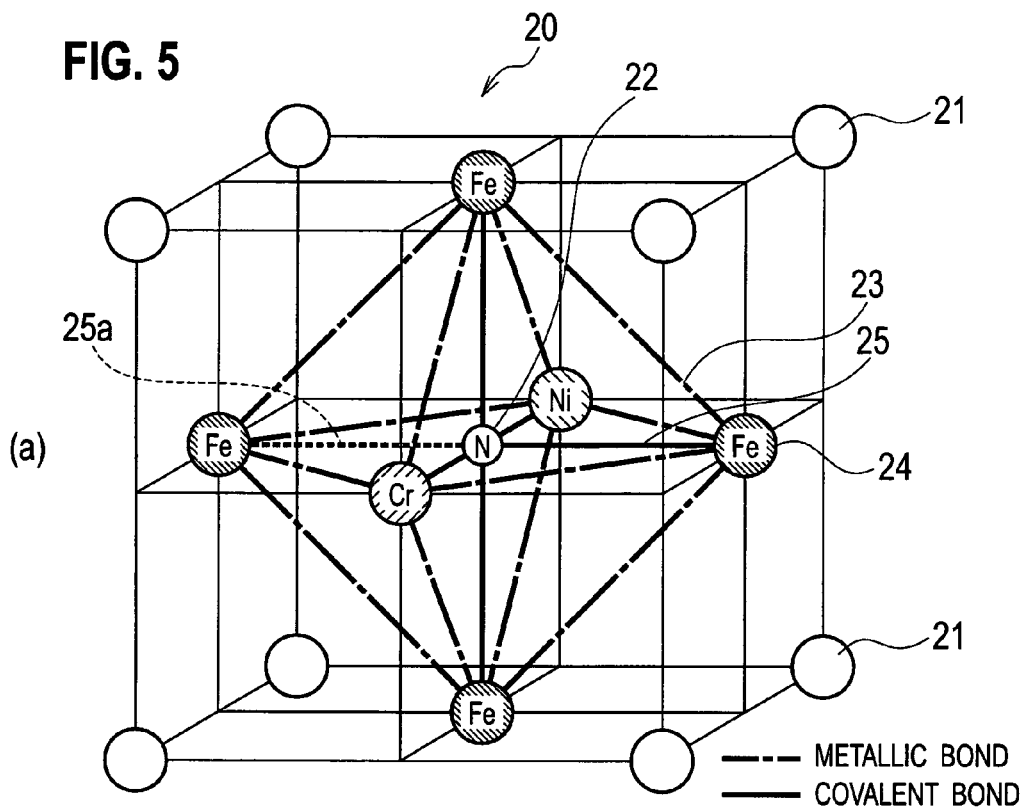
FIG. 5(a) is a schematic diagram of a cubic crystal structure of $M_4N$ type, and FIG. 5(b), a schematic diagram of a hexagonal crystal structure of $M_{2-3}N$ type.
Figure 5:
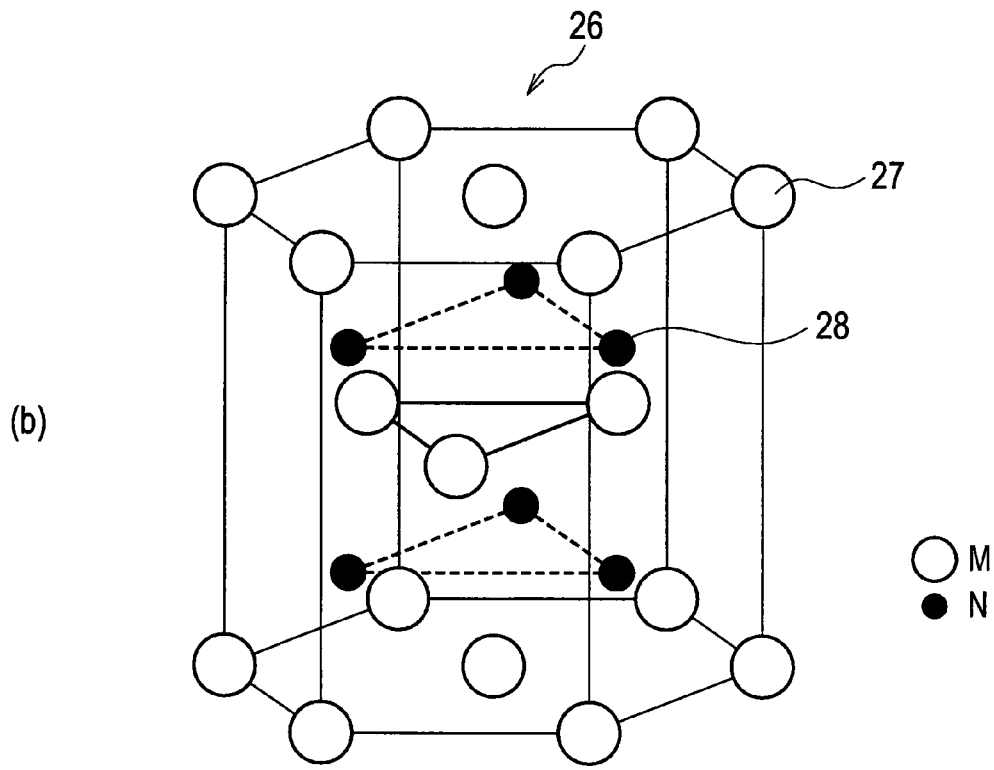

Description is now made into details of crystal structures. FIG. 5(a) is a schematic diagram of a cubic crystal structure of $M_4N$ type, and FIG. 5(b), a schematic diagram of a hexagonal crystal structure of $M_{2-3}N$ type. For an austenitic stainless steel, the crystal structure has a face-centered cubic lattice. For a base material 10 of a crystal structure of the face-centered cubic lattice, when its surface is processed or treated by nitridation, the surface portion 10a has an $M_4N$ crystal structure illustratively shown in FIG. 5(a). That is, there is made a crystal structure 20 of $M_4N$ type in which a nitrogen atom 22, as it has been brought inside a face-centered cubic lattice by the nitriding process or treatment, is disposed in an octahedral void at a unit cell center of the face-centered cubic lattice formed by transition metal atoms (M) 24 (or 21). As used herein, the letter M of the notation $M_4N$ represents a transition metal atom 24 (or 21) selected from among Fe, Cr, Ni, and Mo, and the letter N represents a nitrogen atom 22.

The nitrogen atom 22 occupies a ¼ of the octahedral void at the unit cell center of the $M_4N$ crystal structure 20. That is, the crystal structure 20 of $M_4N$ type is an interstitial solid solution having an interstitial nitrogen atom 22 in an octahedral void at a unit cell center of a face-centered cubic lattice of transition metal atoms 24 (or 21), and the nitrogen atom 22 is located at a lattice coordinate (½, ½, ½) of each unit cell in representation by a space lattice of the cubic crystal. In the $M_4N$ crystal structure 20 illustrated by FIG. 5(a), the transition metal atoms 24 (or 21), which are selective from among Fe, Cr, Ni, and Mo, have Fe as a principal component, while there may well be an alloy having another transition metal atom, such as Cr, Ni, or Mo, substituted for Fe in part.

The $M_4N$ crystal structure is accompanied by, among others, highly dense shift conversions and bicrystals, and has also a hardness as high as 1,000 HV or more, and is considered as a nitride of fcc or fct structure in which nitrogen is oversaturated as a solid solute (Yasumaru, Kamachi; Journal of the Japan Institute of Metals, 50, pp 362-368, 1986). In addition, because of, among others, nitrogen being increased in concentration and CrN kept from becoming a main component, as the location comes nearer to the surface, there should be Cr, which is effective for anti-corrosiveness, kept from getting reduced, thus allowing a corrosion resistance held even after nitridation.

Further, the crystal structure 20 of $M_4N$ type holds each metallic bond 23 between transition metal atoms M (e.g., between an Fe atom 24, and a neighboring Fe, Cr, or Ni atom in FIG. 5(a)), while binding each of those transition metal atoms M with a nitrogen atom N 22 by a strong covalent bond 25, whereby each transition metal atom M 24 (or 21) has a reduced reactivity against oxidation. The nitrided layer 11, which has the $M_4N$ crystal structure 20, is thus excellent in corrosion resistance even in a strongly acidic atmosphere within pH2 to pH4. Moreover, it has a maintained electric conductivity due to metallic bonds 23 between transition metal atoms M 24 (or 21).

In other words, in the crystal structure 20 of $M_4N$ type, metallic bonds 23 are held between transition metal atoms 24 (or 21) selected from among Fe, Cr, Ni, and Mo, while strong covalent bonds 25 are exhibited between a nitrogen atom 22 and transition metal atoms 24 (or 21) selected from among Fe, Cr, Ni, and Mo, whereby each transition metal atom 24 (or 21) selected from among Fe, Cr, Ni, and Mo has a reduced reactivity against oxidation. Therefore, the nitrided layer 11 that has crystal structures 20 of $M_4N$ type has an excellent corrosion resistance in a strongly acidic atmosphere within pH2 to pH4. Moreover, the electric conductivity is maintained by metallic bonds 23 between transition metal atoms 24 (or 21).

Furthermore, like the base layer 12, the crystal structure 20 of $M_4N$ type has the crystal structure of a face-centered cubic lattice. The nitrided layer 11, which is formed on the base layer 12, thus has a good consistency with the base layer 12, permitting electrons to move with ease between the base layer 12 and the nitrided layer 11, allowing for an excellent conductivity of the separator 3 for fuel cells including the nitrided layer 11. It is noted that in FIG. 5(a), designated at reference character 25a is a bond, which also is a covalent bond between transition metal atom M 24 (or 21) and nitrogen atom N 22.

Those transition metal atoms M selected from among Fe, Cr, Ni, and Mo to constitute the $M_4N$ crystal structure 20 may preferably be mixed irregularly. For each of those transition metals, such atoms M are to be dispersed in irregular positions, rendering low component-wise partial molar free energy of that transition metal, allowing for a low-controlled activity of the transition metal atom M.

With this, for the nitrided layer 11, transition metal atoms M 24 (or 21) therein are each allowed to have a low-suppressed reactivity against oxidation. And, the nitrided layer 11 has a chemical stability even under an acidic environment in the fuel cell. As a result, the separator 3 for fuel cells has low-maintained contact resistances with associated electrodes such as carbon paper, so that the separator 3 for fuel cells can have an enhanced durability. Moreover, such low contact resistances can be maintained without forming precious metal films, such as plated gold films, on surfaces where the separator 3 contacts the electrodes, thus allowing for an implemented low cost.

Further, for transition metal atoms M 24 (or 21) selected from among Fe, Cr, Ni, and Mo to constitute a face-centered cubic lattice, it may be preferable to mix them irregularly, for increasing mixture entropy to decrease component-wise partial molar free energy of each transition metal, or to render the activity of each transition metal atom M 24 (or 21) lower than estimable from Raoult's law. This allows each transition metal atom M 24 (or 21) to have the more reduced reactivity against oxidation, with an enhanced chemical stability.

Description is now made of a hexagonal crystal structure 26 of $M_{2-3}N$ type shown in FIG. 5(b). This crystal structure has a crystal lattice, called "close-packed hexagonal, or hexagonal close-packed or closest packed (hcp) lattice", obtainable together with the face-centered cubic (fcc) lattice, when particles as hard spheres (i.e., transition metal atoms M 27 and nitrogen atoms N 28 in FIG. 5(b)) are packed closest to one another.

The hexagonal close-packed (hcp) lattice is different from the face-centered cubic (fcc) lattice, simply in that sixfold-symmetrical close-packed atomic planes are stacked in the order of ABAB to constitute the hcp lattice, and ABCABC to constitute the fcc lattice, where A, B, and C are labels representing positional relationships of atoms. Like this, the hcp lattice and the fcc lattice have mutually deep relationships, such that they are very consistent with each other in a crystallographic sense, as well, allowing for a smooth electron movement in between, with contribution to the electric conductivity.

The hexagonal crystal structure 26 of $M_{2-3}N$ type is formed as follows. In nitrides of crystal structures 20 of $M_4N$ type, solid-solved nitrogen is over-saturated, whereby nitrides of crystal structures of $M_{2-3}N$ type higher in nitrogen content than $M_4N$ type are caused to precipitate on stacking faults of nitrides of crystal structures 20 of $M_4N$ type. That is, in a matrix of $M_4N$ crystal structures 20, stacking faults appear at intervals about several nm on a crystal face, and $M_{2-3}N$ nitrides having interlayer distances about several nm are caused to precipitate layered-like on the stacking faults.

Further, for $M_{2-3}N$ nitrides precipitated layered-like at interlayer distances about several nm on stacking faults in a matrix of $M_4N$ crystal structures 20, the more the amount of nitrogen in those nitrides becomes, i.e., as the amount of nitrogen increases at a depth of 100 nm from the surface portion 11a of nitrided layer 11, the more the chemical stability is enhanced, and the reactivity of each transition metal atom is reduced, so that even under a sulfuric acid environment the contact resistance is suppressed low, and the electric conductivity is maintained.

Figure 6:
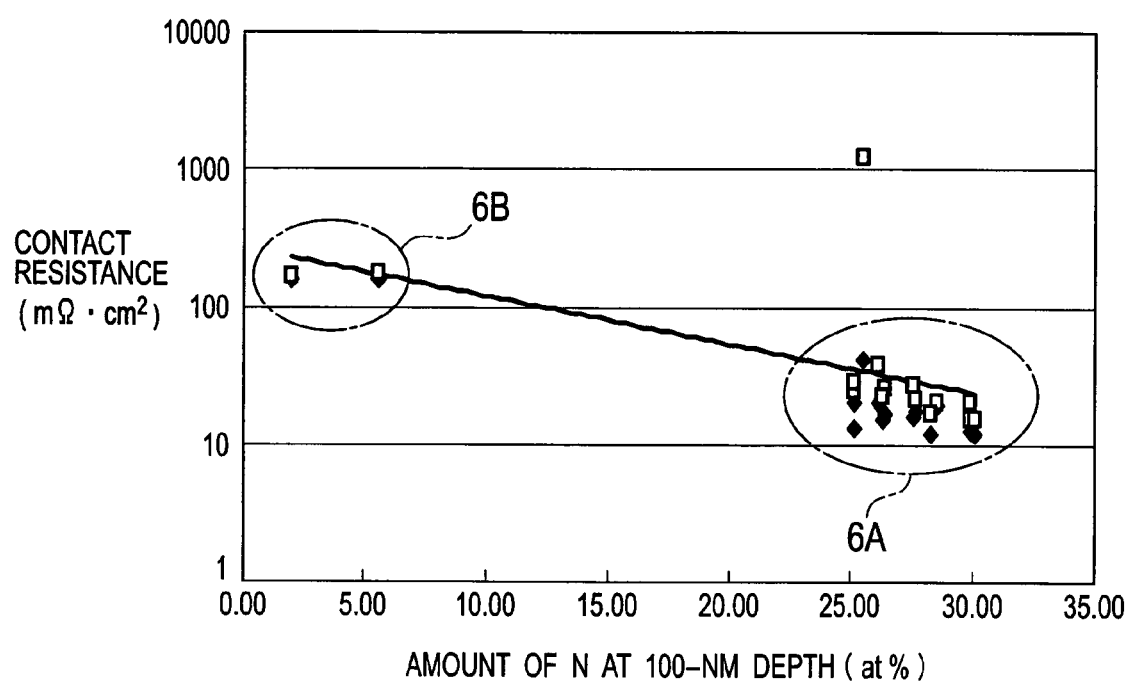
FIG. 6 is a graph showing a relationship of contact resistance vs. nitrogen amount at a 100 nm depth from a surface portion of a nitrided layer.

FIG. 6 shows a relationship of contact resistance vs. nitrogen amount at a 100 nm depth from the surface portion 11a of nitrided layer 11. In FIG. 6, labeled 6A is a region corresponding to a range of nitrogen amount within 25 to 30 at % at the 100 nm depth from the surface portion 11a of nitrided layer 11, where the contact resistance is 100° C. or less. On the other hand, in FIG. 6, labeled 6B is a region corresponding to a range of nitrogen amount within 0 to 10 at % at the 100 nm depth from the surface portion 11a of nitrided layer 11, where the contact resistance is 100 mΩ·cm² or more. Such being the case, as the amount of nitrogen increases at a depth of 100 nm from the surface portion 11a of nitrided layer 11, even under a sulfuric acid environment the more the contact resistance is suppressed low, having a maintained conductivity.

Preferably, the hexagonal $M_{2-3}N$ crystal structure 26 should have Cr as a principal component. Cr is one of transition metal atoms M 24 (or 21) or 27 constituting the cubic $M_4N$ crystal structure 20 or the hexagonal $M_{2-3}N$ crystal structure 26, that is an element highest of affinity with nitrogen atom N among transition metal elements Fe, Cr, Ni, and Mo. Therefore, for austenitic stainless steels containing Fe, Cr, Ni, and Mo with a Cr concentration of 25% or more, the nitridation causes Cr to be incrassated in a surface portion 10a by lattice vibration. As Cr is incrassated in the surface portion 10a of base material 10, the concentration of nitrogen in the surface portion 10a is increased.

Further, according to an embodiment of the present invention, the nitrided layer 11 is obtained by a plasma nitridation, as will be described. The plasma nitridation has a sputtering effect, whereby atoms of Fe most contained in the surface portion 10a of base material 10 are once sputtered from the surface portion 10a, promoting incrassation of Cr. Like this, incrassated Cr is combined with nitrogen due to nitriding treatment, forming Cr nitrides of CrN and $Cr_2N$ having hexagonal close-packed crystal structures in the surface portion 10a of base material 10.

On the other hand, for Cr as an element high of affinity with oxygen, as well, it becomes easy to form on a surface of Cr nitride an electrically conductive passive film of a thickness of several tens nm or less. The passive film is effective for enhancement of corrosion resistance under a sulfonate environment.

FIG. 7(a) shows a relationship of contact resistance vs. Cr amount at a 5 nm depth from the surface portion 10a, FIG. 7(b), a relationship of contact resistance vs. nitrogen amount at the 5 nm depth from the surface portion 10a, and FIG. 7(c), a relationship of elution amount of iron ion vs. oxygen amount at the 5 nm depth from the surface portion 10a.

For nitrides incrassate of Cr and N, observation is now made at the 5 nm depth from the surface portion 10a: in FIG. 7(a), a region labeled 7A corresponds to a range of Cr amount within 15 to 25 at % at the 5 nm depth from the surface portion 10a, where the contact resistance is suppressed lower, as the Cr amount in Cr nitrides increases; and in FIG. 7(b), a region labeled 7B corresponds to a range of nitrogen amount within 25 to 40 at % at the 5 nm depth from the surface portion 10a, where the contact resistance is suppressed lower, as the nitrogen amount in Cr nitrides increases. Further, in FIG. 7(c), a region labeled 7C corresponds to a range of oxygen amount within 10 to 30 at % at the 5 nm depth from the surface portion 10a, where as the oxygen amount in passive film on Cr nitrides increases, the more the elution amount of iron ion is suppressed low, having an excellent corrosion resistance.

Therefore, by provision of a thin and stable passive film formed on nitrides incrassate of Cr and N, the more the contact resistance can be suppressed low, and ion elution can also be controlled, thus affording for the electric conductivity and the contact resistance, as conflicting properties of the separator 3 for fuel cells, to go together, allowing for an excellent performance.

It is noted that, preferably, the first nitrided layer 11b should have a composition including M within a range of 66.8 to 80.0 at %, and N within a range of 20.0 to 33.3 at %, and the second nitrided layer 11c should have a composition including M within a range of 50.0 to 75.0 at %, and N within a range of 25.0 to 50.0 at %.

In this case, metallic atoms and nitrogen atoms are colligated to each other with coordination numbers in just proportion, in a stable bond state, and as a nitride high of Cr and N concentrations, thus getting chemically stable, and excellent in both properties of electric conductivity and corrosion resistance. In this respect, if the combination number of metallic atom or nitrogen atom is excessive or deficient, a resultant unstable chemical state causes both properties of electric conductivity and corrosion resistance to be worsened.

Further, for the first nitrided layer $11b$, preferably, those nitrides which have a cubic crystal structure of $M_4N$ type should have a composition including 80 at % of M and 20.0 at % of N, and those nitrides which have a hexagonal crystal structure of $M_{2-3}N$ type should have a composition including M within a range of 66.6 to 75.0 at % and N within a range of 25.0 to 33.3 at %.

The second nitrided layer $11c$ may preferably have, at a depth of 10 nm or less from the surface portion $11a$, a composition including Cr within a range of 10 to 30 at % and N within a range of 20 to 40 at %, having Cr and N incrassated in part.

In this case, a resultant stacked crystal structure of a nano-level includes a nitride having a cubic crystal structure of $M_4N$ type, and a nitride having a hexagonal crystal structure of $M_{2-3}N$ type, as a texture low of activity, chemically stable, and excellent in both properties of electric conductivity and corrosion resistance. On the contrary, straying from such ranges results in a texture high of activity, chemically unstable, and worsened in both properties of electric conductivity and corrosion resistance.

In the case the second nitrided layer $11c$ contains mainly hexagonal crystal structures of $Cr_2N$, $CrN$, and $M_{2-3}N$ type, and cubic crystal structures of $M_4N$ type, having a configuration that includes irregularly projecting precipitates ($11a'_1$, $11a'_2$, $11a'_3$, etc) at the surface portion $11a'$ of nitrided layer 11, as shown in FIG. 4(c), the amount of those precipitates ($11a'_1$, $11a'_2$, $11a'_3$, etc) has such an effect that, as it gets greater, the contact area with a GDL (gas diffusion layer) increases, allowing for the more excellent conductivity. Therefore, the amount of precipitates ($11a'_1$, $11a'_2$, $11a'_3$, etc) may preferably be within a range of area ratio of 5% or more, more preferably, 10% or more, or yet preferably, 20% or more. Such a range of area ratio affords to have a low-suppressed contact resistance.

Moreover, the surface portion $11a$ of nitrided layer 11 may have a frame of image thereof analysed to judge, from a result of the analysis, the effect of conductivity due to contact between GDL and precipitates ($11a'_1$, $11a'_2$, $11a'_3$, etc). This analysis employs an image analysing method for analysis of an electron microscopic image of the surface portion $11a$ of nitrided layer 11 to quantitatively determine a size distribution of precipitates ($11a'_1$, $11a'_2$, $11a'_3$, etc). By this analysis, it has become apparent that preferably the amount of precipitates ($11a'_1$, $11a'_2$, $11a'_3$, etc) of 4 nm or more in equivalent circle diameter should be within a range of 800 or more in number per area of 100 μm². In this case, when the second nitrided layer $11c$ contacts sheets of carbon paper (as GDL) made of carbon fibers of a sub-micron order, such precipitates ($11a'_1$, $11a'_2$, $11a'_3$, etc) intrude into gaps between carbon fibers, having an increased area (or number) of contact region (or points) between second nitrided layer $11c$ and sheets of carbon paper (as GDL). By such an increase in contact area, the contact resistance is suppressed low, rendering the conductivity excellent.

Precipitates ($11a'_1$, $11a'_2$, $11a'_3$, etc) may preferably be large in number on the surface portion $11a$ of second nitrided layer 11, and preferably be distributed uniform over the surface portion $11a$. This is for an even contact with GDL. Such a nitrided layer that has numerous and evenly distributed precipitates ($11a'_1$, $11a'_2$, $11a'_3$, etc) will be given, if the base material (containing an austenitic stainless steel) to be nitrided has a high concentration of Mo. More specifically, for a base material (including an austenitic stainless steel having a Cr concentration of 25% or more) to be nitrided, the concentration of Mo may preferably reside within a range of 0.5% or more and 3.0% or less. When nitrided, such a base material will have precipitates ($11a'_1$, $11a'_2$, $11a'_3$, etc) not simply segregated along crystal grain boundaries, but evenly deposited in intergranular and intragranular regions. This is because of a controlled Mo content that permits, in a later-described plasma nitriding, Fe and Cr atoms to be once separated from the crystal lattice by a sputtering effect, and reattach to a surface of the base material, allowing grains to grow there with an increased tendency.

It is noted that preferably the base material (including an austenitic stainless steel having a Cr concentration of 25% or more) to be nitrided, i.e., the base layer 12 should meet the following three conditions:

(1) Cr content within a range of 25 wt % or more and 30 wt % or less
(2) Ni content within a range of 20 wt % or more and 26 wt % or less
(3) Mo content within a range of 0.5 wt % or more and 3.0 wt % or less With the above conditions met, it is allowed to obtain a nitrided layer 11 including numerous and evenly distributed precipitates ($11a'_1$, $11a'_2$, $11a'_3$, etc).

Description is now made of a surface of nitrided layer subjected to a dissolution treatment by acid. A stainless steel was plasma-nitrided, and a nitrided layer obtained by the nitridation was dipped in a strongly acidic aqueous solution within a range of pH3 to pH5 under a degassed environment, so that a surface of the nitrided layer was dissolution-treated by acid. Of this surface, an elemental mapping analysis was made by an Auger electron spectroscopy analyzer of field-emission type. As a result, it was turned out that relative to the nitrided layer before dissolution treatment, where the surface had had a composition including Fe as a principal component, the nitrided layer after dissolution treatment had a surface thereof changed to a composition including Cr as a principal component, simply in part having projection-shaped precipitates projecting from the surface.

Further, for the surface of nitrided layer, a sectional observation was made by a field-emission type transmission electron microscope (FE-TEM), and it was turned out that relative to the surface of nitrided layer before dissolution treatment, where projection-shaped precipitates had had a double structure having a surface layer of a crystal structure of $M_4N$ type including Fe as a principal component, and an inside including CrN, the surface of nitrided layer after dissolution treatment had projection-shaped precipitates of a structure simply including CrN, missing a surface layer of a crystal structure of $M_4N$ type including Fe as a principal component, as it had been lost by elution.

This is a nitride having a crystal structure of $M_4N$ type including Fe as a principal component, which is inferior in oxidation resistance to nitrides of Cr system, such as CrN, and tends to be dissolved in a strongly acidic aqueous solution within a range of pH3 to pH5 under a degassed environment close to that of an anodic electrode in an actual fuel cell. And, upon dissolution, it tends to have an oxide film formed on a surface of nitride, causing the conductivity to worsen. To the contrary, those nitrides which include Cr as a principal component, such as CrN, have a superior oxidation resistance to nitrides of $M_4N$ type including Fe as a principal component, so that their dissolution is difficult even in a strongly acidic aqueous solution within a range of pH3 to pH5 under a degassed environment, which constitutes a difficulty in formation of an oxide film on nitride surface upon dissolution, affording to have an excellent conductivity.

In other words, for dissolution treatment by acid of a nitrided layer formed by plasma-nitriding a base material, the nitrided layer thus formed is dipped in a strongly acidic aqueous solution within a range of pH3 to pH5 under a degassed environment, whereby the nitrided layer has a most superficial layer made of nitrides, such as CrN and $Cr_2N$, including Cr as a principal component. That is, for the second nitrided layer after dissolution treatment by acid of transition metal nitride, projecting precipitates at the surface portion have a crystal structure of CrN or $Cr_2N$.

Such being the case, provision of a surface layer having exposed nitrides including Cr as a principal component constitutes a difficulty for the nitrided layer to be dissolved even in an environment close to an anodic electrode in an actual fuel cell. Further, it has an excellent oxidation resistance, thus having an excellent conductivity. If the surface layer had residual nitrides including Fe as a principal component, those nitrides might have been dissolved during corrosion resistance test, causing a concurrent oxidation of nitrides, resulting in a great change between contact resistances before and after the corrosion resistance test. Contrary thereto, having a dissolution treatment by acid made in advance to nitrides including Fe as a principal component, the nitrides now have a surface including Cr as a principal component, with a successfully low-suppressed change between contact resistances before and after corrosion resistance test. Like this, the surface of nitrided layer is rendered stable even in a strongly acidic atmosphere.

It is noted that for precipitates projecting at a surface portion of the second nitrided layer after dissolution treatment by acid, if their amount gets greater, they have an increased contact area with a GDL, and have the more excellent conductivity, as a resultant effect. For this, in terms of an area ratio of precipitation area to a field of view of measurement, the amount of precipitates should at least be within a range of 5% or more, preferably, a range of 10% or more, or yet preferably, a range of 20% or more. Further, for a set of projection-shaped precipitates projecting at a surface portion of the second nitrided layer after dissolution treatment by acid, assuming an equivalent circle diameter of projection-shaped precipitates projecting at a surface portion defined by an image analysis, the larger if this be changed than a smaller, the more excellent their conductivity becomes, subject to the equivalent circle diameter falling within a range of at least 40 nm or more. For the precipitates projecting from a surface region of 40 nm or more in equivalent circle diameter, preferably, their dispersion should be uniform over the surface area, and providing them to be 800 or more in number per area of 10 $\mu m^2$ in the field of view of measurement, the conductivity becomes more excellent, as they have an increased contact area with a GDL.

As having been described, according to an embodiment of the present invention employing the foregoing configuration, a transition metal nitride concurrently has both of mutually conflicting electric conductivity and corrosion resistance.

Moreover, according to an embodiment of the present invention, a separator for fuel cells affords concurrent provision of an electric conductivity, as necessary in the application as a separator for fuel cells, and a chemical stability, as well as a corrosion resistance, for the electrically conductive property to be maintained under an environment using a separator, while allowing for a favorable productivity with a low cost, a low contact resistance to constituent materials such as of an electrode of a neighboring gas diffusion layer, and a favorable contribution to the power generation performance of fuel cells.

Further, according to an embodiment of the present invention, a fuel cell stack employs a separator for fuel cells according to an embodiment of the present invention, allowing for a maintained high efficiency of power generation without damaging performance of power generation, as well as implementation of a compact size at a low cost.

(Method of Manufacturing a Transition Metal Nitride, and Method of Manufacturing a Separator for Fuel Cells)

Description is now made of a method of manufacturing a transition metal nitride, and a method of manufacturing a separator for fuel cells according to embodiments of the present invention.

According to an embodiment of the present invention, a method of manufacturing a transition metal nitride to be formed by nitriding a base material including an austenitic stainless steel having a Cr concentration of 25% or more comprises forming, on a base layer formed by the base material, a first nitrided layer (as a first layer) having a stacked crystal structure of a nano-level including a nitride having a cubic crystal structure of $M_4N$ type, and a nitride having a hexagonal crystal structure of $M_{2-3}N$ type, and having a second nitrided layer (as a second layer) formed continuously on the first nitrided layer, including a nitride having at least one kind of crystal structure out of hexagonal crystal structures of $Cr_2N$, CrN, and $M_{2-3}N$ type, and a cubic crystal structure of $M_4N$ type, and being formed as a surface-nitriding-processed portion of the base material continuously in a depth direction from a surface of the base material.

By this method, there can be obtained a transition metal nitride formed over a base layer formed by a base material, continuously in a depth direction from a surface of the base material. And, the nitride concurrently has both of mutually conflicting electric conductivity and corrosion resistance.

According to an embodiment of the present invention, a method of manufacturing a separator for fuel cells comprises press-forming a passage for a fuel or an oxidizer to a work comprising a base material including an austenitic stainless steel having a Cr concentration of 25% or more, and applying a nitriding process to the work, thereby forming, on a base layer formed by the base material, a first nitrided layer (as a first layer) having a stacked crystal structure of a nano-level including a nitride having a cubic crystal structure of $M_4N$ type, and a nitride having a hexagonal crystal structure of $M_{2-3}N$ type, and having a second nitrided layer (as a second layer) formed continuously on the first nitrided layer, including a nitride having at least one kind of crystal structure out of hexagonal crystal structures of $Cr_2N$, CrN, and $M_{2-3}N$ type, and a cubic crystal structure of $M_4N$ type, and being formed as a surface-nitriding-processed portion of the base material continuously in a depth direction from a surface of the base material.

By this method, there can be formed on a surface of stainless steel a nitrided layer of transition metal nitrides concurrently having both of mutually conflicting electric conductivity and corrosion resistance. As a nitriding process is applied after a press forming, the nitrided layer is kept free of defects such as cracks, thus allowing for provision of a separator for fuel cells abounding in electric conductivity and corrosion resistance.

It is preferable for the base material including an austenitic stainless steel having a Cr concentration of 25% or more to have a Mo concentration within a range of 0.5% or more and 3.0% or less. When nitrided, such a base material has a nitrided layer in which, as illustrated in FIG. 4(c), a second nitrided layer 11c includes mainly hexagonal crystal structures of $Cr_2N$, CrN, and $M_{2-3}N$ type, and cubic crystal structures of $M_4N$ type, and has a structure including irregularly projecting precipitates ($11a'_1$, $11a'_2$, $11a'_3$, etc) at a surface portion $11a'$ of nitrided layer 11.

Figure 8:
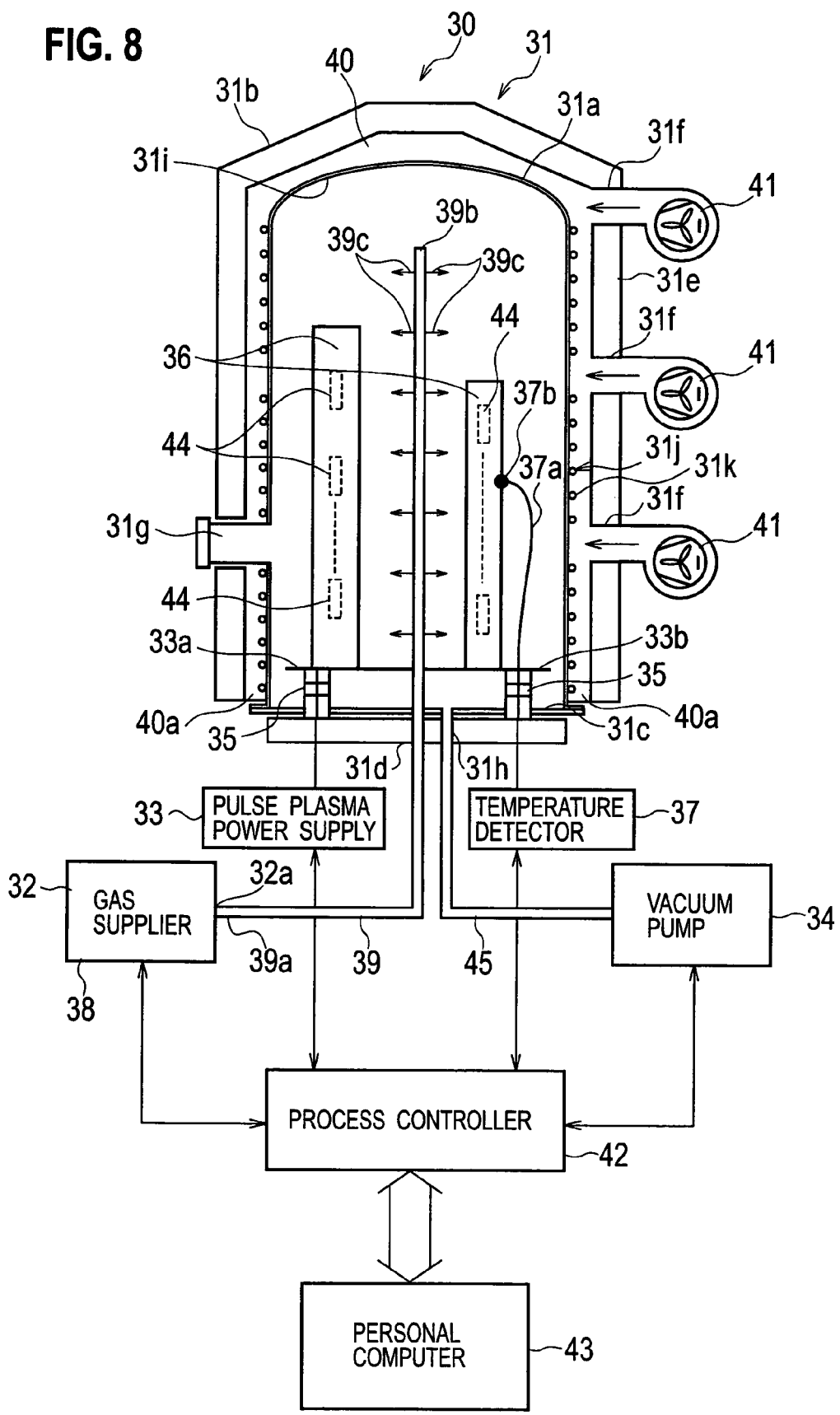
FIG. 8 is a schematic elevation of a nitriding apparatus employed in a method of manufacturing a separator for fuel cells according to an embodiment of the present invention.

Description is now made of the method of manufacturing a separator for fuel cells as well as the method of manufacturing a transition metal nitride, with reference to FIG. 8. FIG. 8 is a schematic elevation of a nitriding apparatus 30 employed in the method of manufacturing a separator for fuel cells as well as the method of manufacturing a transition metal nitride according to an embodiment of the present invention.

The plasma nitriding is a method of having an object to be treated (now a work made of a stainless steel being the base material) as a negative electrode, and imposing a direct-current voltage to generate a glow discharge, i.e., low-temperature nonequilibrium plasma for ionizing part of gas components, to bombard ionized gas components in the nonequilibrium plasma by high speeds onto a surface of the object to be treated, to thereby effect a nitriding.

The nitriding apparatus 30 includes a batch type nitriding furnace 31, a vacuum pump 34 for evacuation of, to give a vacuum pressure to, a vacuum nitriding shell 31a installed in the nitriding furnace 31, a gas supplier 32 for supplying an atmospheric gas to the vacuum nitriding shell 31a, a combination of plasma electrodes 33a and 33b to be charged to a high voltage for generating plasma in the vacuum nitriding shell 31a and a pulse plasma power supply 33 for supplying the electrodes 33a and 33b with a direct-current voltage pulsated to a high-frequency wave of a 45 kHz frequency, and a temperature detector 37 for detecting a temperature in the vacuum nitriding shell 31a.

The nitriding furnace 31 has an outer shell 31b made by a heat-insulating insulation material for accommodating the vacuum nitriding shell 31a, and provided with a plasma observation port 31g. The vacuum nitriding shell 31a has, at its bottom 31c, a system of insulators 35 for holding the plasma electrodes 33a and 33b at a high-voltage potential. Above the plasma electrodes 33a and 33b, there are installed support frames 36 made of a stainless steel. The support frames 36 are configured to support thereon a multiplicity of stainless steel works 44, as they have been pressed to have fuel, oxidizer, and cooling water channels formed therein, as necessary, and machined in a separator form.

The gas supplier 32 includes a gas chamber 38 and a gas supply line 39, the gas chamber 38 having a prescribed number of gas introducing open ports (not shown), which ports communicate with a hydrogen gas supply line (not shown), a nitrogen gas supply line (not shown), and an argon gas supply line (not shown) each respectively provided with a gas supply valve (not shown).

The gas supplier 32 further has a gas supplying open port 32a communicating with one end 39a of the gas supply line 39, the port 32a being provided with a gas supply valve (not shown).

The gas supply line 39 hermetically passes through a bottom 31d of the outer shell 31b as well as the bottom 31c of the vacuum nitriding shell 31a of the nitriding furnace 31, and extends inside the vacuum nitriding shell 31a, to finally constitute a riser 39b rising upright. The riser 39b has a plurality of openings 39c for discharging gases into the vacuum nitriding shell 31a.

The vacuum nitriding shell 31a has an internal gas pressure thereof detected by a gas pressure sensor (not shown) provided at the bottom 31c of the vacuum nitriding shell 31a. The vacuum nitriding shell 31a has on an outer periphery thereof windings of electric conductors 31k of a resistance heating or induction heating heater 31j, and is thereby heated.

Between the vacuum nitriding shell 31a and the outer shell 31b, there is defined an air flow path 40. The outer shell 31b has a side wall 31e, where air blowers 41 are provided for sending air to inflow into the air flow path 40 through openings 31f provided in the side wall 31e of the outer shell 31b. The air flow path 40 has openings 40a, where air outflows. The vacuum pump 34 is adapted to effect evacuation through an evacuation line 45 communicating with an open port 31h in the bottom 31c of the vacuum nitriding shell 31a.

The temperature detector 37 is connected to a temperature sensor 37b (e.g., thermocouple) via a signal line 37a extending through the bottoms 31c and 31d of vacuum nitriding shell 31a and outer shell 31b and the plasma electrodes 33a and 33b.

The pulse plasma power supply 33 receives a control signal from a process controller 42, whereby it is turned on and off. Each stainless steel work 44 has, relative to a grounded end (for example, an inner wall 31i of the vacuum nitriding shell 31a), a potential difference corresponding to a voltage supplied from the pulse plasma power supply 33. Also the gas supplier 32, vacuum pump 34, temperature detector 37, and gas pressure sensor are controlled by the process controller 42, while the process controller 42 is operated by a personal computer 43.

Description is made into details of a plasma nitriding or plasma nitridation employed in embodiments of the present invention. First, as objects to be treated, stainless steel works 44 are arranged in the nitriding furnace 31, of which an inside is evacuated to a vacuum of 1 Torr (=133 Pa) or less. Next, a mixed gas of hydrogen gas and argon gas is introduced in the nitriding furnace 31, and thereafter, at a degree of vacuum within several Torr to dozen or more Torr (665 Pa to 2,128 Pa), a voltage is applied between each stainless steel work 44 as a negative electrode and the inner wall 31i of vacuum nitriding shell 31 as a positive electrode. In this case, the stainless steel work 44 as a negative electrode has a glow discharge caused thereon, so that the stainless steel work 44 is heated and nitrided by the glow discharge.

For the manufacturing methods according to embodiments of the present invention, as a first process, there is performed a sputter cleaning to remove passive films of surfaces of stainless steel works 44. In the sputter cleaning, introduced gases are ionized into hydrogen ions, argon ions, and the like, which collide on surfaces of stainless steel works 44, removing their oxide films that have Cr as a main component.

As a second process, after the spatter cleaning, a mixed gas of hydrogen gas and nitrogen gas is introduced in the nitriding furnace 31, and a voltage is applied to have a glow discharge caused on each work 44 being a negative electrode. In this occasion, ionized nitrogen collides on, invades, and diffuses in a surface of the work 44, whereby the surface of work 44 has a continuous nitrided layer formed therein with $M_4N$ crystal structures. Concurrently with formation of the nitrided layer, there is caused a reduction reaction in which ionized hydrogen reacts with oxygen in the surface of work 44, whereby oxide films formed in the surface of work 44 are removed.

In the first process as well as the second process, very hot ions such as of hydrogen, argon, and nitrogen collide on and invade into a surface of base material, strongly heating fine local regions in the surface of base material. And, metallic atoms of alloy elements, such as Fe, Cr, and Mo, contained in the base material are separated by a sputtering effect, and vaporized.

Metallic atoms of alloy elements such as Fe, Cr, and Mo thus separated and vaporized are once bonded with such nitrogen that resides in plasma near the surface of base material and is highly activated, and thereafter, are precipitated as nitrides on the surface of base material.

In the first process as well as the second process, if the temperature of treatment is relatively low, i.e., 400° C. or below, ions such as of hydrogen, argon, and nitrogen have low collision energy, when colliding on the surface of base material, and metallic atoms of alloy elements, such as Fe, Cr, and Mo, contained in the base material have a reduced tendency to be separated and vaporized by the sputtering effect. For such nitridation, a resultant nitrided layer has a smooth surface, which has a small amount of or little precipitates deposited as projection-shaped nitrides projecting at the surface.

On the contrary, if the temperature of treatment becomes 400° C. or higher, ions such as of hydrogen, argon, and nitrogen have high collision energy, when colliding on the surface of base material, and metallic atoms of alloy elements, such as Fe, Cr, and Mo, contained in the base material have an enhanced tendency to be separated and vaporized by the sputtering effect. As a result, the nitrided layer has an increased amount of projection-shaped nitrides precipitated on the surface.

It is noted that metallic atoms of Fe, Cr, and Mo have their tendencies for vaporization, which are compared by their melting points to be 1,539° C. for Fe and 1,900° C. for Cr, while as high as 2,622° C. for Mo, which means a difficulty in vaporization, as is known.

For the base material to be nitrided, as it includes an austenitic stainless steel having a Cr concentration of 25 or more, preferably, the Mo concentration should be within a range of 0.5% or more and 3.0% or less. With an increased Mo content, the second nitrided layer includes mainly hexagonal crystal structures of $Cr_2N$, CrN, and $M_{2-3}N$ type, and cubic crystal structures of $M_4N$ type, and has a structure including irregularly projecting precipitates at a surface portion of nitrided layer.

For Mo, which inherently has a difficulty in vaporization and is a substitution type that expands a lattice distortion, if the content is increased to some extent, an fcc crystal lattice is to be formed. Moreover, the addition of Mo has an effect of providing Fe and Cr with an increased tendency to separate from the lattice, causing the number of granular nitrides to increase. Further, the addition of Mo has an effect to reduce intergranular segregation of Cr or such, thus causing projection-shaped desirable precipitates to be evenly dispersed in intergranular and intragranular regions of crystal. It is noted the effect of Mo addition tends to appear for a range of a 0.5% or more, and that the corrosion resistance may be worsen within a range exceeding 3.0% where a sigma phase tends to precipitate on crystal grain boundaries.

It is noted that in this plasma nitriding, the reaction in the surface of work 44 is not any equilibrium reaction, but a nonequilibrium reaction, and for temperatures of treatment within 400° C. or more and 450° C. or less, a transition metal nitride containing $M_4N$ crystal structures of high nitrogen concentration is quickly formed in a depth direction from the surface of work 44, and this nitride abounds in electric conductivity and corrosion resistance.

To the contrary, those nitriding methods in which nitridation proceeds as an equilibrium reaction under atmospheric pressure, such as a gas nitriding method, if applied, will suffer a difficulty to remove a passive film of work surface, and because of the equilibrium reaction, need a long time to form $M_4N$ crystal structures in the work surface, in addition to the difficulty to obtain a desirable nitrogen concentration. Thus, with oxide films residing in work surface, the electric conductivity may be worsened, and chemical stability may be failed, so it may be difficult for a nitride or nitrided layer obtained by such a nitriding method to have a maintained conductivity in a strongly acidic atmosphere.

It is preferable to use a pulse plasma power supply as a power supply in embodiments of the present invention.

As a power supply to be used for plasma nitriding methods, typically used is a direct-current power supply, which applies a direct-current voltage, detects an associated discharge current by a current detector, and has a direct-current waveform controlled by a thyristor to provide a prescribed current. In this case, a glow discharge is continuously sustained, and if the temperature of a base material is measured by a radiation thermometer, the base material temperature is varied within a range of about minus 30° C. to plus 30° C.

Contrary thereto, the pulse plasma power supply is configured with a high-frequency cutoff circuit using a thyristor and a direct-current voltage, and by this circuit, the waveform of direct-current power supply is made as a pulsing waveform for the glow discharge to repeat turning on and off. In this case, such a pulse plasma power supply is employed that has a period of time for plasma discharge and a period of time for plasma interruption, set within 1 to 1,000 μsec, to repeat discharge and interruption for the plasma nitriding to be implemented, and if the temperature of a base material is measured by a radiation thermometer, the base material temperature is varied within a range of about minus 5° C. to plus 5° C.

To obtain a transition metal nitride with a high nitrogen concentration, a precise temperature control of base material temperature is necessary, and it is preferable to use a pulse plasma power supply adapted to repeat a discharge and an interruption of plasma by a period within 1 to 1,000 μsec.

Further, for the base material to be nitriding-processed, the temperature may preferably be within a range of 400° C. or more and 450° C. or less. If the surface of stainless steel material is nitriding-processed at a higher temperature, nitrogen may be colligated with Cr in the base material, so that mainly Cr nitrides are precipitated as a lump or layer within a range of thickness of sub-micrometers exceeding a level of several nanometers, causing a Cr-deficient layer to be formed in part of nitrided layer, resulting in a reduced corrosion resistance of separator for fuel cells.

To this point, for the nitriding process to be applied, if the temperature is kept within a range of 400° C. or more and 450° C. or less, it is allowed to obtain a transition metal nitride comprising: a first nitrided layer formed on a base layer formed by the base material, having a stacked crystal structure of a nano-level including a nitride having a cubic crystal structure of $M_4N$ type, and a nitride having a hexagonal crystal structure of $M_{2-3}N$ type; and a second nitrided layer formed continuously on the first nitrided layer, including a nitride having at least one kind of crystal structure out of hexagonal crystal structures of $Cr_2N$, CrN, and $M_{2-3}N$ type, and a cubic crystal structure of $M_4N$ type, and being formed as a surface-nitriding-processed portion of the base material continuously in a depth direction from a surface of the base material.

It is noted that if the nitriding temperature is lower than 400° C., it may take a long time to obtain the first nitrided layer, and the productivity may be worsened. Thus, preferably, the nitriding process should be performed within a temperature range of 400° C. or more and 450° C. or less.

Further, to obtain nitrides incrassate of Cr and N, a stainless steel is employed as the base material, of which Cr concentration should be high as desirable, and in particular, the Cr concentration may preferably be 25% or more. Cr has a high affinity to nitrogen, and the use of a stainless steel high of Cr concentration permits, even at such locations of base material as difficult for plasma to go around in plasma nitridation, e.g. at grooves, formation of nitrides to be effected like other parts.

Description is now made of a dissolution treatment by acid after plasma nitriding.

A base material including a stainless steel is plasma-nitrided, and a nitrided layer obtained by the nitridation is dipped in a strongly acidic aqueous solution within a range of pH3 to pH5 under a degassed environment, so that a surface of the nitrided layer (i.e. surface of second nitrided layer) is dissolution-treated by acid.

Transition metal nitrides such as $M_4N$ type including Fe as a principal component, as well as transition metal nitrides such as CrN including Cr as a principal component, tend to be eluted when dipped in a strongly acidic aqueous solution under a degassed environment having a low oxygen partial pressure, but will be little eluted under an atmospheric open environment having a high oxygen partial pressure, even when dipped in a strongly acidic aqueous solution.

To this point, even under a degassed environment, if dipped in a strongly acidic aqueous solution having a pH value smaller than pH3 (in particular, about pH2), those transition metal nitrides including Fe as a principal component, such as $M_4N$ type, and those transition metal nitrides including Cr as a principal component, such as CrN, are both eluted, so that almost all granular nitrides are dissolved.

On the other hand, if dipped in a solution having a pH value greater than pH5, those transition metal nitrides including Fe as a principal component, such as $M_4N$ type, and those transition metal nitrides including Cr as a principal component, such as CrN, will be both difficult to be eluted.

Transition metal nitrides including Cr as a principal component are more excellent in oxidation resistance than transition metal nitrides including Fe as a principal component, and when dipped in a strongly acidic aqueous solution within a range of pH3 to pH5 under a degassed environment, transition metal nitrides including Fe as a principal component are eluted, leaving transition metal nitrides including Cr as a principal component, as a main component on the surface of nitrided layer.

Like this, the surface of nitrided layer is given in advance a structure excellent in acid resistance, and thereby chemically stabilized. And, by the dissolution treatment by acid, there is provided a separator for fuel cells with much conductivity and corrosion resistance.

Such being the case, in accordance with a method of manufacturing a transition metal nitride and a method of manufacturing a separator for fuel cells according to embodiments of the present invention, it is allowed to obtain such a separator for fuel cells that is formed with a nitrided layer including transition metal nitrides excellent in conductivity and corrosion resistance. It also is allowed to manufacture a separator for fuel cells in a facilitated manner at a low cost.

(Fuel Cell Vehicle)

Description is now made of a fuel cell vehicle according to an embodiment of the present invention, as it is embodied in the form of a fuel cell electric automobile having as its power source a fuel cell stack manufactured in a described manner.

Figure 9:
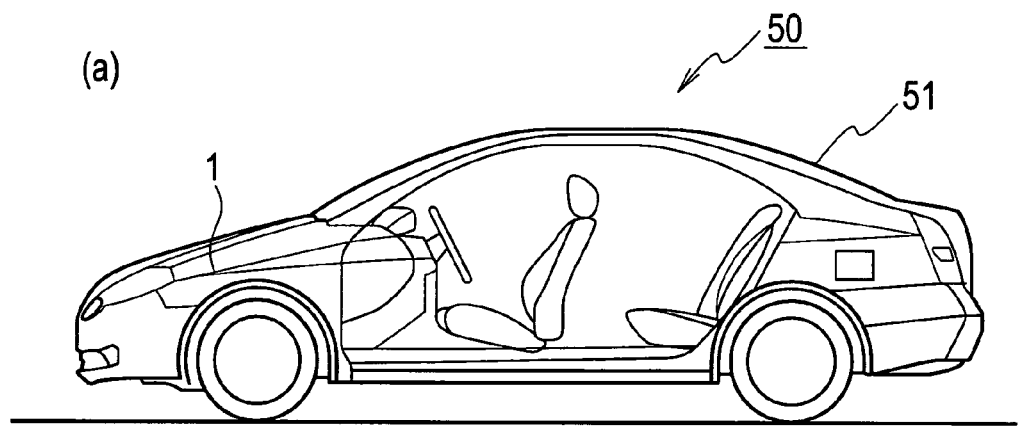
FIG. 9(a) is a side view of an electric automobile with a fuel cell stack according to an embodiment of the present invention, and FIG. 9(b), a top view of the electric automobile.
Figure 9:
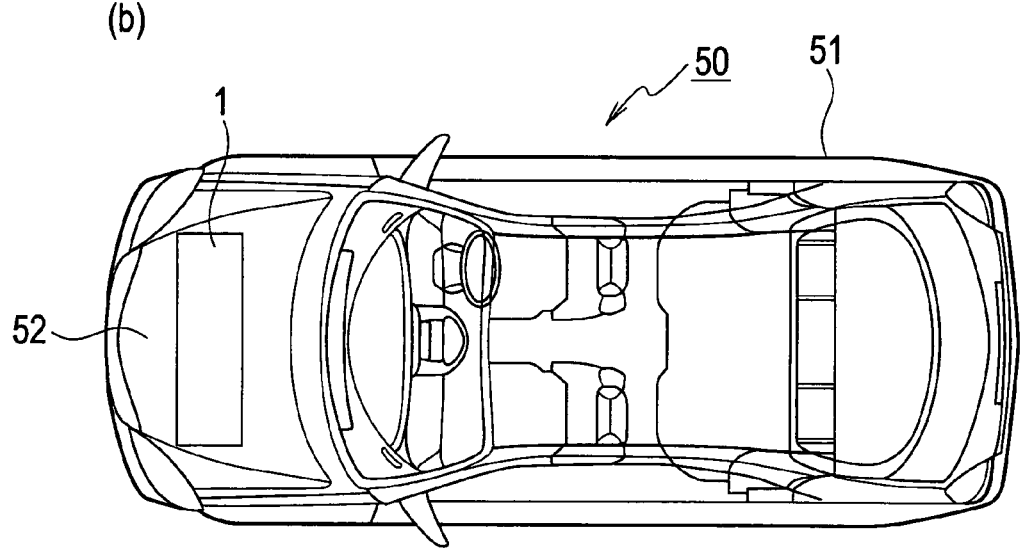

FIG. 9 shows appearances of a fuel cell electric automobile 50 in which a fuel cell stack 1 is mounted. FIG. 9(a) is a side view of the electric automobile 50, and FIG. 9(b), a top view of the electric automobile 50. As shown in FIG. 9(b), in front of a vehicle body 51, there is formed an engine compartment portion 52 having assembled and joined up, by welding, left and right front side members and hood ridges, and besides, a dash lower member interconnecting the left and right food ridges with the front side members inclusive. In the electric automobile 50 according to the present embodiment, the fuel cell stack 1 is mounted in the engine compartment portion 52.

A fuel cell separator according to an embodiment of the present invention is applied to the fuel cell stack 1, which has a high efficiency of power generation and is mountable to a mobile vehicle such as an automobile, allowing for an improved fuel consumption of a fuel cell electric automobile. Further, according to the present embodiment, the fuel cell stack 1 may be small-sized and light-weighted to mount on a vehicle, thereby reducing the vehicle weight, allowing for a saved fuel consumption, and an extended long travel distance. Further, according to the present embodiment, a compact fuel cell may be mounted as a power source such as on a mobile vehicle, thereby allowing a space in a passenger room to be wide utilized, allowing for a secured styling flexibility.

Although an electric automobile has been described as an example of fuel cell vehicle, the present invention is not restricted to a car vehicle such as an electric automobile, and is applicable also to an air carrier or other machinery requiring electric energy.

Description will be made of embodiment example 1 to embodiment example 16 of a separator for fuel cells according to an embodiment of the present invention, and of comparative example 1 to comparative example 6. For those embodiment examples, different raw materials were processed under different conditions to prepare samples for examination of efficacy of a separator for fuel cells according to the present invention, and the illustrative embodiment examples should not be construed restrictive.

<Preparation of Samples>

For each of embodiment examples and comparative examples, as a base material for works, there was employed a 100×100 mm square plate as a 0.1 mm thick vacuum annealed material of a raw material having a chemical composition shown in Table 1 below. A press-formed work of separator was acid-pickled, and thereafter, both sides of the vacuum annealed material were plasma nitrided by micropulse direct-current glow discharge plasma. Conditions of the plasma nitridation were nitriding temperatures within a range of 300 to 500° C., nitriding time of 60 min, gas mixing ratio $N_2:H_2=7:3$ when nitriding, and treating pressure of 3 Torr (=399 Pa).

For samples of comparative example 1, no plasma nitriding treatment was applied. For comparative example 2, instead of plasma nitridation, a gas nitriding treatment was employed. For comparative example 3, instead of micropulse direct-current plasma nitriding treatment, there was employed a direct-current plasma nitridation repeating discharge and interruption for periods of a micro-second order between a plasma discharging time and a plasma interrupting time, without using a micropulse power supply. For comparative example 4, instead of using an austenitic stainless steel having a Cr concentration of 25% or more, there was employed an austenitic stainless steel having a Cr concentration of 18%.

Table 1 shows, for each of embodiment examples and comparative examples, Cr, Ni, and Mo amounts of a stainless steel employed as a base material, whether or not plasma nitridation was applied, an employed plasma power supply, and a controlled temperature for nitridation.

TABLE 1

| | Base material chemical composition (wt %) with residual Fe | | | Nitriding method | Used plasma power supply | Sample surface temperature |
|---|---|---|---|---|---|---|
| | Cr | Ni | Mo | — | — | Degrees C. |
| Embodiment example 1 | 25.0 | 23.0 | 1.5 | Plasma nitriding | Pulse | 400 |
| Embodiment example 2 | 25.0 | 23.0 | 1.5 | Plasma nitriding | Pulse | 425 |
| Embodiment example 3 | 25.0 | 23.0 | 1.5 | Plasma nitriding | Pulse | 450 |
| Embodiment example 4 | 25.0 | 20.0 | 0.5 | Plasma nitriding | Pulse | 425 |
| Embodiment example 5 | 25.0 | 20.0 | 1.5 | Plasma nitriding | Pulse | 425 |
| Embodiment example 6 | 25.0 | 23.0 | 2.5 | Plasma nitriding | Pulse | 425 |
| Embodiment example 7 | 25.0 | 23.0 | 2.5 | Plasma nitriding | Pulse | 450 |
| Embodiment example 8 | 26.0 | 20.0 | 1.5 | Plasma nitriding | Pulse | 425 |
| Embodiment example 9 | 27.0 | 20.0 | 1.5 | Plasma nitriding | Pulse | 425 |
| Embodiment example 10 | 28.0 | 23.0 | 0.0 | Plasma nitriding | Pulse | 425 |
| Embodiment example 11 | 28.0 | 23.0 | 2.5 | Plasma nitriding | Pulse | 425 |
| Embodiment example 12 | 28.0 | 23.0 | 3.0 | Plasma nitriding | Pulse | 450 |
| Embodiment example 13 | 28.0 | 25.0 | 1.5 | Plasma nitriding | Pulse | 425 |
| Embodiment example 14 | 29.0 | 24.0 | 1.5 | Plasma nitriding | Pulse | 425 |
| Embodiment example 15 | 30.0 | 26.0 | 1.5 | Plasma nitriding | Pulse | 425 |
| Embodiment example 16 | 25.0 | 20.0 | 0.0 | Plasma nitriding | Pulse | 425 |
| Comparative example 1 | 25.0 | 23.0 | 1.5 | None | — | — |
| Comparative example 2 | 25.0 | 23.0 | 1.5 | Gas nitriding | — | 450 |
| Comparative example 3 | 25.0 | 23.0 | 1.5 | Plasma nitriding | Direct current | 450 |
| Comparative example 4 | 18.0 | 12.0 | 1.5 | Plasma nitriding | Pulse | 425 |
| Comparative example 5 | 25.0 | 23.0 | 1.5 | Plasma nitriding | Pulse | 300 |
| Comparative example 6 | 25.0 | 23.0 | 1.5 | Plasma nitriding | Pulse | 500 |

Obtained samples were evaluated by the following methods.

<Identification of Crystal Structure of Base Layer>

For identification of crystal structure of base layer, a surface of base material property-modified by nitridation was identified by an X-ray diffraction measurement. For the apparatus, a Mac Science Co. make X-ray diffraction apparatus (XRD) was employed. For the measurement, conditions were radiation source to be a CuK-alpha beam, diffraction angle within 20 to 100° C., and scan speed 2° C./min.

<Observation of Nitrided Layer, Identification of Crystal Structure of Nitrides in Most Superficial Layer, Observation of Form, and Nitrided Layer Thickness and Projection-Shaped Nitrides' Maximal Height Measurements>

For samples obtained by the above-noted methods, their nitrided layers were observed. As a method for observation, using a focused ion beam apparatus (FIB), Hitachi Ltd make FB200A, and an FIB-micro sampling method, a sample of thin film near TEM observation surface was prepared, which was observed by using a field-emission type transmission electron microscope (Hitachi Ltd make HF-2000) at a 200 kV.

<Element Mapping of Projection-Shaped Nitrides Projecting from a Nitrided Layer Surface>

Using a field-emission type Auger electron spectroscopy analyzer (FE-AES) (PHI Co. make SAM-700), a sample surface was sputtered with an electron beam current value 10 nA, by an Ar ion sputter 1 kV, and at a sputtering time of 1 min, the sample surface was observed.

<Measurement of Nitrogen Amount and Oxygen Amount of Nitrided Layer>

For nitrogen amount and oxygen amount in a nitrided layer, that is, within a range down to a 200 nm depth from a surface of the nitrided layer, measurements of nitrogen amounts and oxygen amounts in superficial layers of the nitrided layer were made by a depth profile measurement of Auger electron spectroscopy. Table 2 shows amounts of Fe, Ni, Cr, N, and O in a most superficial surface, that is, at a 0 nm depth, at a 2 nm depth, at a 5 nm depth, at a 10 nm depth, at a 50 nm depth, and at a 100 nm depth. For the measurement, a scanning Auger electron spectroscopy analyzer (PHI Co. make model 4300) was used under conditions of electron beam acceleration voltage 5 kV, measurement region 20 μm×16 μm, ion gun acceleration voltage 3 kV, and sputtering rate 10 nm/min (converted to $SiO_2$).

<Measurement of Contact Resistance>

Figure 10:
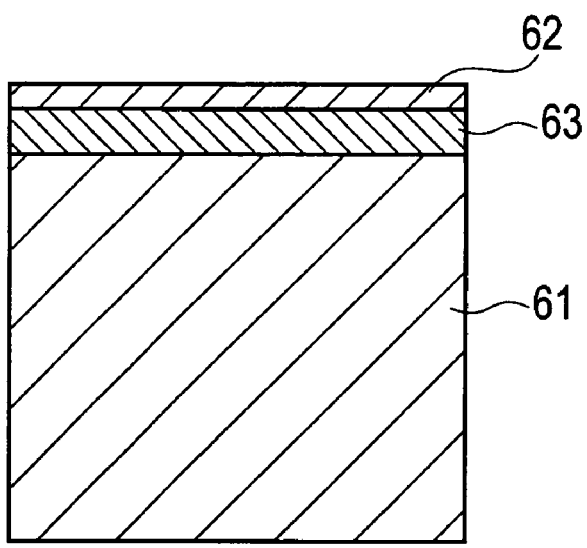
FIG. 10(a) is a schematic diagram for description of a method of measuring a contact resistance as applied to samples from embodiment examples, and FIG. 10(b), a schematic diagram for description of a device employed for the method of measuring a contact resistance.
Figure 10:
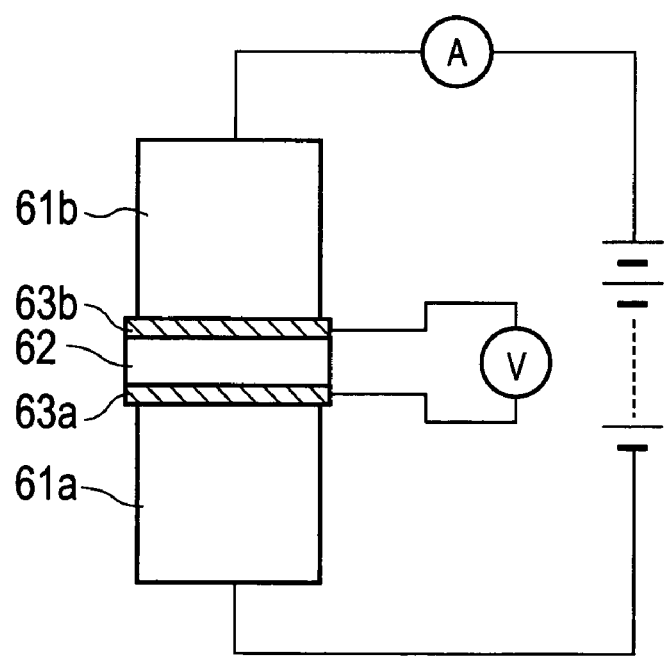

Samples from embodiment example 1 to embodiment example 16 and comparative example 1 to comparative example 6 were cut in a size of 30 mm×30 mm for measurement of contact resistance. For the apparatus, Ulvac-Riko make pressure load contact electrical resistance measurement device model TRS-2000 was employed. And, as shown in FIG. 10(a), a carbon paper 63 was put between electrode 61 and sample 62, and as shown in FIG. 10(b), a set was arranged such that electrode 61a/carbon paper 63a/sample 62/carbon paper 63b/electrode 61b. Then, the electric resistance was measured twice by conducting a current of 1 $A/cm^2$ under a measurement surface pressure 1.0 MPa, and an average of electric resistances was determined as a contact resistance.

It is noted that this contact resistance was measured twice, i.e., before and after a later-described corrosion resistance test, while the contact resistance after corrosion resistance test was for evaluation of corrosion resistance under an oxidizing environment simulating an environment for a separator for fuel cells to be exposed inside a fuel cell stack. For the carbon paper, employed was a carbon paper coated with platinum catalyst supported by carbon black (Toray (Inc.) make carbon paper TGP-H-090, thickness 0.26 mm, bulk density 0.49 $g/cm^3$, porosity 73%, and thickness-directional volume resistivity 0.07 $Ω·cm^2$. For the electrodes, a Cu electrode of a 20 mm diameter was employed.

<Evaluation of Corrosion Resistance>

Fuel cells have a potential of about 1 V vs. SHE at maximum developed on the oxygen electrode side relative to the hydrogen electrode side. Further, the solid polymer electrolyte membrane makes use of a proton conductivity that the polymer electrolyte membrane, which has proton-exchange groups such as sulfonate groups in the molecule, exhibits when saturatedly moisturized, and has a strong acidity. Therefore, for estimation of corrosion resistance, using a controlled-potential electrolysis test as an electrochemical measure, a prescribed constant potential was applied, and after this state was held for a constant time, the amount of metallic ions having eluted till then in a solution was measured by an X-ray fluorescence spectroscopy, and from the value of metallic ion elution amount, the degree of reduction of corrosion resistance was evaluated.

More specifically, first, a central portion of each sample was cut out in a size of 30 mm×30 mm, thereby preparing a sample, and the prepared sample was held in a sulfuric acid aqueous solution of pH4, at a temperature of 80° C., for 100 hours. In this occasion, for simulation of an anode electrode environment, $N_2$ gases were degassed, and for simulation of a cathode electrode environment, an atmospheric open state was established. Thereafter, elution amounts of Fe, Cr, and Ni ions having eluted in the sulfuric acid aqueous solution were measured by the X-ray fluorescence spectroscopy.

<Dissolution Treatment by Acid>

After a dipping of 100 hours in an $N_2$ degassed pH5 sulfuric acid aqueous solution of 80° C., the surface was washed and dried.

<Image Analysis>

An electron microscope observation of sample surface was made. For the observation, a field-emission type scanning electron microscope (Hitachi Ltd Model S-4000) was employed. Samples were cut into a size of 5 mm square, and the surfaces were cleaned with ethanol, before observation. The magnification ratio of observation was 10,000. A scanning electron microscope image was obtained as a matrix of digital data of 2,080 pixels×1,650 pixels. This field of vision corresponds to a range of 12 μm×7.5 μm in actual dimensions.

With respect to the electron microscope image, using a measure of image analysis, it was attempted to quantitatively determine a distribution of sizes of projection-shaped precipitates. For the analysis, employed was an image analyzing software application "A-Zou Kun (Mr. Image)" (Asahi Kasei Engineering Co. Ltd.).

First, the size of image frame was once half-scaled to 1,040 pixels×825 pixels. Then, from this scaled-down image frame, a region of 1,039 pixels×764 pixels was adequately cut out. This operation was to remove letters, such as of scale and notes, included in the original electron microscope image, from a region for the quantitative determination.

By "grain analysis" operation of the "A-Zou Kun" to an image frame of 1,039 pixels×764 pixels, "correspondent circle diameters" and "areas" were output. Parametric settings in the analysis were as follows. The term "correspondent circle diameter" is a quantity to be defined relative to a figure having a certain area, and as defined by the name, means a diameter of a circle that has the same area.

<Parameters for Analysis>

| | |
|---|---|
| Brightness of particle | bright |
| Binary coding method | automatic |
| Range specification | no |
| Outer edge correction | no |
| Blank-filling | no |
| Small figure remova | 1500 nm² (no particles smaller in area to be counted) |
| Correction method | scale down |
| Scale-down separation | 100 times, 10 for small figures, 1000 for contact degree |
| Noise-cancelling filter | yes |
| Shading | yes |
| Shading size | 20 |
| Result indication | nm |

By the image analysis, there was obtained a binary coded image of measurement region. A set of thus obtained data was statistically processed by an application of table calculation software, to determine the number of projection-shaped precipitates for each of adequate intervals of correspondent circle diameters, as well as a total area sum of projection-shaped precipitates of that interval.

Those intrided layers formed by nitridation in embodiment example 1 to embodiment example 16 and comparative example 1 to comparative example 6 had their crystal structures, tissues, forms, layer thickness of laminar intrides, maximal heights of projection-shaped precipitates projecting from surfaces, area ratios per unit area of projection-shaped precipitates projecting from surfaces by image analysis, and numbers per unit area of 10 μ·m² of projection-shaped precipitates projecting from surfaces of equivalent circle diameters of 40 nm or more, as well as amounts at % of Fe, Ni, Cr, N, and O at a 0 nm depth (most superficial surface), a 2 nm depth, a 5 nm depth, a 10 nm depth, a 50 nm depth, and a 100 nm depth by depth profile measurement of Auger electron spectroscopy, contact resistances before and after dipping test, differences between contact resistances before and after dipping test, and elution amounts of Fe, Ni, and Cr ions in test solutions, of which measurement results are listed in Table 2 to Table 10 below.

TABLE 2

| | Base layer | | Nitrides neighboring base layer | |
|---|---|---|---|---|
| | Crystal structure | Texture | Crystal structure | Texture |
| Embodiment example 1 | fcc | γ | fcc + hcp | $M_4N + M_{2-3}N$ lamination |
| Embodiment example 2 | fcc | γ | fcc + hcp | $M_4N + M_{2-3}N$ lamination |
| Embodiment example 3 | fcc | γ | fcc + hcp | $M_4N + M_{2-3}N$ lamination |
| Embodiment example 4 | fcc | γ | fcc + hcp | $M_4N + M_{2-3}N$ lamination |
| Embodiment example 5 | fcc | γ | fcc + hcp | $M_4N + M_{2-3}N$ lamination |
| Embodiment example 6 | fcc | γ | fcc + hcp | $M_4N + M_{2-3}N$ lamination |
| Embodiment example 7 | fcc | γ | fcc + hcp | $M_4N + M_{2-3}N$ lamination |
| Embodiment example 8 | fcc | γ | fcc + hcp | $M_4N + M_{2-3}N$ lamination |
| Embodiment example 9 | fcc | γ | fcc + hcp | $M_4N + M_{2-3}N$ lamination |
| Embodiment example 10 | fcc | γ | fcc + hcp | $M_4N + M_{2-3}N$ lamination |
| Embodiment example 11 | fcc | γ | fcc + hcp | $M_4N + M_{2-3}N$ lamination |
| Embodiment example 12 | fcc | γ | fcc + hcp | $M_4N + M_{2-3}N$ lamination |
| Embodiment example 13 | fcc | γ | fcc + hcp | $M_4N + M_{2-3}N$ lamination |
| Embodiment example 14 | fcc | γ | fcc + hcp | $M_4N + M_{2-3}N$ lamination |
| Embodiment example 15 | fcc | γ | fcc + hcp | $M_4N + M_{2-3}N$ lamination |
| Embodiment example 16 | fcc | γ | fcc | $M_4N + M_{2-3}N$ lamination |

TABLE 2-continued

|  | Base layer | | Nitrides neighboring base layer | |
|---|---|---|---|---|
|  | Crystal structure | Texture | Crystal structure | Texture |
| Comparative example 1 | fcc | γ | fcc | γ |
| Comparative example 2 | fcc | γ | fcc | $M_4N$ |
| Comparative example 3 | fcc | γ | fcc | $M_4N$ |
| Comparative example 4 | fcc | γ | fcc | $M_4N$ |
| Comparative example 5 | fcc | γ | fcc | γ |
| Comparative example 6 | fcc | γ | fcc | $M_4N$ |

TABLE 3

|  | Nitrides of most-superficial surface | | | Thickness of laminar nitrides nm |
|---|---|---|---|---|
|  | Crystal structure | Texture | Form |  |
| Embodiment example 1 | hcp | CrN | Laminar | 8 |
| Embodiment example 2 | hcp | $CrN + M_4N$ | Laminar + granular | 18 |
| Embodiment example 3 | hcp | $CrN + M_4N$ | Laminar + granular | 23 |
| Embodiment example 4 | hcp | $CrN + M_4N$ | Laminar + granular | 14 |
| Embodiment example 5 | hcp | $CrN + M_4N$ | Laminar + granular | 16 |
| Embodiment example 6 | hcp | $CrN + M_4N$ | Laminar + granular | 18 |
| Embodiment example 7 | hcp | $CrN + M_4N$ | Laminar + granular | 28 |
| Embodiment example 8 | hcp | $CrN + M_4N$ | Laminar + granular | 14 |
| Embodiment example 9 | hcp | $CrN + M_4N$ | Laminar + granular | 13 |
| Embodiment example 10 | hcp | $CrN + M_4N$ | Laminar + granular | 25 |
| Embodiment example 11 | hcp | $Cr_2N + CrN + M_{2-3}N + M_4N$ | Laminar + granular | 12 |
| Embodiment example 12 | hcp | $Cr_2N + CrN + M_{2-3}N + M_4N$ | Laminar + granular | 25 |
| Embodiment example 13 | hcp | $Cr_2N + CrN + M_{2-3}N + M_4N$ | Laminar + granular | 15 |
| Embodiment example 14 | hcp | $Cr_2N + CrN + M_{2-3}N + M_4N$ | Laminar + granular | 21 |
| Embodiment example 15 | hcp | $Cr_2N + CrN + M_{2-3}N + M_4N$ | Laminar + granular | 25 |
| Embodiment example 16 | hcp | $CrN + M_4N$ | Laminar + granular | 5 |
| Comparative example 1 | fcc | γ | — | — |
| Comparative example 2 | fcc | $M_4N$ | Laminar | — |
| Comparative example 3 | hcp | CrN | Laminar + granular | — |
| Comparative example 4 | fcc | $M_4N$ | Granular | — |
| Comparative example 5 | fcc | γ | Granular | — |
| Comparative example 6 | hcp | CrN | Laminar + granular | — |

TABLE 4

|  | Maximal height of projecting nitrides nm | Area ratio of projecting nitrides % | Number of projecting nitrides of equivalent circle diameters of 40 nm or more number |
|---|---|---|---|
| Embodiment example 1 | — | 0.5 | 0 |
| Embodiment example 2 | 66 | 16.8 | 1135 |
| Embodiment example 3 | 89 | 23.2 | 1452 |
| Embodiment example 4 | 48 | 19.9 | 1227 |
| Embodiment example 5 | 47 | 9.7 | 1098 |
| Embodiment example 6 | 49 | 30.6 | 1778 |
| Embodiment example 7 | 78 | 31.2 | 1721 |
| Embodiment example 8 | 48 | 24.4 | 1752 |
| Embodiment example 9 | 42 | 15.7 | 1766 |
| Embodiment example 10 | 54 | 12.9 | 1539 |
| Embodiment example 11 | 38 | 23.1 | 1778 |
| Embodiment example 12 | 69 | 34.2 | 1729 |
| Embodiment example 13 | 59 | 25.1 | 1798 |
| Embodiment example 14 | 72 | 26.8 | 1797 |
| Embodiment example 15 | 75 | 28.2 | 1811 |
| Embodiment example 16 | 42 | 3.5 | 855 |
| Comparative example 1 | — | — | — |
| Comparative example 2 | — | — | — |
| Comparative example 3 | 329 | 25.4 | 987 |
| Comparative example 4 | 15 | 0.4 | 298 |
| Comparative example 5 | 8 | 0.1 | 0 |
| Comparative example 6 | 358 | 37.5 | 993 |

TABLE 5

| | 0 nm | | | | | 2 nm | | | | | 5 nm | | | | |
|---|---|---|---|---|---|---|---|---|---|---|---|---|---|---|---|
| | Fe | Ni | Cr | N | O | Fe | Ni | Cr | N | O | Fe | Ni | Cr | N | O |
| Embodiment example 1 | 8.5 | 2.4 | 4.9 | 7.1 | 37.5 | 15.6 | 5.1 | 16.5 | 27.5 | 17.5 | 16.3 | 8.9 | 16.6 | 28.5 | 16.3 |
| Embodiment example 2 | 8.6 | 2.4 | 4.8 | 6.9 | 35.3 | 14.9 | 5.2 | 15.6 | 26.6 | 18.6 | 17.9 | 8.1 | 16.0 | 26.8 | 14.8 |
| Embodiment example 3 | 8.7 | 2.5 | 5.0 | 6.9 | 34.9 | 13.9 | 5.2 | 18.7 | 25.8 | 19.5 | 18.9 | 7.8 | 18.7 | 25.8 | 13.5 |
| Embodiment example 4 | 9.7 | 2.3 | 4.4 | 8.5 | 33.8 | 14.5 | 5.2 | 18.0 | 27.6 | 18.5 | 18.9 | 8.7 | 18.0 | 27.3 | 17.6 |
| Embodiment example 5 | 8.9 | 2.7 | 6.8 | 4.9 | 33.7 | 16.7 | 6.8 | 16.4 | 27.6 | 17.1 | 21.5 | 10.9 | 16.3 | 27.8 | 11.7 |
| Embodiment example 6 | 13.3 | 3.0 | 6.1 | 13.8 | 39.1 | 16.3 | 5.7 | 14.8 | 28.8 | 24.1 | 23.1 | 10.5 | 17.8 | 33.0 | 11.0 |
| Embodiment example 7 | 15.3 | 3.8 | 7.3 | 16.4 | 50.5 | 16.5 | 5.5 | 13.7 | 26.2 | 34.1 | 21.4 | 10.5 | 16.3 | 29.8 | 19.2 |
| Embodiment example 8 | 9.1 | 2.7 | 5.4 | 7.0 | 33.8 | 16.3 | 5.2 | 18.0 | 28.5 | 19.6 | 19.6 | 10.0 | 16.8 | 28.5 | 12.5 |
| Embodiment example 9 | 9.3 | 2.7 | 4.8 | 7.8 | 33.6 | 15.7 | 5.2 | 18.2 | 28.0 | 18.5 | 18.8 | 9.3 | 17.6 | 28.0 | 13.9 |
| Embodiment example 10 | 9.4 | 2.7 | 4.5 | 8.8 | 42.3 | 14.5 | 5.2 | 18.0 | 27.6 | 23.9 | 18.9 | 8.7 | 18.0 | 27.3 | 18.2 |
| Embodiment example 11 | 11.5 | 3.2 | 6.6 | 12.1 | 38.9 | 14.3 | 4.8 | 14.9 | 27.8 | 21.9 | 20.9 | 9.0 | 17.8 | 33.3 | 9.0 |
| Embodiment example 12 | 13.6 | 3.8 | 7.1 | 16.4 | 51.2 | 14.4 | 4.8 | 16.5 | 28.6 | 32.1 | 19.8 | 9.9 | 19.0 | 32.7 | 16.0 |
| Embodiment example 13 | 9.3 | 2.9 | 4.0 | 9.1 | 36.8 | 14.9 | 4.9 | 19.3 | 31.5 | 18.9 | 17.2 | 8.8 | 21.4 | 34.3 | 11.0 |
| Embodiment example 14 | 9.6 | 2.9 | 4.3 | 9.3 | 38.7 | 14.9 | 4.6 | 19.9 | 29.5 | 16.5 | 15.2 | 8.5 | 22.1 | 36.5 | 10.6 |
| Embodiment example 15 | 9.7 | 3.0 | 4.2 | 9.5 | 37.5 | 14.5 | 4.5 | 20.1 | 30.5 | 15.2 | 14.7 | 8.3 | 24.5 | 37.2 | 9.9 |
| Embodiment example 16 | 8.9 | 2.7 | 6.8 | 4.9 | 33.7 | 16.7 | 6.8 | 16.4 | 27.6 | 17.1 | 21.5 | 10.9 | 16.3 | 27.8 | 11.7 |
| Comparative example 1 | 3.7 | 0.4 | 0.1 | 0.0 | 48.0 | 29.8 | 4.5 | 6.5 | 0.0 | 39.5 | 36.5 | 5.9 | 8.7 | 0.0 | 38.5 |
| Comparative example 2 | 4.9 | 0.7 | 2.2 | 1.3 | 36.3 | 11.8 | 2.1 | 10.1 | 2.7 | 54.2 | 13.3 | 2.9 | 10.4 | 3.2 | 49.7 |
| Comparative example 3 | 9.3 | 2.3 | 4.2 | 8.0 | 37.0 | 14.3 | 5.2 | 20.1 | 28.5 | 21.8 | 17.9 | 9.8 | 24.5 | 31.4 | 13.7 |
| Comparative example 4 | 14.2 | 0.8 | 5.2 | 3.4 | 40.6 | 24.7 | 1.8 | 3.0 | 10.9 | 44.0 | 31.5 | 3.1 | 4.8 | 18.3 | 29.3 |
| Comparative example 5 | 10.6 | 3.4 | 0.0 | 2.5 | 40.5 | 21.4 | 9.1 | 2.1 | 2.6 | 35.7 | 24.3 | 10.5 | 3.5 | 2.4 | 29.4 |
| Comparative example 6 | 9.6 | 1.5 | 5.2 | 6.5 | 35.2 | 15.9 | 6.3 | 20.7 | 20.8 | 23.5 | 14.9 | 5.8 | 22.4 | 25.8 | 13.5 |

TABLE 6

| | 10 nm | | | | | 50 nm | | | | | 100 nm | | | | |
|---|---|---|---|---|---|---|---|---|---|---|---|---|---|---|---|
| | Fe | Ni | Cr | N | O | Fe | Ni | Cr | N | O | Fe | Ni | Cr | N | O |
| Embodiment example 1 | 22.3 | 9.9 | 16.6 | 27.7 | 15.6 | 33.0 | 18.4 | 16.9 | 27.6 | 2.4 | 20.1 | 18.5 | 17.6 | 27.6 | 1.3 |
| Embodiment example 2 | 22.4 | 10.4 | 15.0 | 25.7 | 13.3 | 32.9 | 18.4 | 15.4 | 25.8 | 3.8 | 34.8 | 19.7 | 15.6 | 26.4 | 1.2 |
| Embodiment example 3 | 24.6 | 10.5 | 16.6 | 24.9 | 12.4 | 34.6 | 19.0 | 17.9 | 24.6 | 2.4 | 36.0 | 18.5 | 16.9 | 25.1 | 1.0 |
| Embodiment example 4 | 22.5 | 10.3 | 17.5 | 26.5 | 17.3 | 32.5 | 12.6 | 17.7 | 26.5 | 2.3 | 32.9 | 15.2 | 17.6 | 26.3 | 1.0 |
| Embodiment example 5 | 30.8 | 16.9 | 13.7 | 24.2 | 6.5 | 39.1 | 17.1 | 13.8 | 25.4 | 2.4 | 41.5 | 18.8 | 13.5 | 25.1 | 0.4 |
| Embodiment example 6 | 29.8 | 16.1 | 15.4 | 28.0 | 7.5 | 34.1 | 19.0 | 15.6 | 27.0 | 1.9 | 36.6 | 20.1 | 15.2 | 27.0 | 0.0 |
| Embodiment example 7 | 27.7 | 14.7 | 15.0 | 26.6 | 14.5 | 34.5 | 18.3 | 15.9 | 24.7 | 5.3 | 36.7 | 19.0 | 15.7 | 25.7 | 1.2 |
| Embodiment example 8 | 24.4 | 15.5 | 14.6 | 25.3 | 12.2 | 35.2 | 17.8 | 14.6 | 25.4 | 3.4 | 28.5 | 19.5 | 14.5 | 27.7 | 0.0 |
| Embodiment example 9 | 23.6 | 16.5 | 16.5 | 25.8 | 6.2 | 34.2 | 18.1 | 16.0 | 25.4 | 4.5 | 35.1 | 19.1 | 15.5 | 28.5 | 0.0 |
| Embodiment example 10 | 22.5 | 12.3 | 17.5 | 26.5 | 15.2 | 31.2 | 18.4 | 17.6 | 26.3 | 5.7 | 32.9 | 20.2 | 17.6 | 28.3 | 0.9 |
| Embodiment example 11 | 28.1 | 14.7 | 15.8 | 29.3 | 5.5 | 32.2 | 19.0 | 15.8 | 29.6 | 1.9 | 33.2 | 19.4 | 15.9 | 30.0 | 0.5 |
| Embodiment example 12 | 27.4 | 15.7 | 15.7 | 28.1 | 11.3 | 32.2 | 18.3 | 16.3 | 28.2 | 3.5 | 34.0 | 19.0 | 17.1 | 28.2 | 0.6 |
| Embodiment example 13 | 24.1 | 17.6 | 17.2 | 30.2 | 5.9 | 28.4 | 21.8 | 17.1 | 30.2 | 0.9 | 29.2 | 22.2 | 17.2 | 29.9 | 0.0 |
| Embodiment example 14 | 24.6 | 18.5 | 18.1 | 32.9 | 4.8 | 29.2 | 22.5 | 17.9 | 29.2 | 0.5 | 28.5 | 23.5 | 18.5 | 30.0 | 0.0 |
| Embodiment example 15 | 23.3 | 19.2 | 18.6 | 34.2 | 3.5 | 27.1 | 23.7 | 18.5 | 32.1 | 0.3 | 27.4 | 24.2 | 19.0 | 30.1 | 0.0 |
| Embodiment example 16 | 30.8 | 16.9 | 13.7 | 24.2 | 6.5 | 39.1 | 17.1 | 13.8 | 25.4 | 2.4 | 41.5 | 18.8 | 13.5 | 25.1 | 0.4 |
| Comparative example 1 | 37.1 | 6.8 | 9.4 | 0.0 | 37.5 | 38.1 | 7.8 | 10.3 | 0.0 | 34.5 | 40.0 | 8.5 | 12.3 | 0.0 | 32.9 |
| Comparative example 2 | 15.7 | 3.2 | 10.2 | 4.0 | 45.3 | 26.8 | 6.3 | 8.1 | 5.4 | 30.8 | 27.3 | 5.6 | 8.1 | 5.6 | 30.4 |
| Comparative example 3 | 29.3 | 19.1 | 23.6 | 25.3 | 7.1 | 38.1 | 18.0 | 20.1 | 26.3 | 2.5 | 40.4 | 18.3 | 15.0 | 26.2 | 0.7 |
| Comparative example 4 | 36.0 | 4.1 | 7.7 | 21.9 | 19.5 | 41.1 | 9.9 | 11.9 | 24.1 | 9.5 | 47.2 | 11.4 | 11.6 | 25.5 | 1.8 |
| Comparative example 5 | 32.3 | 13.5 | 15.6 | 2.9 | 15.7 | 45.6 | 16.4 | 15.4 | 2.6 | 3.0 | 47.0 | 16.8 | 15.9 | 2.0 | 0.7 |
| Comparative example 6 | 18.6 | 6.5 | 28.6 | 25.9 | 12.4 | 24.6 | 19.0 | 24.9 | 25.6 | 2.4 | 26.0 | 18.5 | 23.9 | 26.1 | 1.0 |

TABLE 7

| | Anode condition ($N_2$ degassed) of corrosion test after nitridation | | | | | | Cathode condition (open to atmosphere) of corrosion test after nitridation | | | | | |
|---|---|---|---|---|---|---|---|---|---|---|---|---|
| | Contact resistance ($m\Omega \cdot cm^2$) | | | Ion elution amount (ppm) | | | Contact resistance ($m\Omega \cdot cm^2$) | | | Ion elution amount (ppm) | | |
| | Before test | After test | Difference in between | Fe | Ni | Cr | Before test | After test | Difference in between | Fe | Ni | Cr |
| Embodiment example 1 | 15.9 | 26.3 | 10.4 | 0.035 | 0.036 | <0.001 | 15.9 | 26.0 | 10.1 | <0.001 | <0.001 | <0.001 |
| Embodiment example 2 | 16.9 | 26.2 | 9.4 | 0.036 | 0.040 | <0.001 | 16.2 | 24.3 | 8.1 | <0.001 | <0.001 | <0.001 |
| Embodiment example 3 | 13.2 | 24.2 | 11.0 | 0.031 | 0.028 | <0.001 | 15.2 | 24.2 | 9.0 | <0.001 | <0.001 | <0.001 |

TABLE 7-continued

| | Anode condition (N₂ degassed) of corrosion test after nitridation | | | | | | Cathode condition (open to atmosphere) of corrosion test after nitridation | | | | | |
|---|---|---|---|---|---|---|---|---|---|---|---|---|
| | Contact resistance (mΩ·cm²) | | | Ion elution amount (ppm) | | | Contact resistance (mΩ·cm²) | | | Ion elution amount (ppm) | | |
| | Before test | After test | Difference in between | Fe | Ni | Cr | Before test | After test | Difference in between | Fe | Ni | Cr |
| Embodiment example 4 | 15.2 | 21.8 | 6.6 | 0.036 | 0.025 | <0.001 | 18.2 | 27.8 | 9.6 | <0.001 | <0.001 | <0.001 |
| Embodiment example 5 | 20.1 | 27.7 | 7.6 | 0.038 | 0.048 | <0.001 | 17.3 | 26.6 | 9.3 | <0.001 | <0.001 | <0.001 |
| Embodiment example 6 | 9.2 | 12.6 | 3.4 | 0.032 | 0.032 | <0.001 | 9.8 | 15.8 | 6.0 | <0.001 | <0.001 | <0.001 |
| Embodiment example 7 | 8.0 | 10.8 | 2.8 | 0.004 | 0.003 | <0.001 | 6.8 | 8.6 | 1.8 | <0.001 | <0.001 | <0.001 |
| Embodiment example 8 | 17.8 | 25.5 | 7.7 | 0.034 | 0.025 | <0.001 | 17.8 | 21.5 | 3.7 | <0.001 | <0.001 | <0.001 |
| Embodiment example 9 | 19.2 | 26.5 | 7.3 | 0.036 | 0.025 | <0.001 | 19.2 | 20.5 | 1.3 | <0.001 | <0.001 | <0.001 |
| Embodiment example 10 | 12.1 | 26.8 | 14.7 | 0.036 | 0.025 | <0.001 | 12.1 | 16.8 | 4.7 | <0.001 | <0.001 | <0.001 |
| Embodiment example 11 | 11.2 | 17.2 | 6.0 | 0.038 | 0.036 | <0.001 | 11.2 | 12.2 | 1.0 | <0.001 | <0.001 | <0.001 |
| Embodiment example 12 | 8.0 | 17.6 | 9.6 | 0.007 | 0.005 | <0.001 | 6.0 | 10.0 | 4.0 | <0.001 | <0.001 | <0.001 |
| Embodiment example 13 | 15.2 | 21.3 | 6.1 | 0.042 | 0.042 | <0.001 | 19.9 | 23.0 | 3.1 | <0.001 | <0.001 | <0.001 |
| Embodiment example 14 | 12.8 | 19.5 | 6.7 | 0.036 | 0.025 | <0.001 | 12.8 | 15.5 | 2.7 | <0.001 | <0.001 | <0.001 |
| Embodiment example 15 | 12.2 | 18.3 | 6.1 | 0.033 | 0.025 | <0.001 | 12.2 | 15.3 | 3.1 | <0.001 | <0.001 | <0.001 |
| Embodiment example 16 | 20.1 | 32.7 | 12.6 | 0.038 | 0.048 | <0.001 | 17.3 | 26.6 | 9.3 | <0.001 | <0.001 | <0.001 |
| Comparative example 1 | 242.7 | 365.3 | 122.6 | 0.005 | 0.001 | <0.001 | 461.4 | 906.5 | 445.1 | 0.005 | 0.005 | 0.002 |
| Comparative example 2 | 160.8 | 174.2 | 13.4 | 0.005 | <0.001 | <0.001 | 154.8 | 189.4 | 34.6 | <0.001 | <0.001 | <0.001 |
| Comparative example 3 | 19.9 | 98.5 | 78.6 | 0.180 | 0.210 | <0.001 | 19.9 | 138.9 | 119.0 | 0.002 | 0.008 | <0.001 |
| Comparative example 4 | 41.4 | 98.9 | 57.4 | 0.050 | 0.089 | <0.001 | 55.3 | 102.5 | 47.1 | 0.001 | 0.004 | <0.001 |
| Comparative example 5 | 154.5 | 162.3 | 7.8 | 0.005 | <0.001 | <0.001 | 158.9 | 178.8 | 19.9 | <0.001 | <0.001 | <0.001 |
| Comparative example 6 | 20.5 | 189.1 | 168.7 | 0.580 | 0.470 | <0.001 | 22.0 | 163.7 | 141.7 | 0.002 | 0.7 | <0.001 |

TABLE 8

| | Anode condition (N² degassed) of corrosion test after acid dissolution | | | | | | Cathode condition (open to atmosphere) of corrosion test after acid dissolution | | | | | |
|---|---|---|---|---|---|---|---|---|---|---|---|---|
| | Contact resistance (mΩ·cm²) | | | Ion elution amount (ppm) | | | Contact resistance (mΩ·cm²) | | | Ion elution amount (ppm) | | |
| | Before test | After test | Difference in between | Fe | Ni | Cr | Before test | After test | Difference in between | Fe | Ni | Cr |
| Embodiment example 1 | 17.8 | 18.2 | 0.4 | 0.008 | 0.012 | <0.001 | 17.8 | 17.9 | 0.1 | <0.001 | <0.001 | <0.001 |
| Embodiment example 2 | 18.9 | 19.1 | 0.2 | 0.006 | 0.010 | <0.001 | 18.9 | 19.0 | 0.1 | <0.001 | <0.001 | <0.001 |
| Embodiment example 3 | 14.6 | 15.0 | 0.4 | 0.002 | 0.009 | <0.001 | 14.6 | 14.8 | 0.2 | <0.001 | <0.001 | <0.001 |
| Embodiment example 4 | 16.8 | 16.8 | 0.0 | 0.006 | 0.012 | <0.001 | 16.8 | 17.0 | 0.2 | <0.001 | <0.001 | <0.001 |
| Embodiment example 5 | 16.2 | 17.8 | 1.6 | 0.008 | 0.008 | <0.001 | 16.2 | 16.5 | 0.3 | <0.001 | <0.001 | <0.001 |
| Embodiment example 6 | 10.8 | 10.2 | | 0.002 | 0.009 | <0.001 | 10.8 | 10.8 | 0.0 | <0.001 | <0.001 | <0.001 |
| Embodiment example 7 | 9.8 | 10.1 | 0.3 | 0.002 | 0.009 | <0.001 | 9.8 | 9.9 | 0.1 | <0.001 | <0.001 | <0.001 |
| Embodiment example 8 | 18.4 | 19.4 | 1.0 | 0.004 | 0.010 | <0.001 | 18.4 | 18.8 | 0.4 | <0.001 | <0.001 | <0.001 |
| Embodiment example 9 | 19.7 | 19.8 | 0.1 | 0.006 | 0.011 | <0.001 | 19.7 | 19.9 | 0.2 | <0.001 | <0.001 | <0.001 |
| Embodiment example 10 | 13.5 | 14.2 | 0.7 | 0.006 | 0.013 | <0.001 | 13.5 | 13.7 | 0.2 | <0.001 | <0.001 | <0.001 |
| Embodiment example 11 | 12.3 | 13.3 | 1.0 | 0.008 | 0.010 | <0.001 | 12.3 | 12.4 | 0.1 | <0.001 | <0.001 | <0.001 |
| Embodiment example 12 | 8.4 | 8.8 | 0.4 | 0.003 | 0.009 | <0.001 | 8.4 | 8.7 | 0.3 | <0.001 | <0.001 | <0.001 |
| Embodiment example 13 | 15.9 | 16.2 | 0.3 | 0.002 | 0.008 | <0.001 | 15.9 | 16.2 | 0.3 | <0.001 | <0.001 | <0.001 |
| Embodiment example 14 | 13.5 | 14.3 | 0.8 | 0.006 | 0.011 | <0.001 | 13.5 | 13.8 | 0.3 | <0.001 | <0.001 | <0.001 |
| Embodiment example 15 | 14.8 | 14.5 | | 0.003 | 0.009 | <0.001 | 14.8 | 15.0 | 0.2 | <0.001 | <0.001 | <0.001 |
| Embodiment example 16 | 25.5 | 26.2 | 0.7 | 0.012 | 0.028 | <0.001 | 20.5 | 21.3 | 0.8 | <0.001 | <0.001 | <0.001 |
| Comparative example 1 | 298.5 | 358.5 | 60.0 | 0.005 | <0.001 | <0.001 | 298.5 | 357.8 | 59.3 | 0.005 | 0.005 | 0.002 |
| Comparative example 2 | 172.1 | 185.3 | 13.2 | 0.003 | <0.001 | <0.001 | 172.1 | 199.0 | 26.9 | <0.001 | <0.001 | <0.001 |
| Comparative example 3 | 54.5 | 56.5 | 2.0 | 0.012 | 0.037 | <0.001 | 55.5 | 56.9 | 1.4 | 0.002 | 0.008 | <0.001 |
| Comparative example 4 | 35.2 | 42.5 | 7.3 | 0.019 | 0.049 | <0.001 | 32.3 | 33.2 | 0.9 | 0.001 | 0.004 | <0.001 |
| Comparative example 5 | 72.5 | 80.5 | 8.0 | 0.015 | 0.032 | <0.001 | 76.3 | 78.8 | 2.5 | <0.001 | <0.001 | <0.001 |
| Comparative example 6 | 37.5 | 42.2 | 4.7 | 0.020 | 0.045 | <0.001 | 37.5 | 38.4 | 0.9 | 0.002 | 0.7 | <0.001 |

TABLE 9

| | Base layer | | Nitrides neighboring base layer | | Nitrides of most-superficial surface | | |
|---|---|---|---|---|---|---|---|
| | Crystal structure | Texture | Crystal structure | Texture | Crystal structure | Texture | Form |
| Embodiment example 1 | fcc | γ | fcc + hcp | $M_4N + M_{2-3}N$ lamination | hcp | CrN | Laminar |
| Embodiment example 2 | fcc | γ | fcc + hcp | $M_4N + M_{2-3}N$ lamination | hcp | CrN | Laminar + granular |
| Embodiment example 3 | fcc | γ | fcc + hcp | $M_4N + M_{2-3}N$ lamination | hcp | CrN | Laminar + granular |
| Embodiment example 4 | fcc | γ | fcc + hcp | $M_4N + M_{2-3}N$ lamination | hcp | CrN | Laminar + granular |
| Embodiment example 5 | fcc | γ | fcc + hcp | $M_4N + M_{2-3}N$ lamination | hcp | CrN | Laminar + granular |
| Embodiment example 6 | fcc | γ | fcc + hcp | $M_4N + M_{2-3}N$ lamination | hcp | CrN | Laminar + granular |
| Embodiment example 7 | fcc | γ | fcc + hcp | $M_4N + M_{2-3}N$ lamination | hcp | CrN | Laminar + granular |
| Embodiment example 8 | fcc | γ | fcc + hcp | $M_4N + M_{2-3}N$ lamination | hcp | CrN | Laminar + granular |
| Embodiment example 9 | fcc | γ | fcc + hcp | $M_4N + M_{2-3}N$ lamination | hcp | CrN | Laminar + granular |
| Embodiment example 10 | fcc | γ | fcc + hcp | $M_4N + M_{2-3}N$ lamination | hcp | CrN | Laminar + granular |
| Embodiment example 11 | fcc | γ | fcc + hcp | $M_4N + M_{2-3}N$ lamination | hcp | $Cr_2N + CrN$ | Laminar + granular |
| Embodiment example 12 | fcc | γ | fcc + hcp | $M_4N + M_{2-3}N$ lamination | hcp | $Cr_2N + CrN$ | Laminar + granular |
| Embodiment example 13 | fcc | γ | fcc + hcp | $M_4N + M_{2-3}N$ lamination | hcp | $Cr_2N + CrN$ | Laminar + granular |
| Embodiment example 14 | fcc | γ | fcc + hcp | $M_4N + M_{2-3}N$ lamination | hcp | $Cr_2N + CrN$ | Laminar + granular |
| Embodiment example 15 | fcc | γ | fcc + hcp | $M_4N + M_{2-3}N$ lamination | hcp | $Cr_2N + CrN$ | Laminar + granular |
| Embodiment example 16 | fcc | γ | fcc | $M_4N + M_{2-3}N$ lamination | hcp | CrN | Laminar + granular |
| Comparative example 1 | fcc | γ | fcc | γ | fcc | γ | — |
| Comparative example 2 | fcc | γ | fcc | $M_4N$ | fcc | $M_4N$ | Laminar |
| Comparative example 3 | fcc | γ | fcc | $M_4N$ | hcp | CrN | Laminar + granular |
| Comparative example 4 | fcc | γ | fcc | $M_4N$ | fcc | $M_4N$ | Granular |
| Comparative example 5 | fcc | γ | fcc | γ | fcc | γ | Granular |
| Comparative example 6 | fcc | γ | fcc | $M_4N$ | hcp | CrN | Laminar + granular |

TABLE 10

| | After acid dissolution | | | |
|---|---|---|---|---|
| | Thickness of laminar nitrides nm | Maximal height of projecting nitrides nm | Area ratio of projecting nitrides % | Number of projecting nitrides of equivalent circle diameters of 40 nm or more number |
| Embodiment example 1 | 8 | — | 1.2 | 0 |
| Embodiment example 2 | 18 | 45 | 19.8 | 1233 |
| Embodiment example 3 | 23 | 63 | 25.8 | 1689 |
| Embodiment example 4 | 14 | 30 | 21.3 | 1311 |
| Embodiment example 5 | 16 | 29 | 12.3 | 1812 |
| Embodiment example 6 | 18 | 31 | 31.2 | 1756 |
| Embodiment example 7 | 28 | 36 | 35.6 | 1784 |
| Embodiment example 8 | 14 | 31 | 26.5 | 1788 |
| Embodiment example 9 | 13 | 23 | 17.9 | 1697 |
| Embodiment example 10 | 25 | 38 | 15.8 | 1798 |
| Embodiment example 11 | 12 | 32 | 24.8 | 1775 |
| Embodiment example 12 | 25 | 36 | 35.4 | 1811 |
| Embodiment example 13 | 15 | 34 | 28.1 | 1824 |
| Embodiment example 14 | 21 | 46 | 28.9 | 1837 |
| Embodiment example 15 | 25 | 48 | 29.7 | 1854 |
| Embodiment example 16 | 5 | 12 | 0.8 | 987 |
| Comparative example 1 | — | — | — | — |
| Comparative example 2 | — | — | — | — |
| Comparative example 3 | — | 298 | 28.9 | 1324 |
| Comparative example 4 | — | 35 | 0.7 | 354 |
| Comparative example 5 | — | 12 | 0.2 | 38 |
| Comparative example 6 | — | 316 | 39.8 | 1222 |

In regard to sample of comparative example 1, no nitrided layer was formed, and instead, a thick passive film was formed on the surface. Therefore, in dipping tests under an anode condition and a cathode condition, the contact resistances before and after the tests exhibited high values. As to ion elution, because of the thick passive film formed on the base material surface, Fe, Ni, and Cr ions were little eluted in the dipping tests under the anode condition and the cathode condition.

In regard to sample of comparative example 2, which was gas nitrided, and treated under an atmospheric pressure, a thick passive film was formed on a surface of a nitrided layer. This nitrided layer included nitrides high of oxygen concentration and low of nitrogen concentration, and hence in dipping tests under an anode condition and a cathode condition, contact resistances before and after the tests exhibited high values. As to ion elution, because of the thick passive film formed on the surface, Fe, Ni, and Cr ions were little eluted in the dipping tests under the anode condition and the cathode condition.

In regard to sample of comparative example 3, where applied was a plasma nitriding using no micropulse plasma power supply, but a direct current power supply, a most superficial surface as a surface portion of nitrided layer had projections of CrN formed thereon, with a maximal height of a level of several hundreds nm, thus having a Cr depletion layer formed in part of the nitrided layer. Therefore, in a dipping test under an anode condition, the amount of ion elution became great, causing a worsen corrosion resistance, and a thick oxide film was formed in the dipping test, giving a relatively high value of contact resistance after the test. On the other hand, under a cathode condition, where the solution had a higher oxygen partial pressure than the anode condition, thick oxide films were formed, in particular, on a surface region near Cr depletion layer. Therefore, though ion elution was difficult in comparison with the anode condition, the contact resistance was increased.

In regard to sample of comparative example 4, the base material employed was a SUS316L having a Cr content lower than 25 at %. In this case, the nitrided layer simply had nitrides of $M_4N$ type including Fe as a principal component, and under an anode condition, elution amounts of metal ions of Fe, Ni, and Cr were somewhat increased, causing the contact resistance after the test to be somewhat increased, as well. Under a cathode condition, where the solution had a higher oxygen partial pressure than the anode condition, oxide films were formed on the surface. Therefore, elution amounts of metal ions of Fe, Ni, and Cr were more or less increased in comparison with the anode condition, causing the contact resistance after the test to be more or less increased, as well.

In regard to sample of comparative example 5, where nitriding temperature was as low as 300° C., and no nitrided layer was formed within the nitriding time of 60 min, the surface of base material was left as the base tissue was, having a thick passive film on the surface. Therefore, in dipping tests under an anode condition and a cathode condition, contact resistances before and after the tests exhibited high values. As to ion elution, because of the thick passive film formed on the surface, Fe, Ni, and Cr ions were little eluted in the dipping tests under the anode condition and the cathode condition.

In regard to sample of comparative example 6, where nitriding temperature was as high as 500° C., a most superficial surface had projections of CrN formed thereon, with a maximal height of a level of several hundreds nm, like the case of a direct current power supply. Therefore, a Cr depletion layer was formed in part of the nitrided layer, and in a dipping test under an anode condition, Fe, Ni, and Cr ions were eluted, causing a worsen corrosion resistance. Further, a thick oxide film was formed in the dipping test, giving a relatively high value of contact resistance after the test. Further, in a dipping test under a cathode condition, where the solution had a higher oxygen partial pressure than the anode condition, thick oxide films were formed, in particular, on a surface region near Cr depletion layer, and although ion elution was difficult in comparison with the anode condition, the contact resistance was increased.

On the contrary, for samples of embodiment example 1 to embodiment example 16, contact resistances were low before and after dipping tests under anode and cathode conditions, and elution amounts of Fe, Ni, and Cr ions were small. This is considered because of the use of a base material having a Cr concentration of 20 wt % or more, whereby Cr that has a high affinity to N was incrassated at the surface by lattice vibration, and as N atoms were driven by plasma nitridation to strike or invade into the surface portion of base material, Cr and N atoms were bonded, forming nitrides of CrN and $Cr_2N$ having crystal structures of hexagonal close packing lattice at the surface portion of base material. Moreover, because of plasma nitridation, by the voltage, N ions were brought into accelerated collision with the base material surface, which was thereby strongly heated within local fine areas. Further, concurrently therewith, metallic atoms such as Fe, Cr, and Mo in the base material were sputtered (vaporized). Therefore, Fe, as a most contained element in the surface portion of base material, was separated from the sample surface by the sputtering effect, and thus separated Fe atom was bonded with nitrogen as a highly activated element in plasma near the surface portion of base material, and by absorption thereafter, they were precipitated as an iron nitride on the sample surface.

When plasma nitiring, if the temperature of base material is as relatively low as within 400 to 425° C., energy of collision by N ion to the base material surface is low, and the sputtering at the surface portion of base material has a reduced effect. Therefore, the amount of Fe atoms separated from the base material surface is small, and the amount of iron nitrides to be absorbed on the base material surface is little, so that Cr that has a high affinity to N is incrassated at the base material surface by lattice vibration, while many N atoms are driven by plasma nitridation to strike or invade into the surface portion of base material, whereby Cr and N atoms are bonded, forming nitrides of CrN and $Cr_2N$ having laminar crystal structures of hexagonal close packing lattice at the surface portion of base material. On the other hand, with Cr having a high affinity to oxygen, there is an increased tendency for conductive passive films of thickness under several tens nm to be formed on surfaces of Cr nitrides, and besides, those passive films are effective to increase the corrosion resistance under a sulfur acid environment.

When plasma nitriding, if the temperature of base material is as relatively high as within 425 to 450° C., energy of collision by N ion to the base material surface becomes high and the sputtering at the surface portion of base material has an enhanced effect, and the amount of Fe atoms separated from the base material surface is great and the amount of iron nitrides absorbed on the base material surface is increased. Therefore, on the surface portion of base material, there are precipitated projection-shaped high-nitrogen nitrides having crystal structures of hexagonal $M_{2-3}N$ type or cubic $M_4N$ type.

Figure 7:
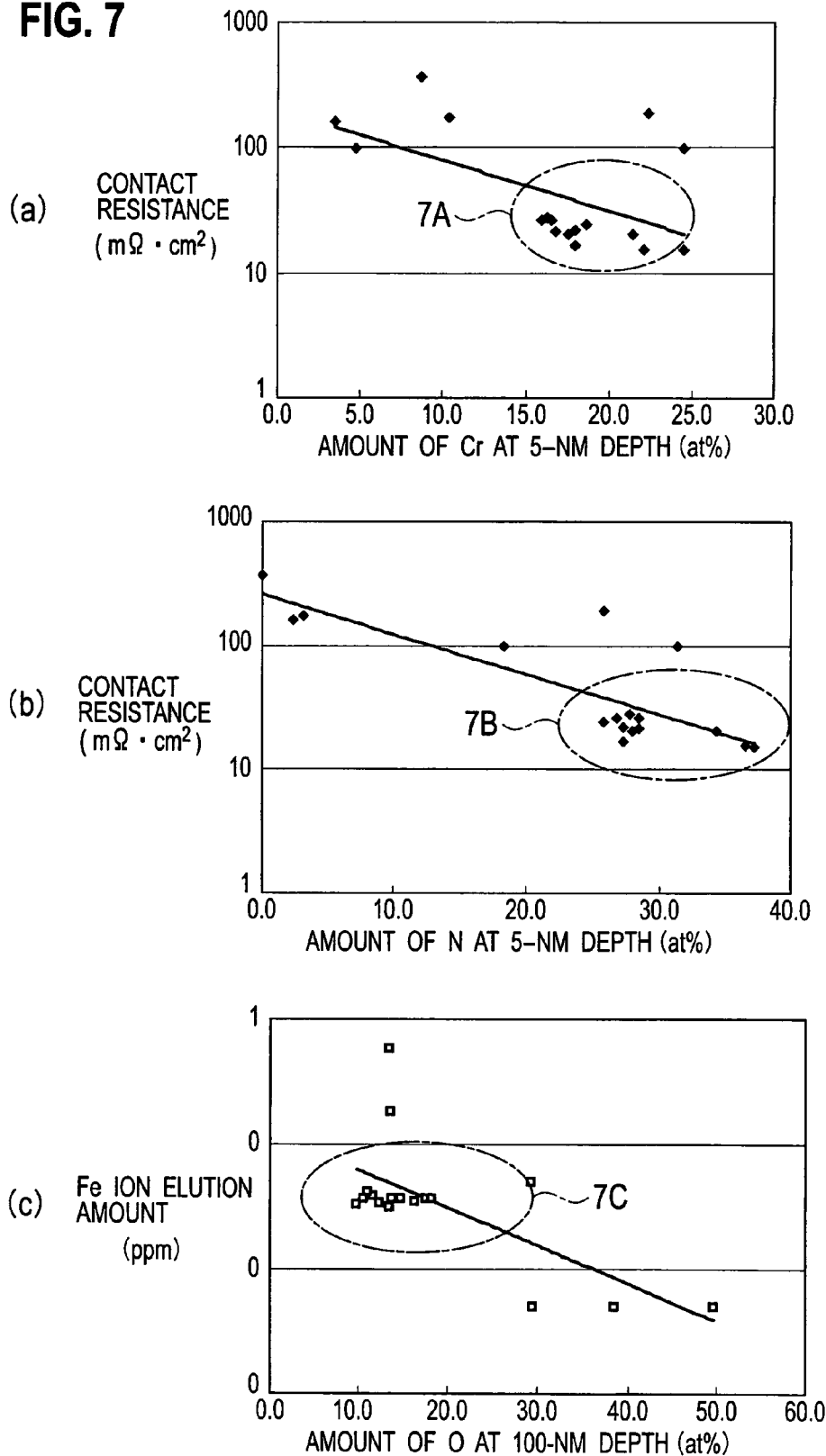
FIG. 7(a) is a graph showing a relationship of contact resistance vs. Cr amount at a 5 nm depth from the surface portion of the nitrided layer, FIG. 7(b), a graph showing a relationship of contact resistance vs. nitrogen amount at the 5 nm depth from the surface portion of the nitrided layer, and FIG. 7(c), a graph showing a relationship of elution amount of iron ion vs. oxygen amount at the 5 nm depth from the surface portion of the nitrided layer.

For such laminar Cr nitrides of CrN and $Cr_2N$ incrassate of Cr and N and projection-shaped nitrides of $M_{2-3}N$ type and $M_4N$ type, when they are viewed at a 5 nm depth from the surface, it will be seen as described that the more the amounts of Cr and N in the nitrides becomes as in FIG. 7($a$) and FIG. 7($b$), the lower the contact resistance can be suppressed, and that the higher the amount of O in passive films on the nitrides becomes as in FIG. 7($c$), the lower the ion elution amount can be suppressed, allowing for the more excellent corrosion resistance. For embodiment example 1 to embodiment example 16, Cr amounts and N amounts in nitrided layers were much, and thin and stable passive films were formed on surfaces of the nitrided layers. Therefore, oxygen amounts in the surface portions also were relatively much, and even under such an environment that was strongly acidic and as hot as within 80 to 90° C. like the environment of separators in a fuel cell, movement of electron could be unhindered, allowing for a maintained conductivity and besides an excellent ion elution property.

Further, in each sample of embodiment example 1 to embodiment example 16, a nitrided layer neighboring the base layer had a composite tissue formed therein, where precipitates of $M_{2-3}N$ type and $M_4N$ type were stacked in a $M_4N$ matrix fashion on the base material surface, at intervals of several tens to hundred nm.

Figure 11:
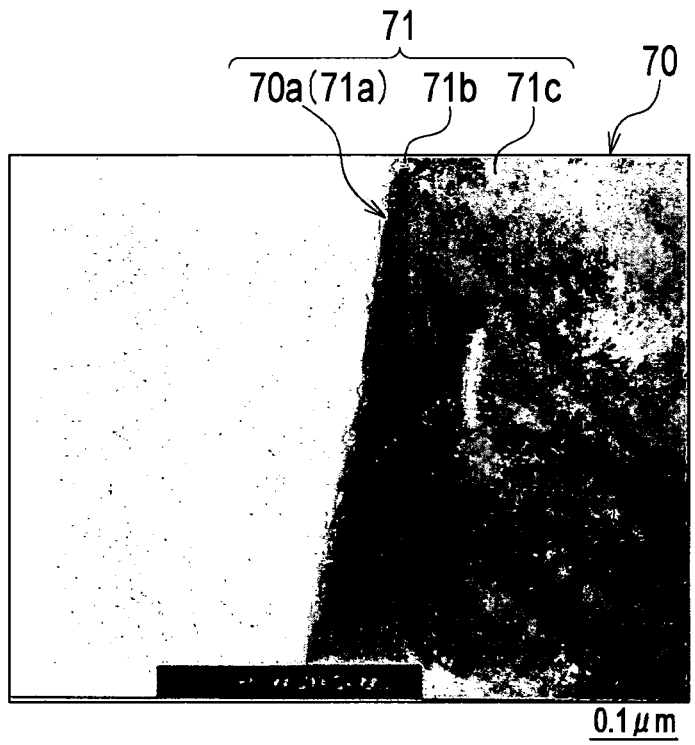
FIG. 11(a) is a sectional metallographic photograph by a TEM of 100,000 magnifications of a sample from embodiment example 1, and FIG. 11(b), a sectional metallographic photograph by a TEM of 100,000 magnifications of a sample from embodiment example 3.
Figure 11:
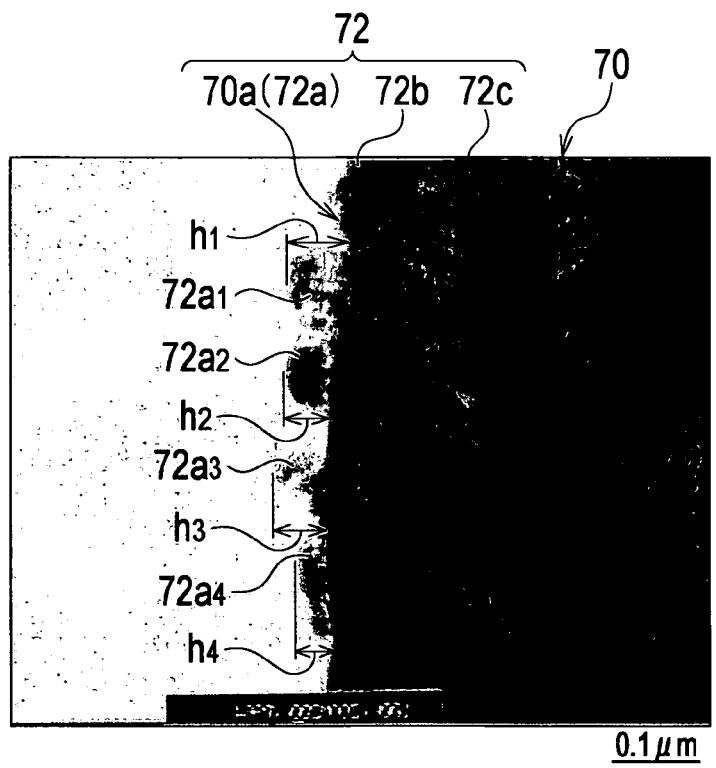

FIG. 11($a$) shows a TEM picture at 100,000-fold magnification of a separator obtained from embodiment example 1, and FIG. 11(b), that of a separator from embodiment example 3. Surfaces 70a of stainless steels 70 used as their base materials were nitrided, whereby in FIG. 11(a) a nitrided layer 71 was formed in a depth direction of a surface 70a of base material 70, and a region just below the nitrided layer 71 was left as a non-nitrided base layer. The nitrided layer 71 was made up by a surface portion 71a (70a) of the nitrided layer 71, a first nitrided layer 71b, and a second nitrided layer 71c formed adjacent to the base layer. In the second nitrided layer 71c, a dual-phase composite tissue was observed, where laminar tissues were repeated, which has come out as a combination of a matrix of $M_4N$ type crystal structures, and laminar $M_{2-3}N$ type crystal structures formed in the matrix. $M_{2-3}N$ type crystal structures had their interlayer distances within a range of several tens to several hundreds nm.

In FIG. 11(b), a nitrided layer 72 was formed in a depth direction of a surface 70a of base material 70, and a region just below the nitrided layer 72 was left as a non-nitrided base layer. A surface portion 72a (70a) of the nitrided layer 72 had precipitates $72a_1$, $72a_2$, $72a_3$, and $72a_4$ including crystal structures of MN type, $M_{2-3}$ N type, or $M_4N$ type. Precipitate $72a_1$ was projected by a height $h_1$ at a maximum from the surface portion 72a. Precipitate $72a_2$ was projected by a height $h_2$ at a maximum from the surface portion 72a. Precipitate $72a_3$ was projected by a height $h_3$ at a maximum from the surface portion 72a. Precipitate $72a_4$ was projected by a height $h_4$ at a maximum from the surface portion 72a. The nitrided layer 72 further had a first nitrided layer 72b, and a second nitrided layer 72c. In the second nitrided layer 72c, a dual-phase composite tissue was observed, where laminaer tissues were repeated, like the case of FIG. 11(a).

Figure 12:
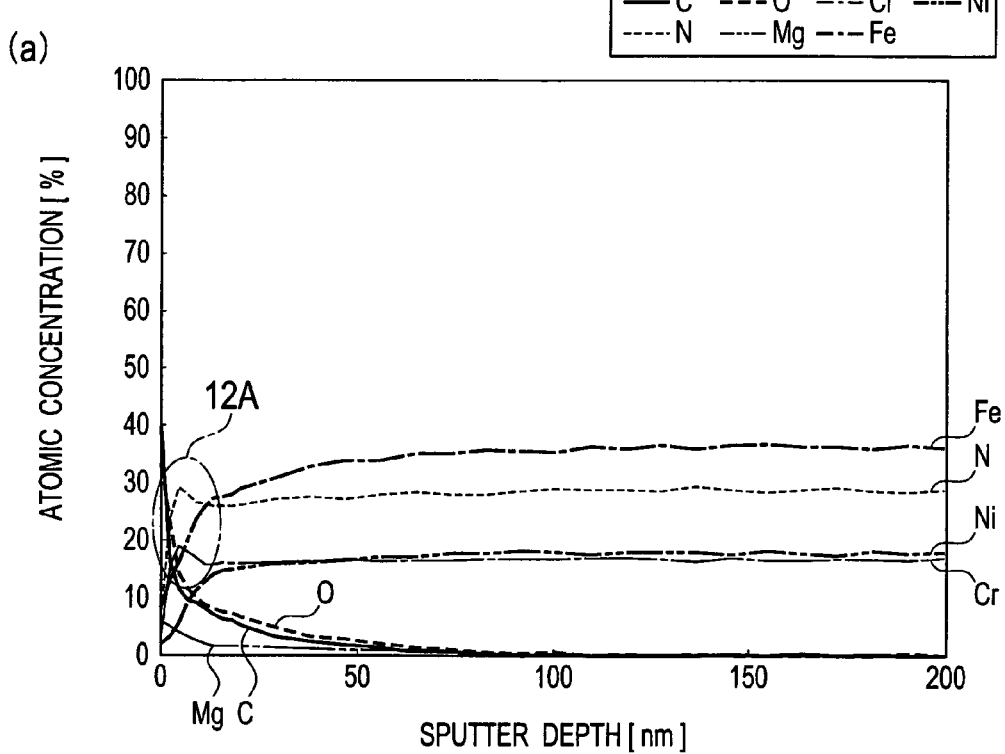
FIG. 12(a) is a graph showing element profiles in a depth direction by a scanning Auger electron spectroscopy analysis of a rib ridge of a sample from embodiment example 2, and FIG. 12(b), a graph showing element profiles in a depth direction by a scanning Auger electron spectroscopy analysis of a groove bottom of the sample from embodiment example 2.
Figure 12:
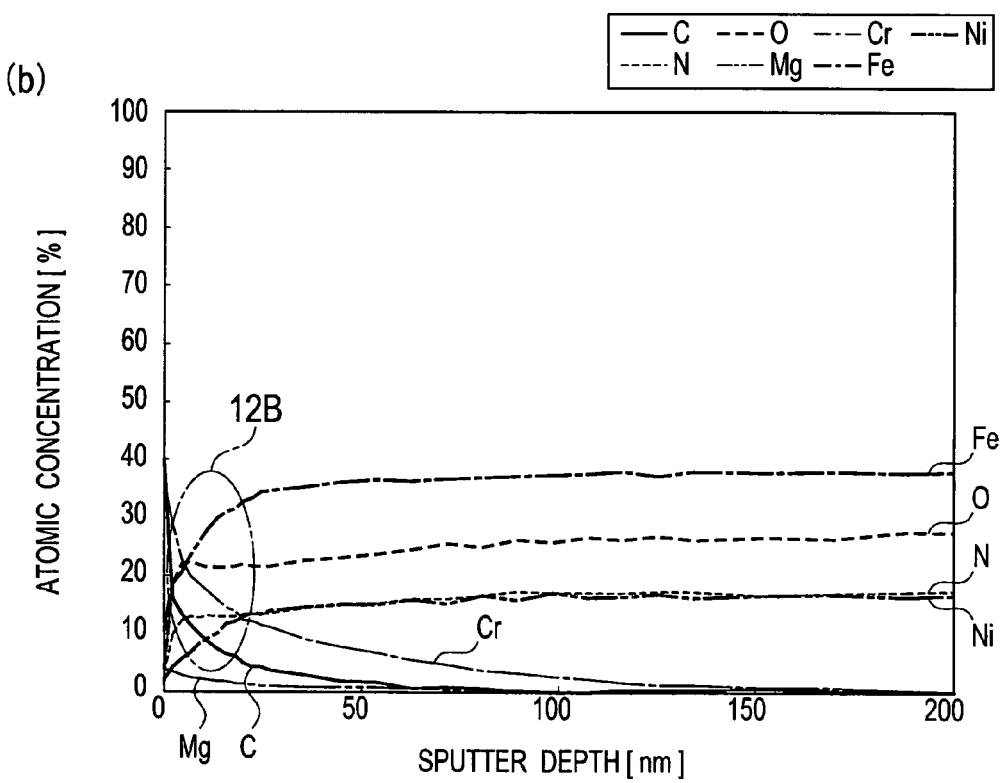

For sample from embodiment example 2, FIG. 12 shows results of a scanning Auger electron spectroscopy analysis. FIG. 12(a) shows analysis results of a ridge of a rib of the sample, and FIG. 12(b), analysis results of a bottom of a groove of the sample.

It is considered that in the nitridation, the rib ridge had a higher temperature than the groove bottom, and the rib ridge was nitrided at a temperature about 425° C. In this case, the second nitrided layer of the most superficial surface had a thickness about 10 nm, and as shown at 12A in the figure, at a depth of 10 nm from the surface portion, there was observed a peak having Cr and N incrassated in comparison with the base layer, whereby it has come out that the peak was a nitride having a crystal structure of $Cr_2N$, CrN, $M_{2-3}N$, or $M_4N$ type incrassate of Cr and N.

It is considered that the groove bottom was nitrided at a temperature about 400° C. In this case, the second nitrided layer of the most superficial surface had a thickness about 10 nm, and as shown at 12B in the figure, at a depth of 10 nm from the surface portion, there was observed a peak having Cr and N incrassated in comparison with the base layer, whereby it has come out that the peak was a nitride having a crystal structure of $Cr_2N$, CrN, $M_{2-3}N$, or $M_4N$ type incrassate of Cr and N. Such being the case, groove bottoms generally have a low nitriding temperature, and besides are put in an environment to be difficult for plasma to go around. However, in this case, the base material used was a base material high of Cr concentration, and the surface of base material had incrassated Cr and N, like rib ridges.

Figure 13:
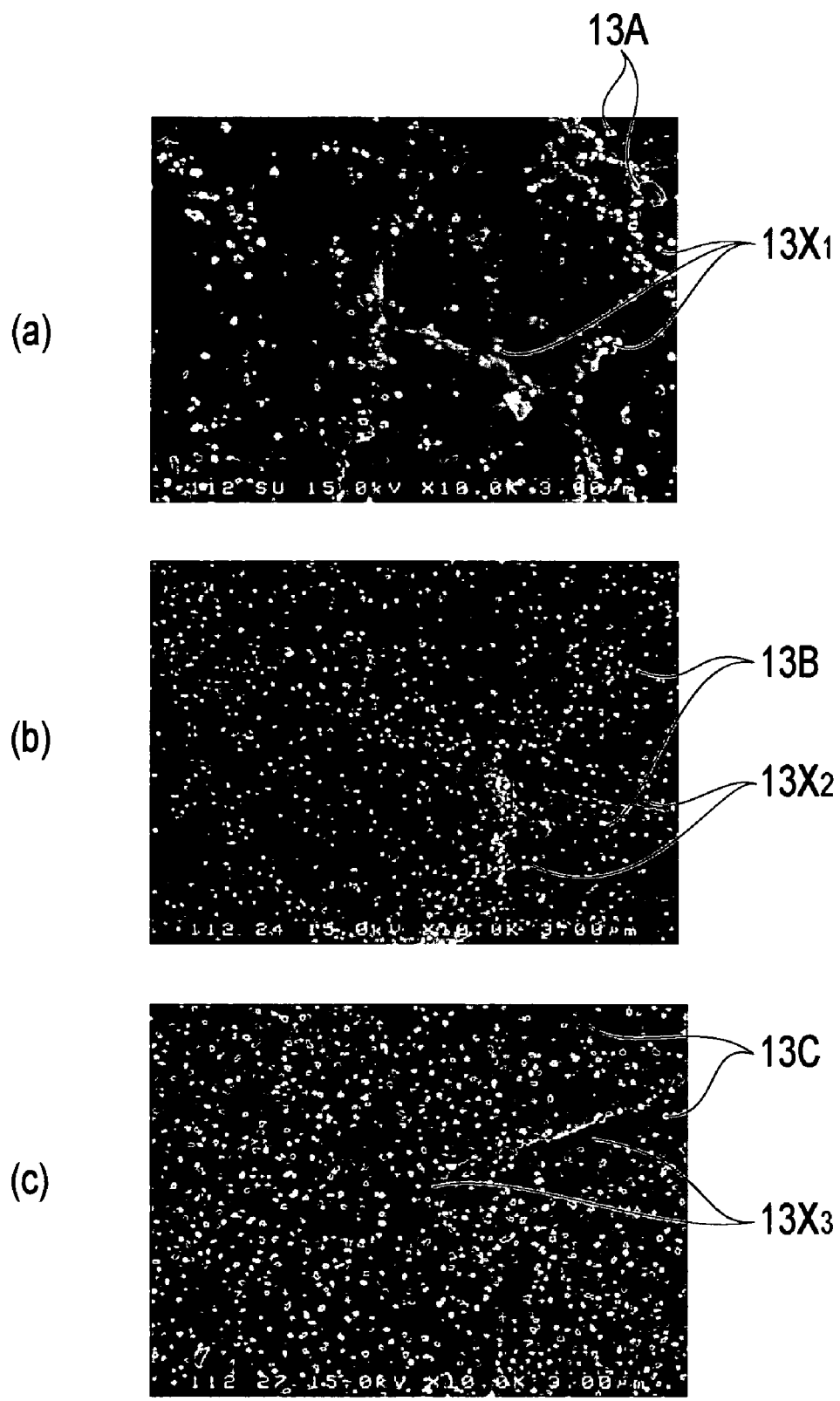
FIG. 13(a) is an observation result by FE-SEM of a sample from embodiment example 16, FIG. 13(b), an observation result by FE-SEM of a sample from embodiment example 2, and FIG. 13(c), an observation result by FE-SEM of a sample from embodiment example 7.

Description is now made of a relationship between Mo concentration of base material and nitrides, with reference to FIG. 13. FIG. 13 shows results of observation by a field-emission type scanning electron microscope (FE-SEM) at a 10,000-fold magnification of surfaces of nitrides obtained by 1 hr of plasma nitriding treatment at 425° C. FIG. 13(a) is a result of observation of embodiment example 16 in which no Mo was added. FIG. 13(b) is a result of observation of embodiment example 2 in which 1.5% of Mo was added. FIG. 13(c) is a result of observation of embodiment example 7 in which 2.5% of Mo was added. In any of examples shown in FIG. 13(a) to FIG. 13(c), there were observed white or light gray points designated at 13A, 13B, or 13C. They indicate projection-shaped nitrides projecting from a surface of nitrided layer.

As shown in FIG. 13(a), in the case no Mo was added, projection-shaped nitrides 13A projecting from a surface of nitrided layer were segregated, and small in number. In comparison therewith, in FIG. 13(b) and FIG. 13(c) where Mo was added, projection-shaped nitrides 13B or 13C projecting from a surface of nitrided layer were increased in number of precipitates. Further, as shown in FIG. 13(a), in the case no Mo was added, projection-shaped nitrides 13A projecting from a surface of nitrided layer were precipitated in preference to crystal grain boundaries designated by 13X1. To the contrary, in FIG. 13(b) and FIG. 13(c) where Mo was added, nitrides were precipitated as a system of uniform dispersion. By addition of Mo, projection-shaped nitrides 13B or 13C projecting from a surface of nitrided layer were not simply segregated along crystal grain boundaries designated at 13X2 or 13X3, but evenly precipitated in both intergranular and intragranular regions.

Figure 15:
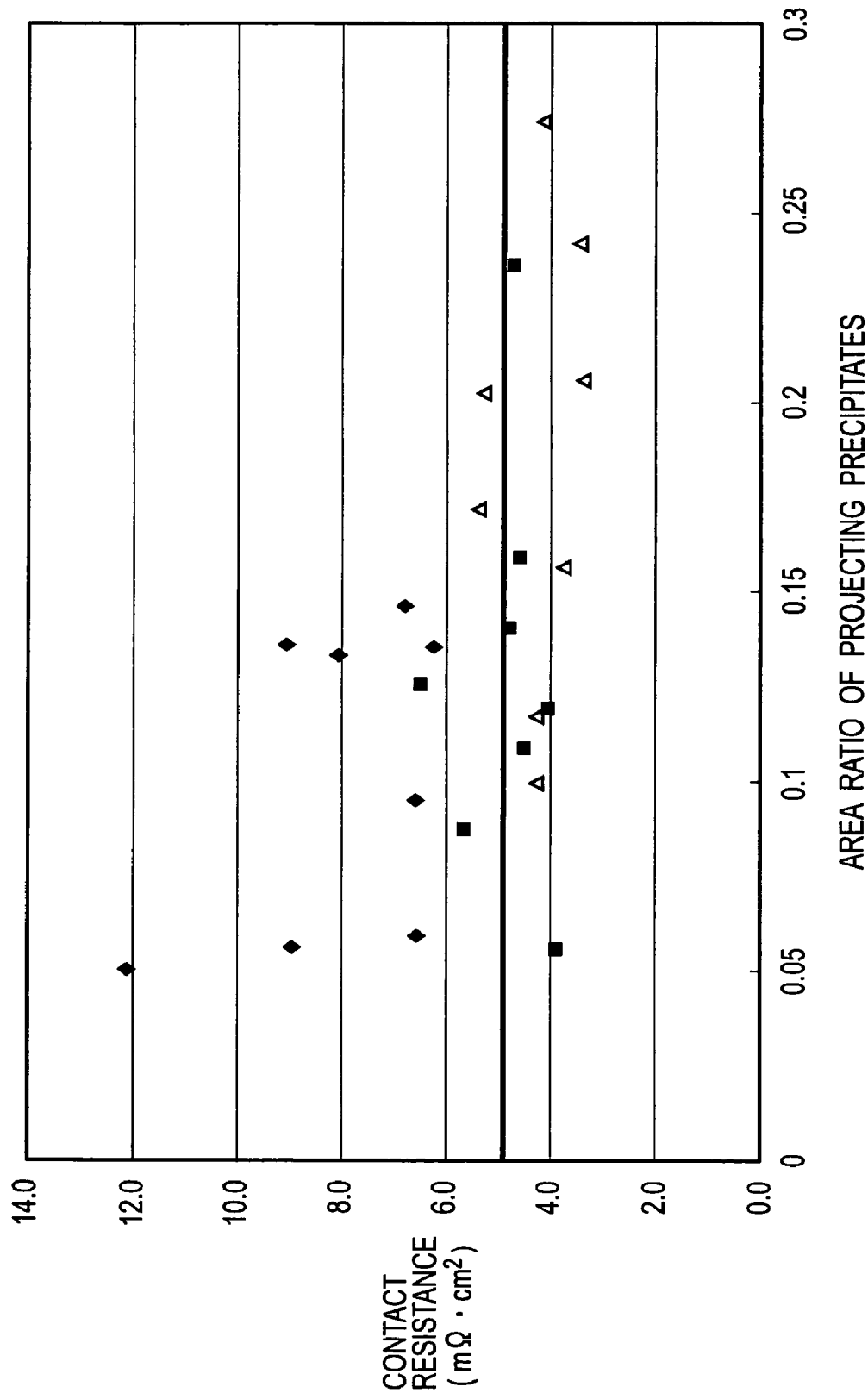
FIG. 15 is a graph showing a relationship between a set of area ratios of projecting nitrides and a set of associated contact resistances.
Figure 16:
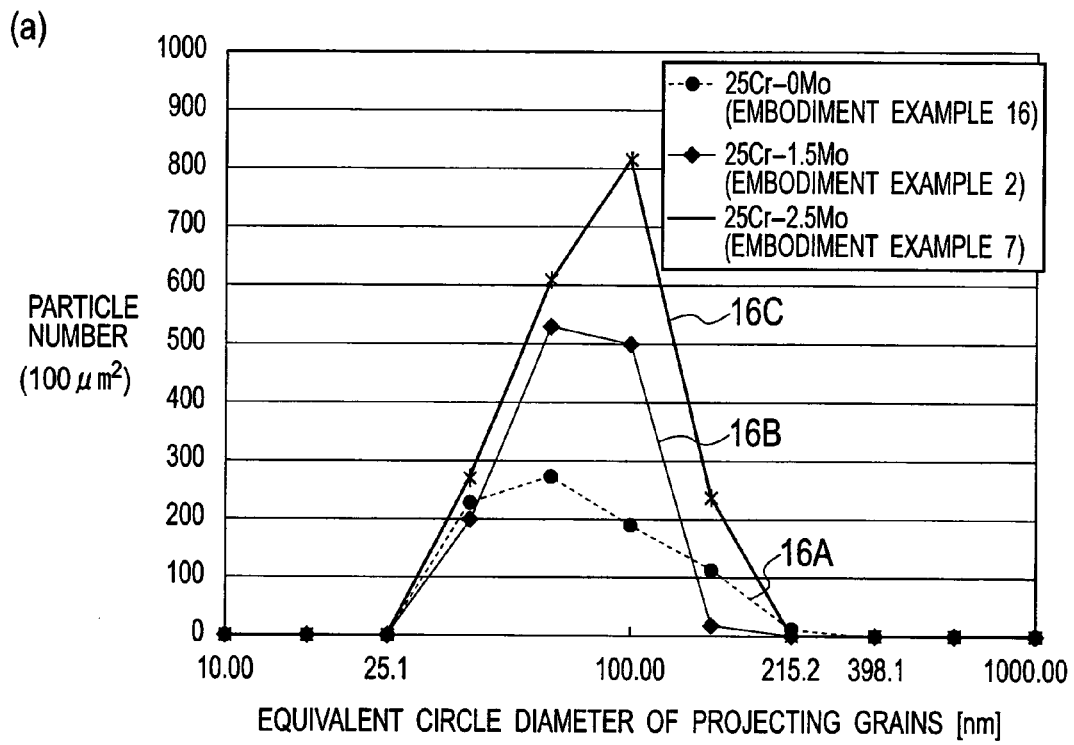
FIG. 16(a) is a graph showing, for each of the samples from embodiment examples 16, 2, and 7, a relationship between a set of equivalent circle diameters of projecting nitrides projecting from a surface of a nitrided layer and a set of numbers of particles of associated nitrides, and FIG. 16(b), a graph showing, for each of the samples from embodiment examples 16, 2, and 7, a pair of contact resistances before and after a corrosion resistance test.
Figure 16:
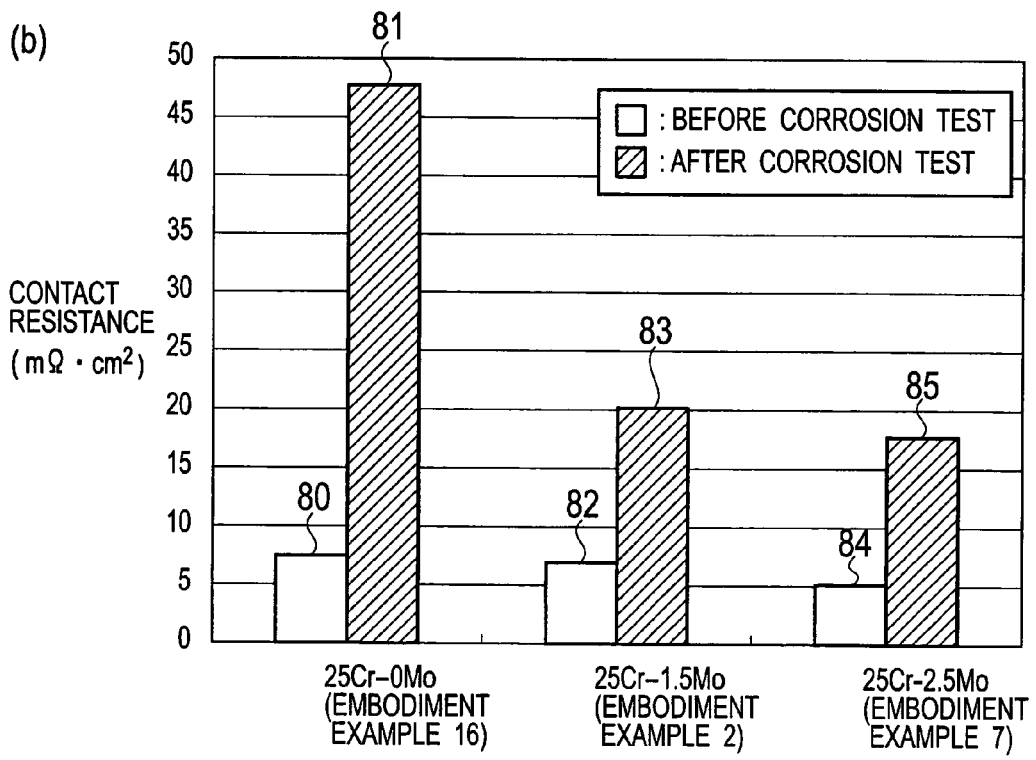

For projection-shaped nitrides projecting from a surface, if the number becomes greater, they have an increased contact area with a GDL, allowing for the more excellent conductivity. FIG. 14 shows relationships between equivalent circle diameters of projection-shaped nitrides projecting from a surface of nitrided layer and area ratios of nitrides or total numbers of particles of nitrides. FIG. 14(a) shows a relationship between equivalent circle diameters of projection-shaped nitrides and area ratios % of nitrides, and FIG. 14(b), a relationship between equivalent circle diameters of projection-shaped nitrides and total numbers of particles of nitrides. Moreover, FIG. 15 shows a relationship between area ratios of nitrides and contact resistances. Further, FIG. 16 shows relationships between equivalent circle diameters of projection-shaped nitrides projecting from surfaces of nitrided layers in embodiment examples 16, 2 and 7 and numbers of particles of nitrides or contact resistances. In FIG. 16(a), designated at 16A is embodiment example 16, 16B is embodiment example 2, and 16C is embodiment example 7. FIG. 16(a) is a graphic representation of data of FIG. 14(b). In FIG. 16(b), designated at 80 is a contact resistance before corrosion resistance test of a sample from embodiment example 16, 80 is a contact resistance after corrosion resistance test of the sample from embodiment example 16, 82 is a contact resistance before corrosion resistance test of a sample from embodiment example 2, 83 is a contact resistance after corrosion resistance test of the sample from embodiment example 2, 84 is a contact resistance before corrosion resistance test of a sample from embodiment example 7, and 85 is a contact resistance after corrosion resistance test of the sample from embodiment example 7.

As will be seen from FIG. 14(a) and FIG. 15, the area ratio had an increasing tendency, as the equivalent circle diameter of projection-shaped nitride increased, and as will be seen from FIG. 15, the contact resistance had a decreasing tendency, as the area ratio became 5% or more. It will also be seen that the effect was better for area ratios within a range of 10% or more, and was stable within a range of 20% or more. Like this, the amount of particles of nitrides was preferable within a range of 5% or more in terms of area ratio. Further, as shown in FIG. 14(b) and FIG. 16(a), precipitates of projection-shaped nitrides projecting from a surface of nitrided layer were preferably effective, as those of equivalent circle diameters of approximately 40 nm or more were observed 800 or more in number per area of 100 μm².

Further, as shown in FIG. 16(a), that one which was higher in Mo concentration gave a greater number of relatively large precipitates having equivalent circle diameters about 10 nm. When a separator is brought into contact with sheets of carbon paper (GDL) made of carbon fibers of a sub-micron order, precipitates of projection-shaped nitrides projecting from the surface intrude into gaps between carbon fibers. By provision of many precipitates uniformly distributed over a surface of nitrided layer, the separator and GDL have an increased area (or number) of contact region (or points) in between. This affords to have a low-suppressed contact resistance, allowing for an excellent conductivity. Further, as shown in FIG. 16(b), before corrosion resistance test, the contact resistance did not make much differences depending on Mo concentration, but after corrosion resistance test, the contact resistance was decreased, as Mo concentration was increased. Like this, it has been revealed that contact resistances before and after corrosion resistance test have a smaller difference in between and are stable, as Mo concentration is higher.

Description is now made of effects of dissolution treatment by acid of transition metal nitrides.

Figure 17:
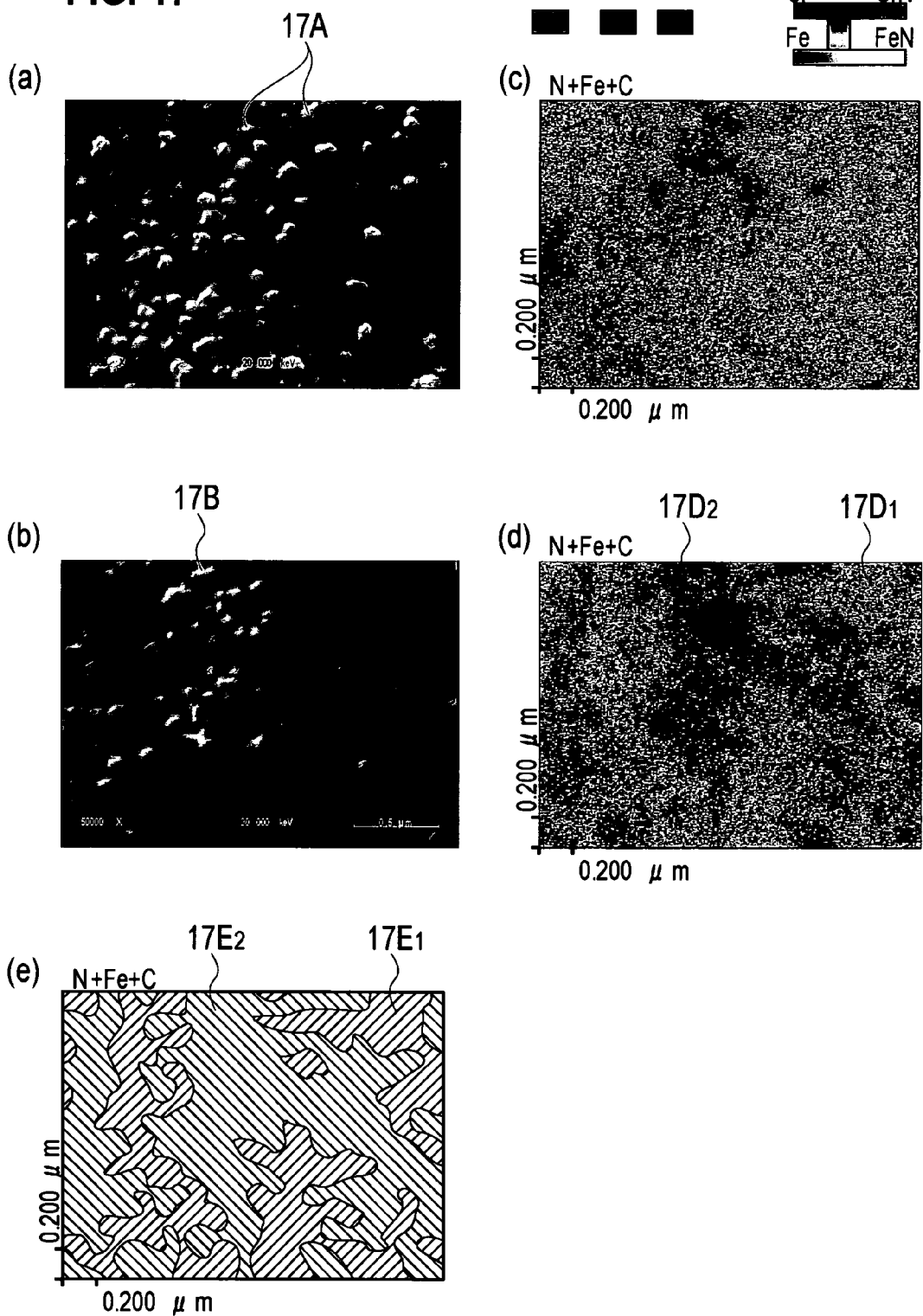
FIG. 17(a) is a picture of an SEM image of a sample after nitridation of embodiment example 12, FIG. 17(b), a picture of an SEM image after dissolution treatment by acid of a nitrided layer of the sample of embodiment example 12, FIG. 17(c), an image-processed picture of a nitrided layer surface of the sample after nitridation of embodiment example 12, FIG. 17(d), an image-processed picture of a nitrided layer surface after dissolution treatment by acid of the nitrided layer of the sample of embodiment example 12, and FIG. 17(e), a schematic illustration of the picture of FIG. 17(d).
Figure 18:
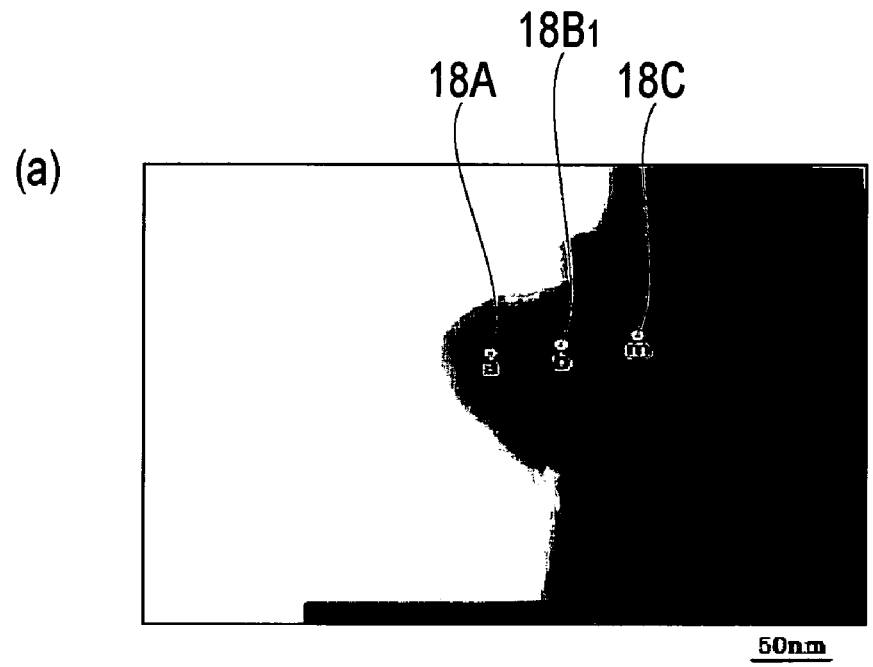
FIG. 18(a) is an observation result by FE-TEM of a section of a sample from embodiment example 12, and FIG. 18(b), an observation result by FE-TEM of a section after dissolution treatment by acid of the sample from embodiment example 12.
Figure 18:
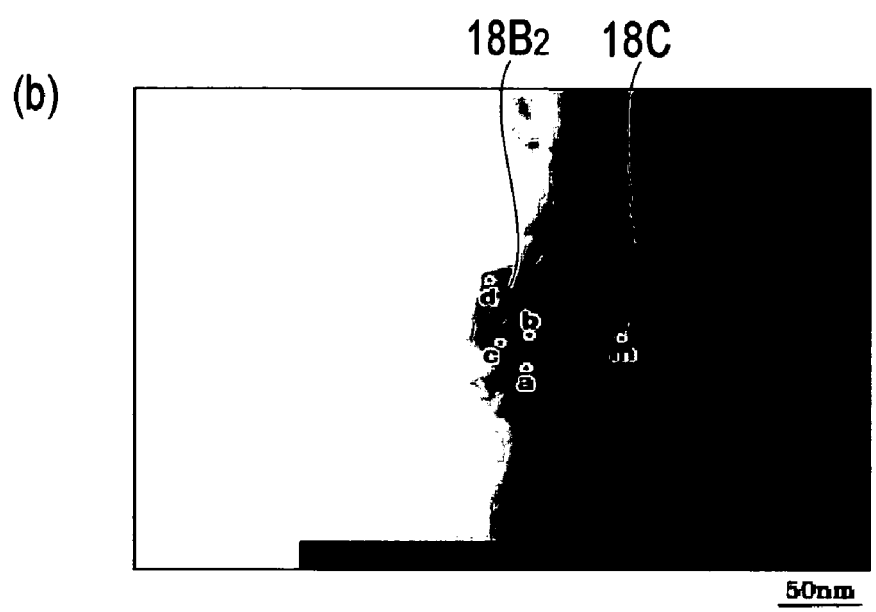

FIG. 17 and FIG. 18 show results of observation of surfaces of a nitrided layer before and after dissolution treatment by acid in embodiment example 12. FIG. 17(a) is an SEM image after nitridation of embodiment example 12, which shows a result of an element mapping analysis after a sputtering of 1 min, where for a nitrided layer including projection-shaped nitrides projecting from a surface, as it had been obtained by plasma nitriding a stainless steel, its surface was sputtered using a field-emission type Auger electron spectroscopy analyzer (FE-AES) (PHI Co. make SAM-700), with an electron beam current value 10 nA, by an Ar ion sputter 1 kV. FIG. 17(b) is an image of the nitrided layer after dissolution treatment by acid, FIG. 17(c), the image of nitrided layer, as it was image processed, and FIG. 17(d), the image of nitrided layer after dissolution treatment by acid, as it was image processed. FIG. 17(e) is a schematic illustration of FIG. 17(d). FIG. 18(a) shows a result of observation by a field-emission type transmission electron microscope (FE-TEM), of a section of a thin-film sample prepared, by an FIB-micro sampling method using a focused ion beam apparatus (FIB), from a sample of embodiment example 12. FIG. 18(b) is an image of a surface of nitrided layer after dissolution treatment by acid.

As shown in FIG. 17(a) and FIG. 17(b), for projection-shaped nitrides 17A and 17B projecting from a surface after plasma nitridation, the number and distribution did not made much differences between before and after dissolution treatment by acid. To the contrary, as shown in FIG. 17(c) and FIG. 17(d), surface layers of nitrides were greatly changed in composition. As shown in FIG. 17(c), before dissolution treatment, surfaces of nitrides had layers including Cr as a principal component (violet), and layers including Fe as a principal component (yellow-green) residing thereon, so that surface layers had compositions including Fe as a principal component. However, as shown in FIG. 17(d), after dissolution treatment, those layers 17D$_1$ (17E$_1$ in FIG. 17(e)) having surfaces layers including Fe as a principal component were reduced, and simply those portions having projection-shaped nitrides projecting from surface were changed to such layers 17D$_2$ (17E$_2$ in FIG. 17(e)) as including Cr as a principal component (violet).

Further, as shown in FIG. 18(a), before dissolution treatment by acid, for a surface portion of nitrided layer, the surface structure had: crystal structures 18C of M$_4$N type including Fe as a principal component; projection-shaped nitrides 18B$_1$ precipitated on their surfaces, projecting therefrom, including CrN as a main component; and a layer 18A of crystal structures of M$_4$N type additionally formed on them 18B$_1$, including Fe as a principal component. To the contrary, as shown in FIG. 18(b), after dissolution treatment by acid, for a surface portion of nitrided layer, the surface structure had: Δ crystal structures 18C of M$_4$N type including Fe as a principal component; and projection-shaped nitrides 18B$_2$ precipitated on their surfaces, projecting therefrom, including CrN as a main component, while the layer 18A of crystal structures of M$_4$N type including Fe as a principal component had been dissolved and missing. Like this, for a nitrided layer formed by plasma nitridation, projection-shaped nitrides projecting from the surface have a dual structure, which has a surface layer of crystal structures of M$_4$N type including Fe as a principal component, and CrN residing inside thereof, while after dissolution treatment by acid, the surface layer of crystal structures of M$_4$N type including Fe as a principal component is eluted, leaving simply CrN residing inside.

Such being the case, after dissolution treatment by acid, for surface layers of projection-shaped nitrides, their M$_4$N crystals including Fe as a principal component are eluted, and projecting nitrides have reduced heights, which is apparent also from Table 4 and Table 10. Moreover, after dissolution treatment by acid, for a surface layer of projection-shaped nitride, as its M$_4$N crystal including Fe as a principal component is eluted, CrN is exposed, and a surface layer of such CrN has a thin oxide film formed thereon. Therefore, such a projection-shaped nitride has an increased surface area, and the surface ratio of projection-shaped nitride also is increased, as shown in Table 10. Further, due to dissolution treatment by acid, there are caused generation and growth of oxides having as their cores such fine nitrides that have not been detected in the image analysis after nitridation, resulting in an increased number of projecting nitrides of equivalent circle diameters of approximately 40 nm or more per area of 100 μm², as well.

Figure 19:
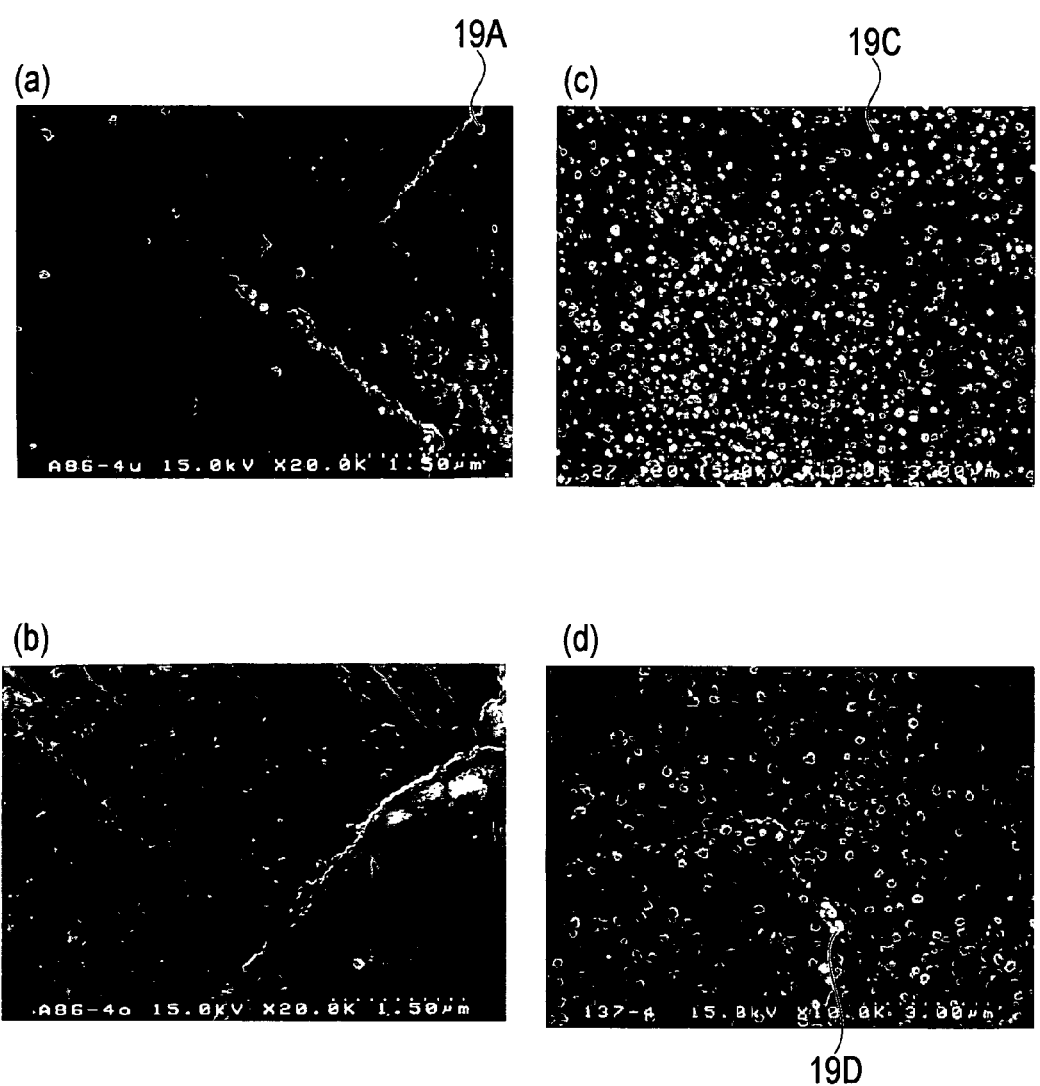
FIG. 19(a) is a picture of an SEM image of a sample after nitridation of embodiment example 1, FIG. 19(b), a picture of an SEM image after dissolution treatment by acid of a nitrided layer of the sample of embodiment example 1, FIG. 19(c), a picture of an SEM image of a sample after nitridation of embodiment example 7, and FIG. 19(d), a picture of an SEM image after dissolution treatment by acid of a nitrided layer of the sample of embodiment example 7.

FIG. 19 shows SEM images by observation at a 10,000-fold magnification by a field-emission type electron microscope, of surfaces of nitrided layers after plasma nitridation and after dissolution treatment by acid following plasma nitridation in embodiment example 1 and embodiment example 7. FIG. 19(a) is an SEM image after nitridation of embodiment example 1, FIG. 19(b), after dissolution treatment by acid of a nitrided layer thereof, FIG. 19(c), an SEM image after nitridation of embodiment example 7, and FIG. 19(b), after dissolution treatment by acid of a nitrided layer thereof.

As shown in FIG. 19(a) and Table 4, in embodiment example 1 where plasma nitriding temperature was as relatively low as 400° C., a resultant nitrided layer had scace projection-shaped nitrides 19A projecting from the surface, and the nitrided layer was laminar. To the contrary, as shown in FIG. 19(c), in embodiment example 7 where plasma nitriding temperature was as relatively high as 450° C., there were many projection-shaped nitrides 19C precipitated on and projecting from a surface. Further, as shown in FIG. 19(b), for the plasma nitriding temperature as relatively low as 400° C., after dissolution treatment by acid following plasma nitridation, the surface of nitrided layer was left laminar as had been after plasma nitridation. To the contrary, as shown in FIG. 19(d), for the case of plasma nitriding temperature as relatively high as 450° C., many projection-shaped nitrides 19D were left as had been projecting from the surface of nitrided layer.

Figure 20:
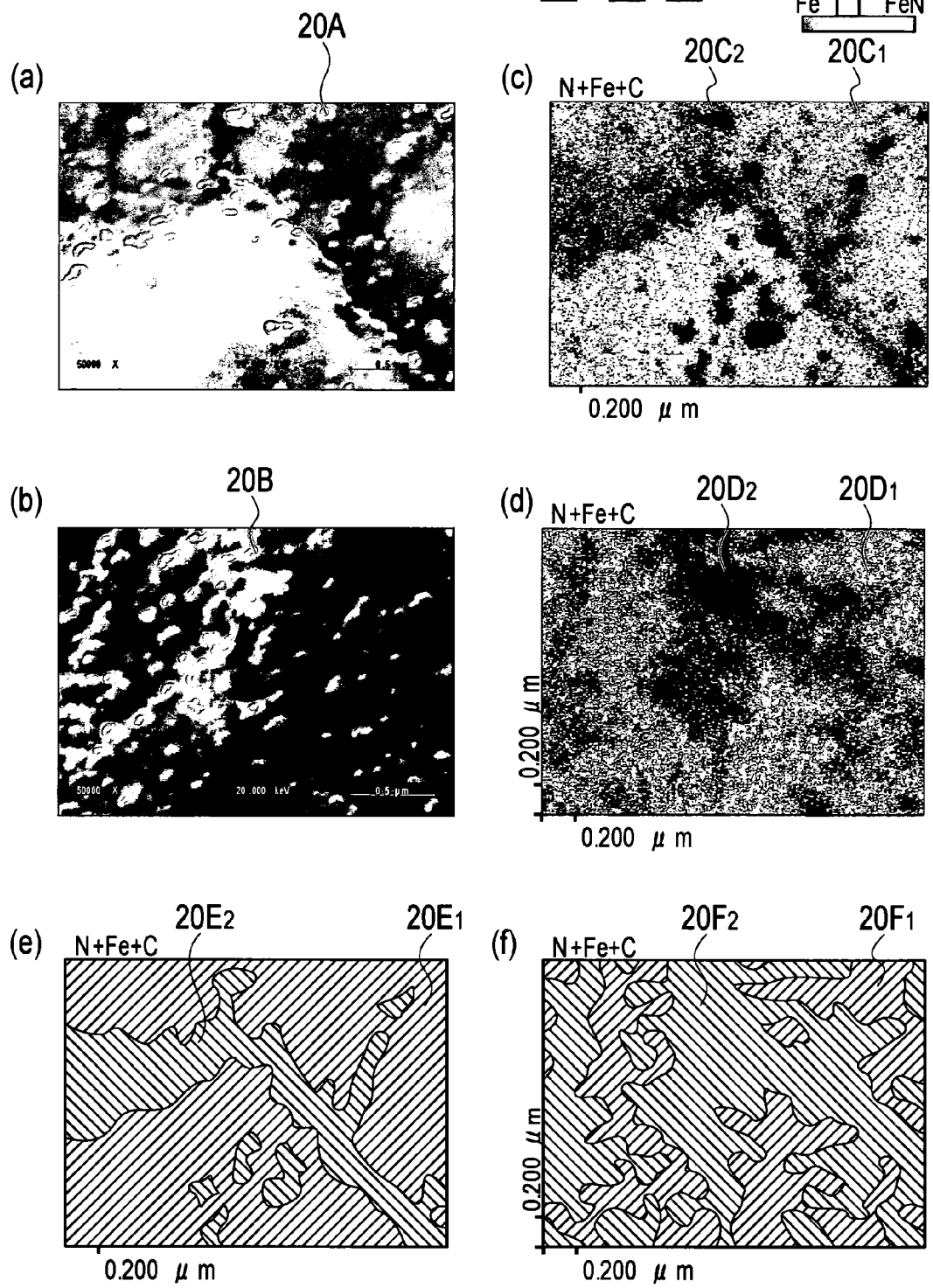
FIG. 20(a) is a picture of an SEM image after dissolution treatment by acid of a sample of embodiment example 2, FIG. 20(b), a picture of an SEM image after dissolution treatment by acid of a sample of embodiment example 12, FIG. 20(c), an image-processed picture of FIG. 20(a), FIG. 20(d), an image-processed picture of FIG. 20(b), FIG. 20(e), a schematic illustration of the picture of FIG. 20(c), and FIG. 20(f), a schematic illustration of the picture of FIG. 20(d).

FIG. 20 shows SEM images by observation at a 10,000-fold magnification by a field-emission type electron microscope, of surfaces of nitrided layers after dissolution treatment by acid in embodiment example 2 and embodiment example 12, as well as results of element mapping. FIG. 20(*a*) is an SEM image after dissolution treatment by acid of embodiment example 2, FIG. 20(*b*), an SEM image after dissolution treatment by acid of embodiment example 12, FIG. 20(*c*), an image-processed image of FIG. 20(*a*), FIG. 20(*d*), and image-processed image of FIG. 20(*b*), FIG. 20(*e*), a schematic illustration of FIG. 20(*c*), and FIG. 20 (*f*), a schematic illustration of FIG. 20(*d*).

As shown in FIG. 20(*a*) and FIG. 20(*b*), projection-shaped nitrides 20A and 20B were left still after dissolution treatment by acid. As shown in FIG. 20(*c*), for the surface of nitrided layer of embodiment example 2, there were mixed layers $20C_1$ ($20E_1$ in FIG. 20(*e*)) including Fe as a principal component and colored yellow-green and layers $20C_2$ ($20E_2$ in FIG. 20(*e*)) of CrN colored purple, and surface layers of projecting nitrides 20A shown in FIG. 20(*a*) were layers of CrN colored purple. Further, As shown in FIG. 20(*d*), for the surface of nitrided layer of embodiment example 12, there were mixed layers $20D_1$ ($20F_1$ in FIG. 20(*f*)) including Fe as a principal component and colored yellow-green and layers $20D_2$ ($20F_2$ in FIG. 20(*f*)) of CrN colored purple, and surface layers of projecting nitrides 20B shown in FIG. 20(*b*) were layers of CrN colored purple. Like this, surfaces after dissolution treatment by acid were CrN ($20C_2$, $20D_2$) colored purple, and CrN amount was greater in the case of FIG. 20(*d*) where the base material had a greater amount of Cr and a greater amount of Mo. From this result, it has come out that the greater the amount of Cr as well as the amount of Mo in base material becomes, the more projecting nitrides including Cr as a principal component will be left residing.

Figure 21:
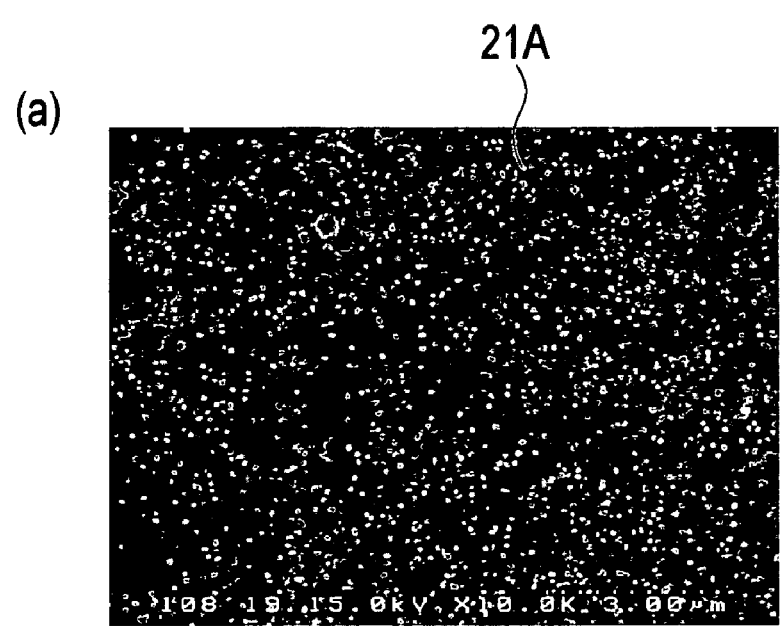
FIG. 21(a) is an image-processed picture of an SEM image of a nitrided layer surface of a sample from embodiment example 3, and FIG. 21(b), a picture of a binary-coded image by image analysis of a measurement region of the picture of FIG. 21(a).
Figure 21:
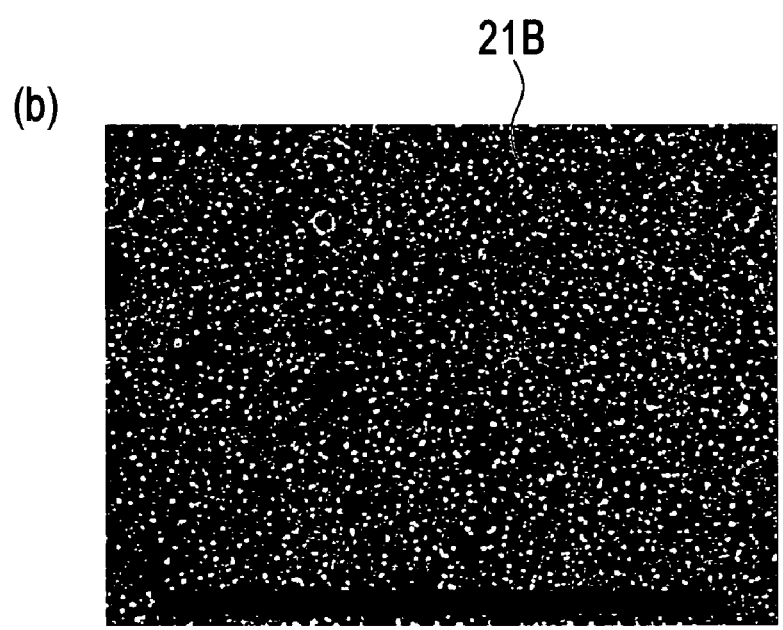
Figure 22:
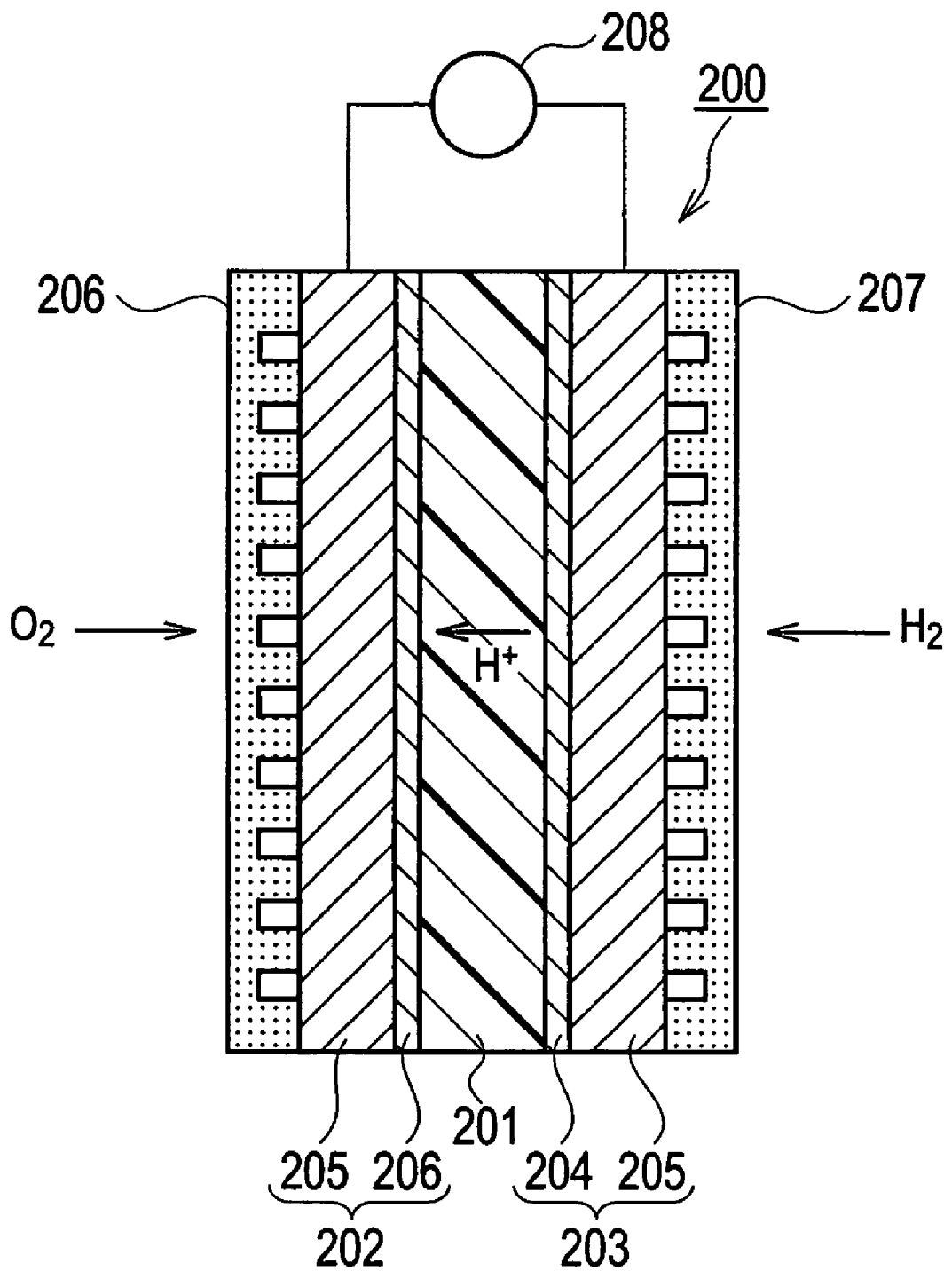
FIG. 22 is a sectional view of configuration of a unit cell forming a fuel cell stack.

FIG. 21 shows an image-processed result of an SEM image of a nitrided layer surface of embodiment example 3. FIG. 21(*a*) is an input image to be image-processed, and FIG. 21(*b*), a binary-coded image by image analysis of a measurement region. Projecting nitrides 21A in FIG. 21(*a*) are indicated all as white points 21B in FIG. 21(*b*). Like this, it was shown that whole nitrides were recognized in the image processing.

Such being the case, there were achieved an excellent electrochemical stability under a strongly acidic environment and a favorable corrosion resistance in embodiment example 1 to embodiment example 16, which is considered because of a nitrided layer comprising a nitride having a crystal structure of any of hexagonal MN, $M_2N$, and $M_{2-3}N$ type crystals and a cubic $M_4N$ type crystal, and a nitride having a stacked crystal structure of a nano level comprising a hexagonal $M_{2-3}N$ type crystal and a cubic $M_4N$ type crystal, and continuously connected to a base layer having a cubic crystal structure, permitting electrons to move with ease between the base layer and nitrides, allowing for an excellent conductivity. Further, the nitrided layer has a surface portion of a crystal structure of any of hexagonal MN, $M_2N$, and $M_{2-3}N$ type crystals and a cubic $M_4N$ type crystal, abounding Cr content and N content, as well as a thin and stable passive film formed on a surface of the nitrided layer, and a relatively great oxygen content, thus permitting unhindered electron movements, affording a maintained conductivity, even under an environment strongly acidic and as hot as within 80 to 90° C. like a fuel cell separator environment, while allowing for an excellent ion elution property, as so considered. Further, the stacked crystal structure of a nano level comprising a hexagonal $M_{2-3}N$ type crystal and a cubic $M_4N$ type crystal affords to have metallic bonds held between transition metal atoms, and strong covalent bonds exhibited between transition metal atoms and nitrogen atoms, as so considered. In addition, transition metal atoms constituting a face centered cubic lattice are irregularly mixed, thereby causing partial molar free energy of each transition metal atom to be reduced, allowing for a suppressed low activity, as so considered. Further, layered nano-level fine tissues have a state of two-phase equilibrium, permitting free energy to be reduced, thus allowing for a suppressed low activity, with a reduced reactivity against oxidation, and a chemical stability. Therefore, oxidation is suppressed to be excellent in corrosion resistance, in particular in a strongly acidic atmosphere, as so considered. Further, thin oxide films of several tens nano-level are formed in a most superficial layer, thus allowing for an enhanced corrosion resistance without worsening conductivity, as so considered.

It is noted that although fuel cells have a theoretical voltage, which is 1.23 V per unit cell, the voltage that can be actually taken out is dropped due to reaction polarization, gas diffusion polarization, and resistance polarization, and the voltage decreases, as the current to be taken out increases. Further, in applications to automobiles, where increasing power density per unit volume or unit weight is wanted, the service tends to have a greater current density than for stationary use, e.g., a current density of 1 A/cm². For the current density of 1 A/cm², if the contact resistance between separator and carbon paper is kept within a range of 20 mΩ·cm² or less, that is, if measured values by the device shown in FIG. 10(*b*) is kept within a range of 40 mΩ·cm² or less, the efficiency reduction due to contact resistance is considered as controllable. For any of embodiment example 1 to embodiment example 11, the contact resistance is 30 mΩ·cm² or less, which allows for formation of a fuel cell stack to be high of electromotive force per unit cell, excellent in power generation performance, and compact in size, with a reduced cost. From the foregoing results of measurement, for embodiment example 1 to embodiment example 11 which have exhibited in comparison with comparative examples lower contact resistances, and small ion elution amounts, and excellent corrosion resistances, it has been turned up that they concurrently have both low contact resistance and corrosion resistance.

While embodiments of the present invention have been described, it will not be construed that description in part of the embodiment or drawing restricts this invention. It is to be understood that various substitute embodiments, embodiment examples, and technique of use will become apparent from the disclosure.

The contents of Japanese Patent Application No. 2007-057231 (filed on Mar. 7, 2007) are incorporated herein by reference.

INDUSTRIAL APPLICABILITY

According to the present invention, there are provided a transition metal nitride with both excellent conductivity and corrosion resistance, a separator for fuel cells having a stainless steel surface formed with a nitrided layer including such a transition metal nitride, a fuel cell stack using such a separator for fuel cells, and a fuel cell vehicle equipped with such a fuel cell stack.

The invention claimed is:

1. A transition metal nitride obtained by nitriding a base material including an austenitic stainless steel, the transition metal nitride comprising:
    a first layer formed continuously on a base layer formed by the base material, having a laminated crystal structure of a nitride having a cubic crystal structure of $M_4N$ type, and a nitride having a hexagonal crystal structure of $M_{2-3}N$ type; and a second layer formed continuously on the first layer, including a nitride having at least one kind of crystal structure out of hexagonal crystal structures of $Cr_2N$, CrN, and $M_{2-3}N$ type, wherein M is a transition metal atom selected from the group consisting of Fe, Cr, Ni, and Mo, and a cubic crystal structure of $M_4N$ type, and the second layer being formed as a surface-nitriding-processed portion of the base material continuously in a depth direction from a surface of the base material.

2. The transition metal nitride as claimed in claim 1, wherein the second layer has a layered form of nitride within a thickness range of 3 to 30 nm.

3. The transition metal nitride as claimed in claim 1, wherein the second layer comprises a plurality of precipitates projecting from a surface portion of the second layer, and the precipitates each having a height within a range of 10 to 90 nm relative to the surface portion of the second layer, an amount of the precipitates of equivalent circle diameters of 40 nm or more per area of 100 $\mu m^2$ projecting from the surface portion of the second layer is 800 or more.

4. The transition metal nitride as claimed in claim 3, wherein a precipitate projecting from the surface portion of the second layer after a dissolution treatment by acid of the transition metal nitride comprises a crystal structure of CrN or $Cr_2N$, an amount of the precipitates of equivalent circle diameters of 40 nm or more per area of 100 $\mu m^2$ projecting from the surface portion of the second layer after a dissolution treatment by acid of the transition metal nitride is 800 or more.

5. The transition metal nitride as claimed in claim 1, wherein the second layer has, at a depth of 10 nm or less from the surface of the base material, a composition comprising Cr within a range of 10 to 30 at % and N within a range of 20 to 40 at %, having Cr and N concentration in part.

6. A separator for fuel cells comprising: a base layer formed by a base material including an austenitic stainless steel; and a nitrided layer of a transition metal nitride according to claim 1 being formed directly on the base layer.

7. The separator for fuel cells as claimed in claim 6, wherein the base layer comprises a Cr content within a range of 25 wt % or more and 30 wt % or less, a Ni content within a range of 20 wt % or more and 26 wt % or less, and a Mo content within a range of 0 wt % or more and 3.0 wt % or less.

8. A method of manufacturing a transition metal nitride to be formed by nitriding by a plasma nitriding method comprising using a pulse plasma power supply adapted configured to repeat a discharge and an interruption having a duration of discharge of plasma and a duration of interruption of plasma within 1 to 1,000 μsec and the plasma nitriding method is performed under a condition that the base material has a temperature between 400° C. or more and 450° C. or less, a base material including an austenitic stainless steel, the manufacturing method comprising: forming, on a base layer formed by the base material, a first layer having a stacked crystal structure of a nano-level including a nitride having a cubic crystal structure of $M_4N$ type, and a nitride having a hexagonal crystal structure of $M_{2-3}N$ type; and having a second layer formed continuously on the first layer, including a nitride having at least one kind of crystal structure out of hexagonal crystal structures of $Cr_2N$, CrN, and $M_{2-3}N$ type, and a cubic crystal structure of $M_4N$ type, and being formed as a surface-nitriding-processed portion of the base material continuously in a depth direction from a surface of the base material.

9. A method of manufacturing a separator for fuel cells, comprising: press-forming a passage for a fuel or an oxidizer to a work comprising a base material including an austenitic stainless steel; and applying a nitriding process to the work wherein the nitriding process comprises a plasma nitriding method comprising using a pulse plasma power supply adapted to repeat a discharge and an interruption having a duration of discharge of plasma and a duration of interruption of plasma within 1 to 1,000 μsec and the plasma nitriding method is performed under a condition that the base material has a temperature between 400° C. or more and 450° C. or less, thereby forming, on a base layer formed by the base material, a first layer having a stacked crystal structure of a nano-level including a nitride having a cubic crystal structure of $M_4N$ type, and a nitride having a hexagonal crystal structure of $M_{2-3}N$ type, and having a second layer formed continuously on the first layer, including a nitride having at least one kind of crystal structure out of hexagonal crystal structures of $Cr_2N$, CrN, and $M_{2-3}N$ type, and a cubic crystal structure of $M_4N$ type, and being formed as a surface-nitriding-processed portion of the base material continuously in a depth direction from a surface of the base material.

10. The method of manufacturing a separator for fuel cells as claimed in claim 9, further comprising dissolution-treating a surface of the second layer by acid after forming the second layer.

11. A fuel cell stack comprising a separator for fuel cells according to claim 6.

12. A fuel cell vehicle comprising a fuel cell stack according to claim 11 as a power supply.

13. The transition metal nitride as claimed in claim 1, wherein the second layer comprises a plurality of precipitates projecting from a surface portion of the second layer, and the precipitates each having a height within a range of 10 to 90 nm relative to the surface portion of the second layer, an amount of the precipitates of equivalent circle diameters of 40 nm or more per area of 10 $\mu m^2$ projecting from the surface portion of the second layer is 800 or more.

* * * * *